(12) United States Patent
Harris, II

(10) Patent No.: US 10,492,467 B2
(45) Date of Patent: Dec. 3, 2019

(54) GROOMING DEVICE

(71) Applicant: John Robert Harris, II, Rancho Palos Verdes, CA (US)

(72) Inventor: John Robert Harris, II, Rancho Palos Verdes, CA (US)

(*) Notice: Subject to any disclaimer, the term of this patent is extended or adjusted under 35 U.S.C. 154(b) by 589 days.

(21) Appl. No.: 15/163,558

(22) Filed: May 24, 2016

(65) Prior Publication Data

US 2016/0262347 A1 Sep. 15, 2016

Related U.S. Application Data

(62) Division of application No. 13/947,457, filed on Jul. 22, 2013, now Pat. No. 9,351,476.

(60) Provisional application No. 61/675,142, filed on Jul. 24, 2012, provisional application No. 61/675,171, filed on Jul. 24, 2012, provisional application No. 61/725,785, filed on Nov. 13, 2012.

(51) Int. Cl.
*A01K 13/00* (2006.01)
*A45D 24/04* (2006.01)
*A46B 9/02* (2006.01)
*A45D 24/40* (2006.01)

(52) U.S. Cl.
CPC ............ *A01K 13/002* (2013.01); *A45D 24/04* (2013.01); *A46B 9/023* (2013.01); *A45D 24/40* (2013.01)

(58) Field of Classification Search
CPC ...... A01K 13/002; A01K 13/00; A46B 17/06; A46B 2200/1093; A46B 2200/104; A46B 9/023; A45D 24/30; A45D 24/40; A45D 24/32; A45D 24/007; A45D 24/04; A01D 7/10
See application file for complete search history.

(56) References Cited

U.S. PATENT DOCUMENTS 3,368,554 A * 2/1968 Shao ..................... A45D 24/42
132/119
4,023,230 A * 5/1977 Friedman ............... A46B 7/023
132/119
4,225,997 A * 10/1980 Thomas ................ A46B 7/023
15/169

(Continued)

FOREIGN PATENT DOCUMENTS

DE 202004011639 U1 11/2004
FR 2572632 A1 * 5/1986 ............. A46B 7/023

(Continued)

OTHER PUBLICATIONS

International Search Report of Jan. 24, 2014 which are cited in the European Search Report, Communication Pursuant to Art6icle 94(3) dated Aug. 14, 2017.

*Primary Examiner* — Kathleen I Alker
(74) *Attorney, Agent, or Firm* — Fulwider Patton LLP

(57) ABSTRACT

A grooming device includes hair collectors and a scraper. The scraper uncovers the hair collectors when the device is pressed down for use, and scrapes the hair collectors to eject hair collected when the device is released. Ejection of collected hair can also be controlled manually. A collection chamber may be provided, and multiple combs may be mounted on a rotatable dowel that recede within the rotatable barrel, or with sliding plates around and offset from the dowel as the dowel is rotated. A door or window on a surface of the collection chamber can be opened to empty the chamber of collected hair.

5 Claims, 50 Drawing Sheets

(56) References Cited

U.S. PATENT DOCUMENTS

| | | | | |
|---|---|---|---|---|
| 4,226,251 A | * | 10/1980 | Wall | A46B 7/023 |
| | | | | 132/212 |
| 4,977,909 A | * | 12/1990 | Chou | A45D 19/02 |
| | | | | 132/123 |
| 5,074,006 A | | 12/1991 | Eremita | |
| 5,267,528 A | * | 12/1993 | Murieen, Sr. | A46B 17/06 |
| | | | | 119/628 |
| 5,350,248 A | * | 9/1994 | Chen | A46B 7/02 |
| | | | | 15/167.1 |
| 6,427,633 B1 | | 8/2002 | Ogden | |
| 6,595,219 B2 | * | 7/2003 | Anderson | A46B 9/10 |
| | | | | 132/123 |
| 7,861,360 B2 | * | 1/2011 | Malka | A46B 17/06 |
| | | | | 132/119 |
| 2002/0029749 A1 | | 3/2002 | Berman | |
| 2006/0000423 A1 | | 1/2006 | Morosin | |
| 2006/0207623 A1 | | 9/2006 | Kung | |
| 2007/0033758 A1 | | 2/2007 | Wang | |
| 2007/0169293 A1 | * | 7/2007 | Wang | A46B 17/06 |
| | | | | 15/159.1 |
| 2008/0066690 A1 | | 3/2008 | Rosen | |
| 2009/0107413 A1 | | 4/2009 | Shiloni et al. | |
| 2010/0122663 A1 | | 5/2010 | Fernandez | |
| 2012/0060311 A1 | | 3/2012 | Wang | |
| 2018/0132452 A1 | * | 5/2018 | Dionne | A01K 13/002 |

FOREIGN PATENT DOCUMENTS

| | | | |
|---|---|---|---|
| FR | 2929825 A1 | 10/2009 | |
| JP | 11113436 A | 4/1999 | |
| JP | 2007144074 A | 6/2007 | |
| WO | WO-2012038633 A1 * | 3/2012 | A01K 13/002 |

\* cited by examiner

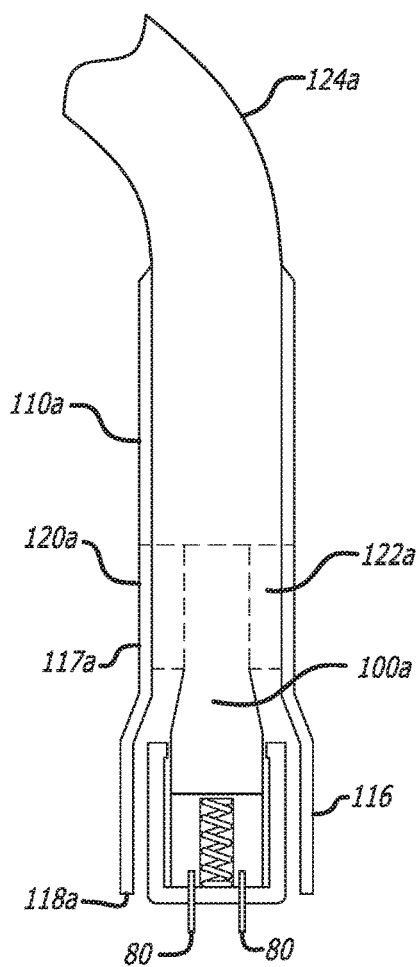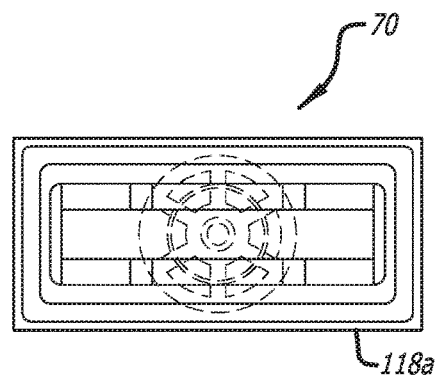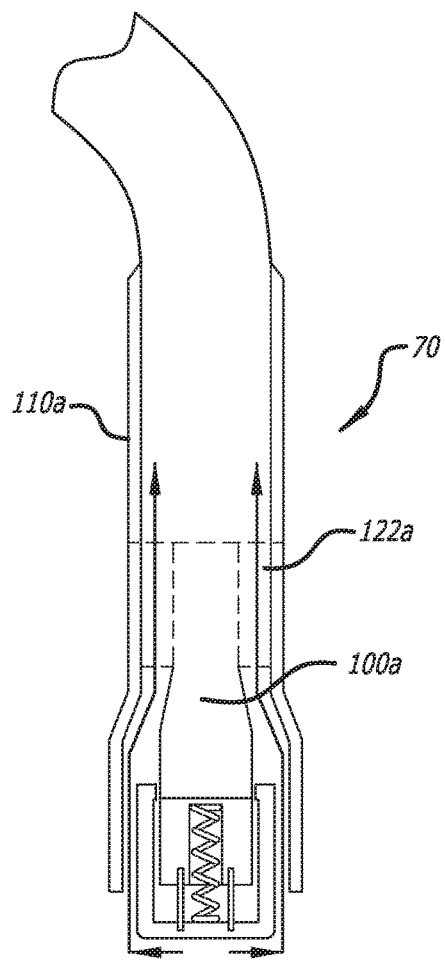

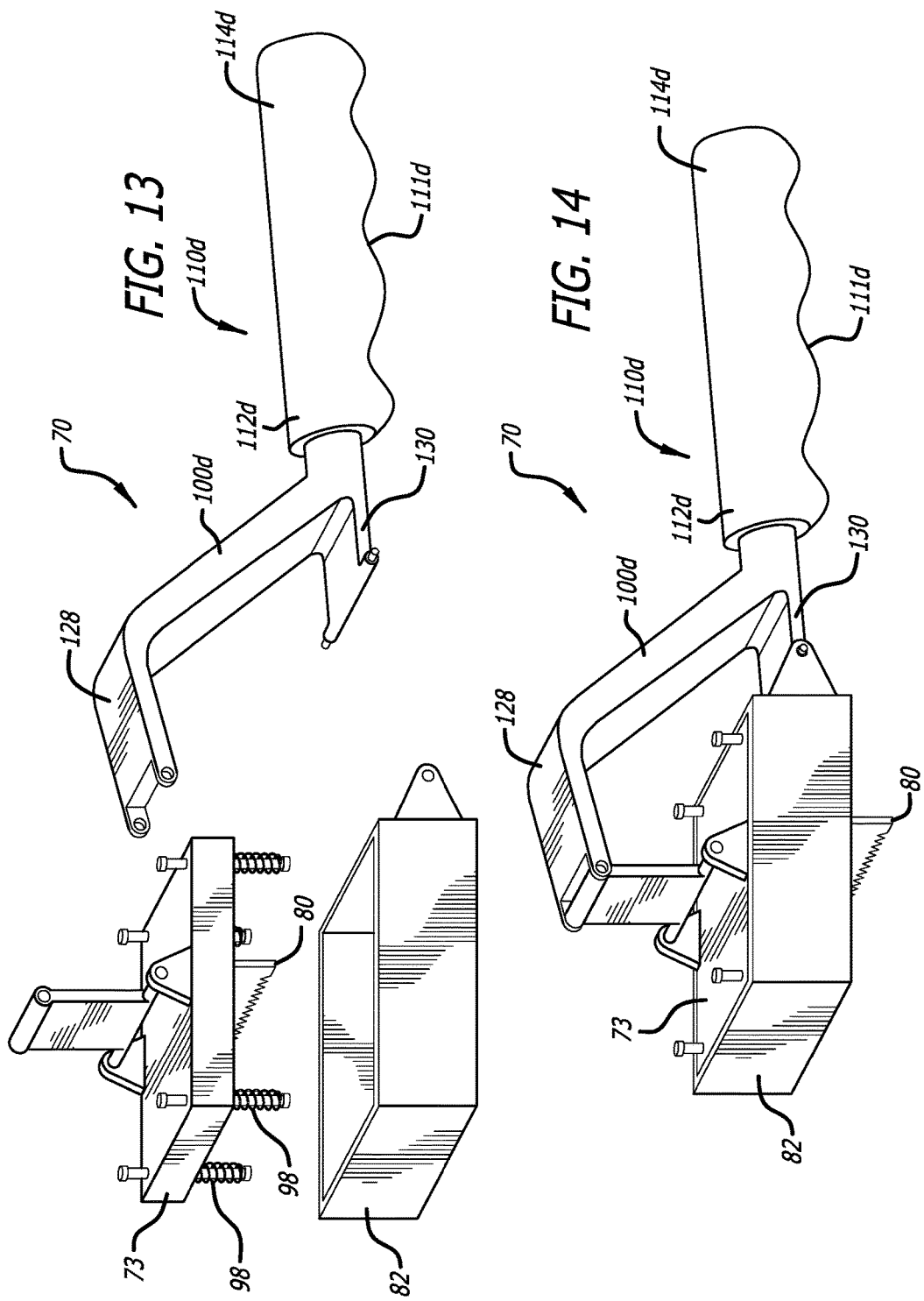

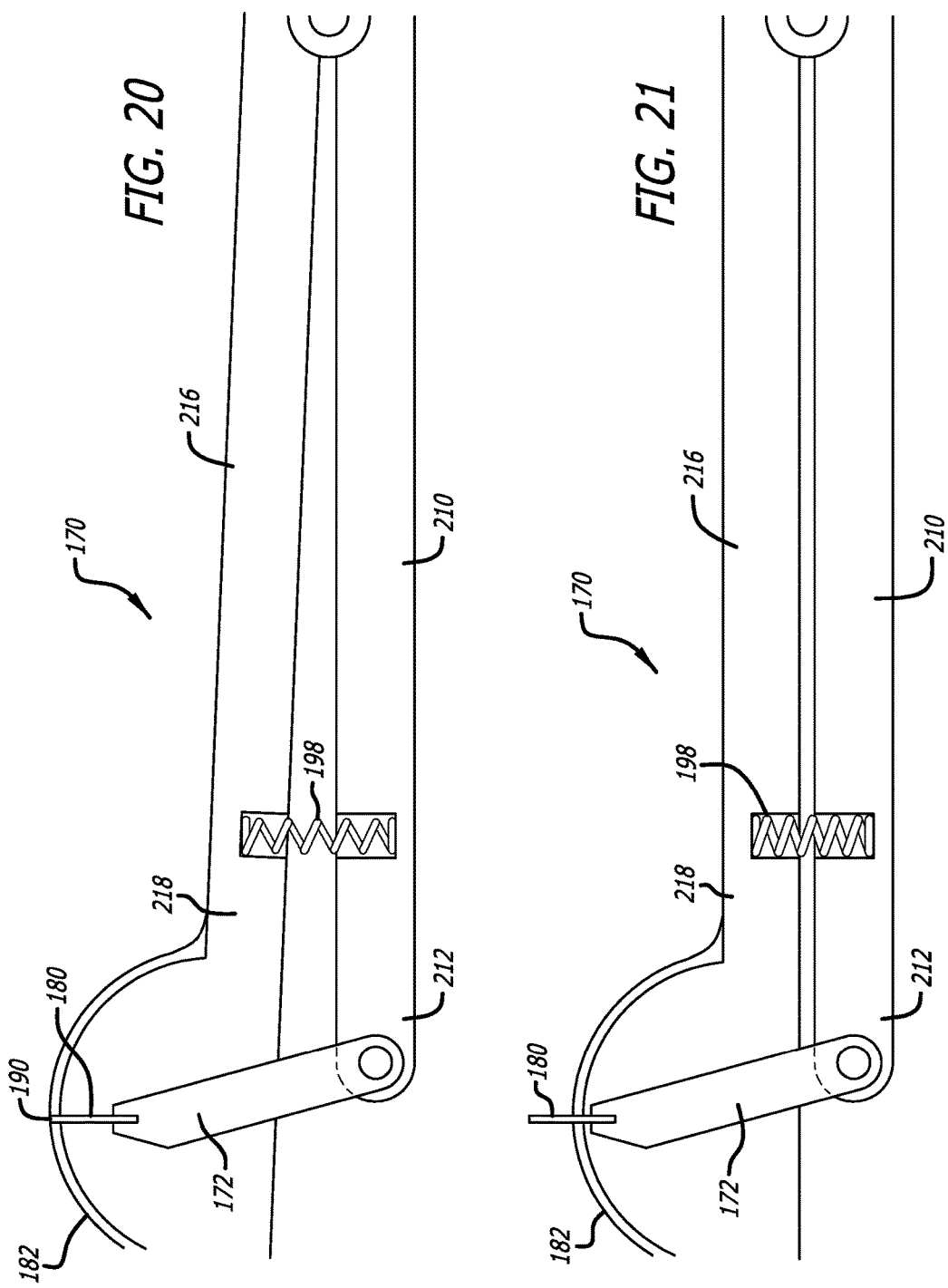

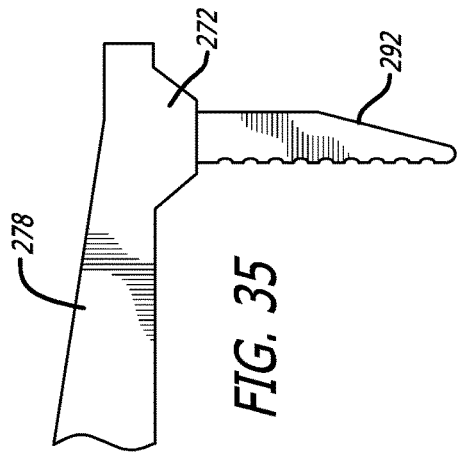
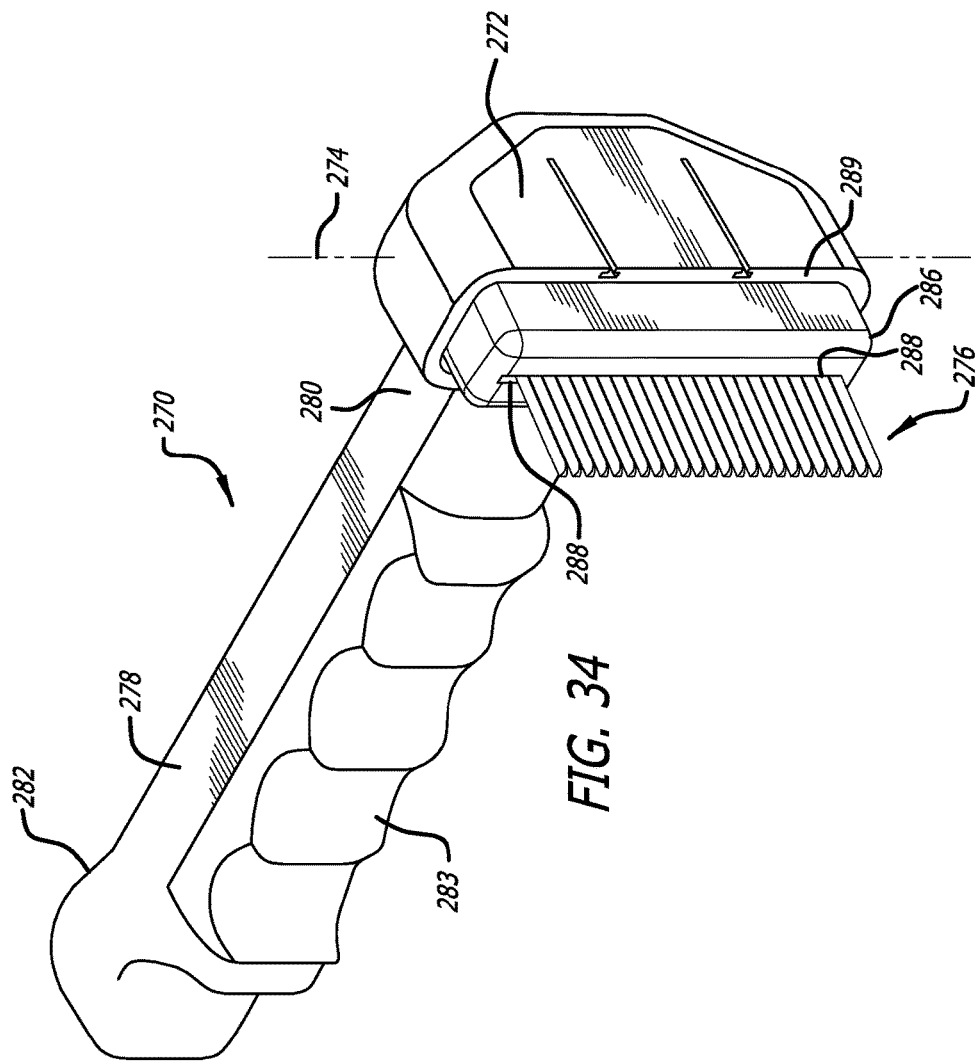

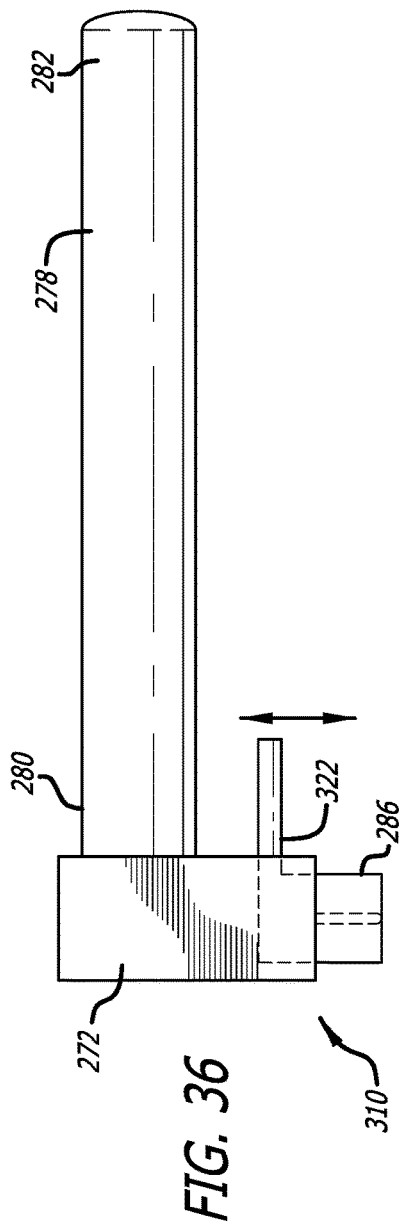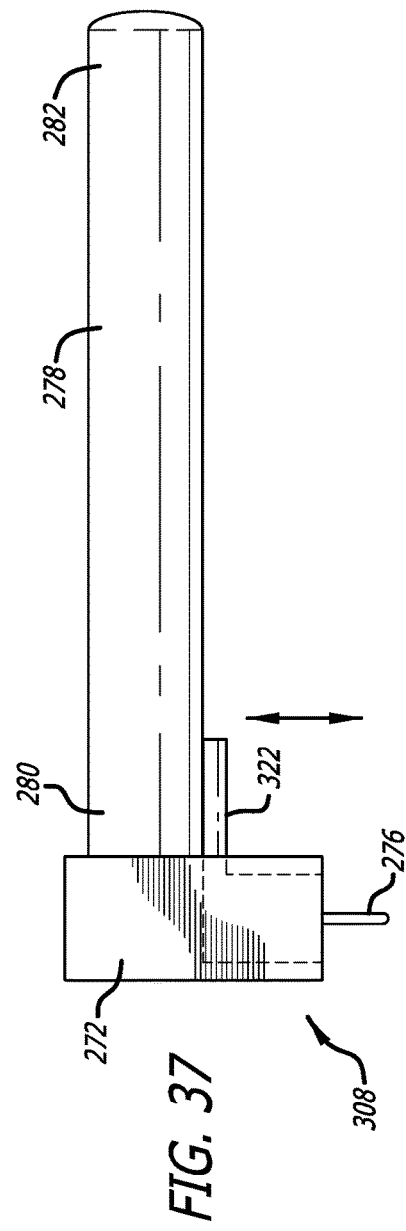

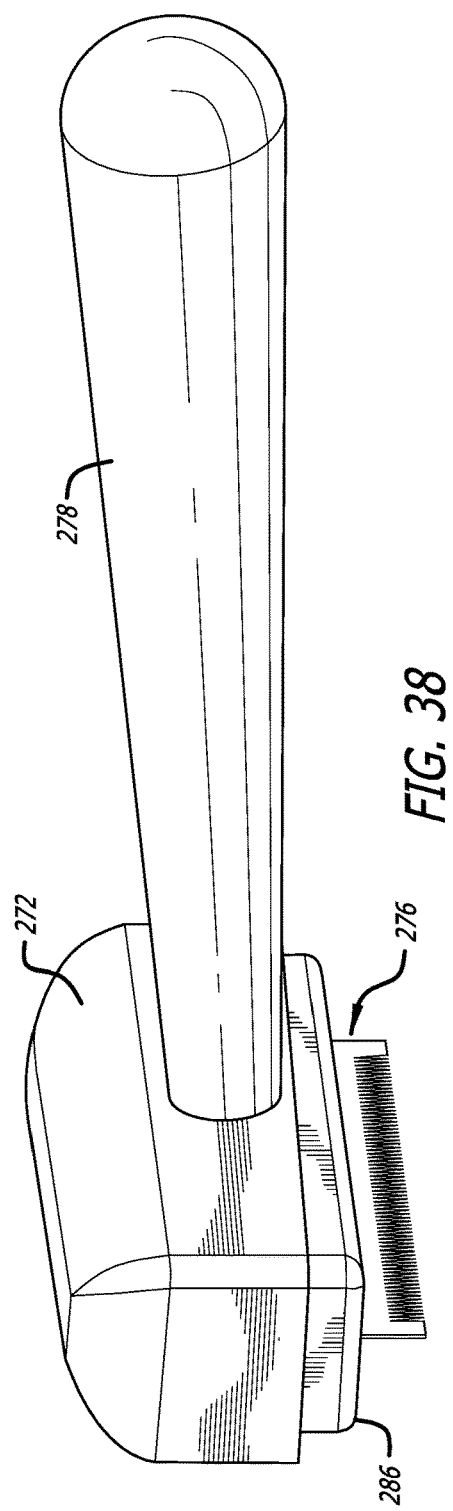

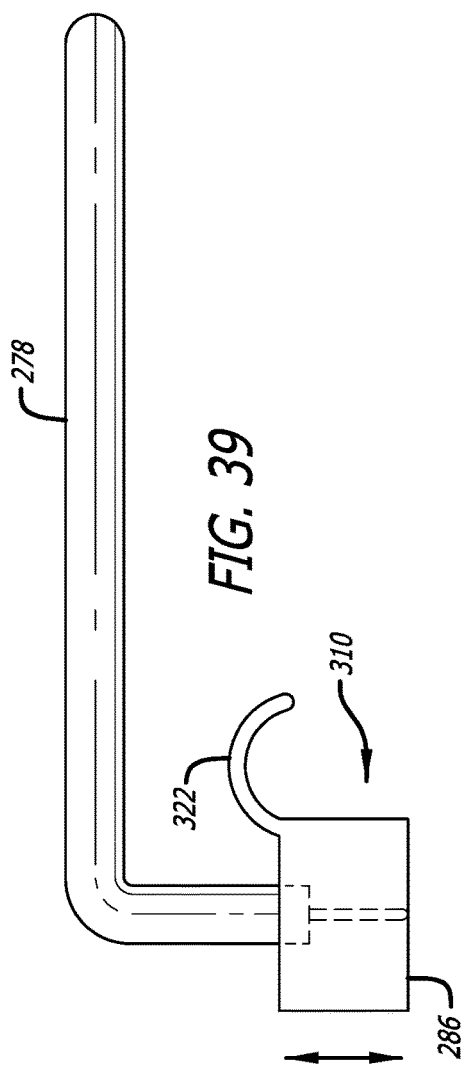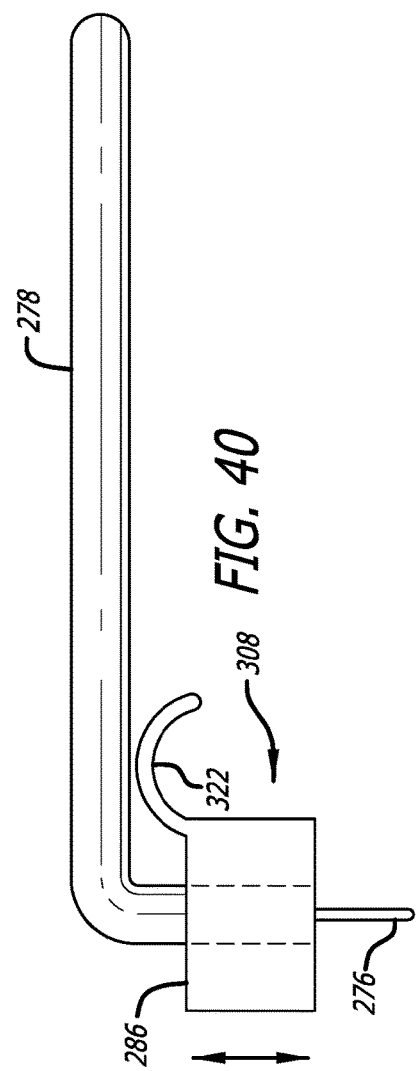

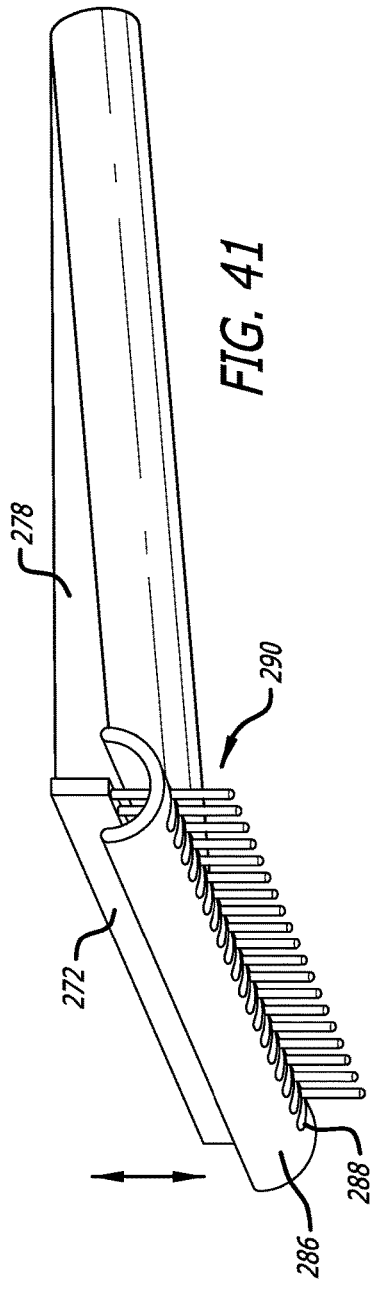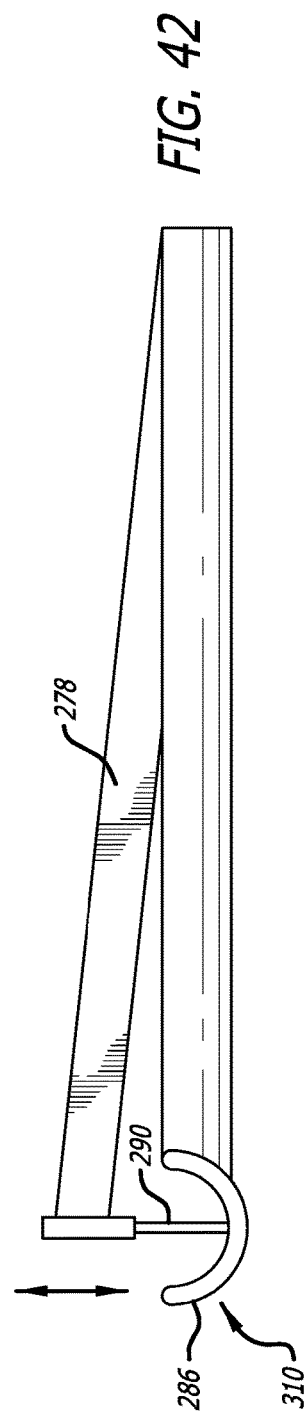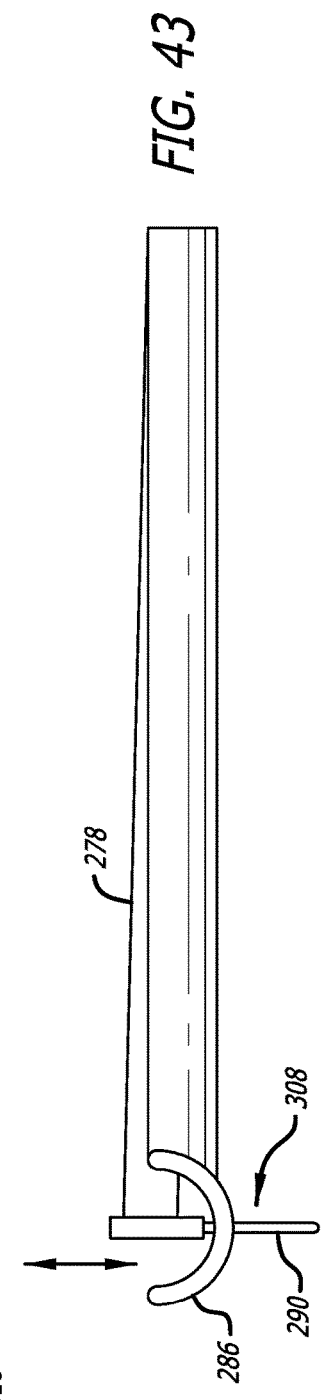

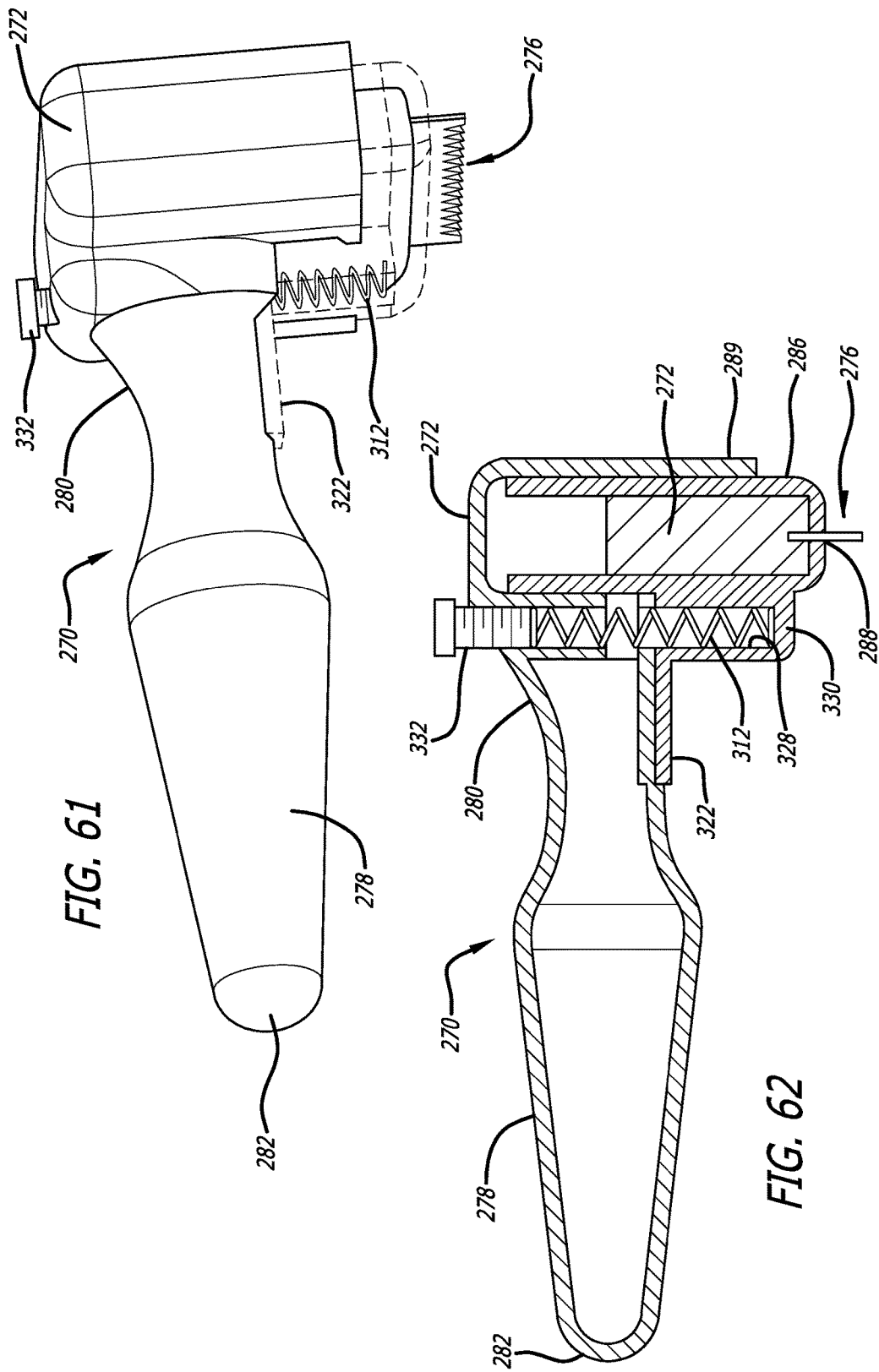

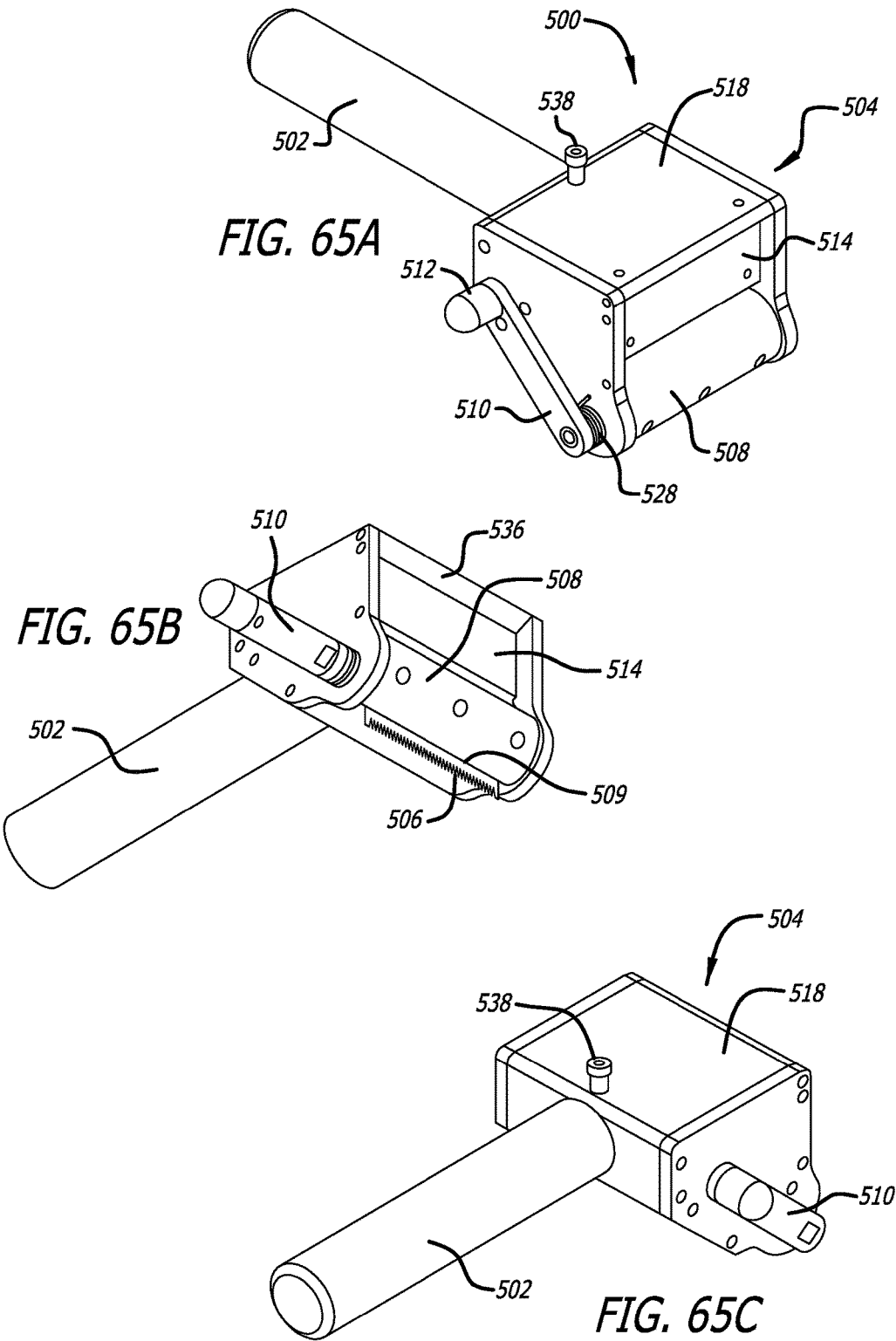

GROOMING DEVICE

CROSS-REFERENCES TO RELATED APPLICATIONS

This application is a divisional based on U.S. Ser. No. 13/947,457, filed on Jul. 22, 2013, which claims priority from U.S. Provisional Application No. 61/675,142, filed Jul. 24, 2012, U.S. Provisional Application No. 61/725,785, filed Nov. 13, 2012, and U.S. Provisional Application No. 61/675,171, filed Jul. 24, 2012, incorporated by reference in their entirety.

BACKGROUND

The invention generally relates to devices for grooming the hair, fur, or coat of animals, as well as human hair, and the hair, fur, or coat other objects including non-living objects, such as stuffed animals or toy animals, for example, and more particularly relates to a self-ejecting, stripping pet grooming device for rapidly grooming the hair, fur, or coat of animals or other objects, as well as human hair.

Devices are known for grooming the hair, fur, or coat of animals, commonly household pets such as a cat or a dog but also for other non-household animals such as horses. One of the purposes of such devices is to remove loose hair or de-shed, for example to reduce shedding in which the loose hair would otherwise fall off in unwanted places, such as around the house. Such devices can also be used to de-tangle hair for purposes of improving appearance and comfort. Some of these devices may also trim or cut non-loose hair. One group of currently available devices resemble a human hair brush or rake on a stick having combing elements mounted together on one end of an elongated handle to form a pet engaging portion.

A problem with such currently available de-shedding devices is that after a few strokes over the coat of the animal with such devices, the buildup of removed hair must be manually teased from the comb or the efficiency of the grooming process will diminish. Another problem with currently available de-shedding devices is that they do not contain a bag, compartment, or the like, to store removed hair during a grooming session, other than at the base of the teeth or on the combing elements themselves. Typically this involves manually pulling hair or fur from the teeth projecting from the comb. In addition, if the comb teeth or brush bristles are buried under already removed hair, they cannot pick up and pull additional loose strands of hair as easily. Further, cleaning the comb or brush manually between strokes slows down the grooming process, and creates the opportunity for a live animal, such as a cat, dog, horse, sheep, for example, to run away when the brushing stops while the buildup of hair is removed by the groomer.

Some de-shedding devices also include a blade region, for example at the base of the teeth. While the blade and teeth of de-shedders are generally not sharp enough to cut or clip hair, they can nonetheless have edges sharp enough such that pulling the hair off manually creates risk of injury for the operator's fingers and hands. In addition, if the comb's teeth are buried under already removed hair, they cannot pick up and pull additional loose strands of hair as easily. Another group of currently available devices resemble a comb combined with a blade or razor at the base of the comb, which may or may not be sharp enough to cut for clipping in addition to de-shedding and de-tangling. An additional problem with some of these grooming devices that makes them less than optimal is that they present a safety hazard, with the animal to be groomed potentially exposed to the sharper elements. If the groomer is not careful, is grooming quickly, or is applying too much pressure to the comb, the sharp projecting teeth or blade edges at the base of the comb may pierce the skin resulting in a negative experience for the animal. This may make the animal afraid of the grooming device such that it is psychologically conditioned to avoid future grooming sessions.

It would be desirable to provide a self-ejecting, stripping type of grooming device, which can be operated to rapidly collect loose hair and eject the collected hair to allow the collected hair to fall to the ground, for rapidly grooming the hair, fur, or coat of animals or other objects, as well as human hair. It also would be desirable to provide such a grooming device with one or more sets of hair collecting elements and one or more hair dislodging, cover or scraper elements movably positioned adjacent to the one or more sets of hair collecting elements and configured to dislodge hair collected on the one or more sets of hair collecting elements when the one or more hair dislodging, cover or scraper elements are moved adjacent to the one or more sets hair collecting elements, with the one or more hair dislodging, cover or scraper elements biased to sheathe the one or more sets hair collecting elements, in order to uncover the one or more sets of hair collecting elements of the grooming device to a limited extent when the grooming device is pressed to engage hair to be groomed, and to automatically eject hair collected on the one or more sets of hair collecting elements when the one or more hair dislodging, cover or scraper elements are released. It also would be desirable to provide a handle shield that could optionally be used to protect the user, while still allowing auto-ejection of collected hair. It also would be desirable to provide an optional vacuum hose attachment to allow rapid removal of collected hair. It also would be desirable to provide a grooming device for removing and collecting loose hair from an animal having a furry coat or other object to be groomed. The present invention meets these and other needs.

SUMMARY OF THE INVENTION

Briefly, and in general terms, the present invention provides for a self-ejecting, stripping type of grooming device, such as a comb or brush, which can be operated to rapidly collect loose hair, fur, or coat of animals or other objects to be groomed, as well as human hair, and to eject the collected hair to allow the collected hair to fall to the ground, to allow for rapid grooming. The grooming device includes a grooming device main body, and one or more sets of hair collecting elements fixedly attached to the grooming device main body and extending outwardly from the grooming device main body, the one or more sets of hair collecting elements being removably engageable with hair or fur to be groomed. One or more hair dislodging elements corresponding to the one or more sets of hair collecting elements are provided, having one or more hair dislodging surfaces movably positioned adjacent to the one or more sets of hair collecting elements and configured to dislodge hair collected on the one or more sets of hair collecting elements from the one or more sets of hair collecting elements when the one or more hair dislodging elements are moved adjacent to the one or more sets of hair collecting elements, the one or more hair dislodging elements being slidably engaged with the one or more sets of hair collecting elements for movement of the one or more hair dislodging elements between a first position in which at least one set of the one or more sets of hair collecting elements is exposed and extending beyond the one or more hair dislodging surfaces and a second position in which the one or more sets of hair collecting elements are not extending beyond the one or more hair dislodging surfaces, the one or more hair dislodging elements being biased to be in the second position in which the one or more hair dislodging elements are not extending beyond the one or more hair dislodging surfaces.

Accordingly, in a first embodiment, the present invention provides for a grooming device for removing loose hair or fur from an animal or any other similar suitable object to be groomed having hair or a furry coat, as well as human hair, including one or more sets of hair collecting elements, such as a comb portion having a plurality of teeth, and one or more hair dislodging elements, such as a slotted cover, including one or more hair dislodging or scraping surfaces slidably disposed over or adjacent to the one or more sets of hair collecting elements. The slotted cover preferably includes one or more comb teeth slots, such as a middle slot or an edge slot formed adjacent to an edge portion of the slotted cover, configured to receive the plurality of teeth of the one or more sets of hair collecting elements, and is moveable between a first position in which the plurality of teeth are exposed and extending out of the one or more comb teeth slots and a second position in which the plurality of teeth are sheathed and not extending out of the one or more comb teeth slots. Alternatively, in one variation, the one or more hair dislodging or scraping elements include an outer edge providing a hair dislodging or scraping surface movably positioned adjacent to the teeth of the one or more sets of hair collecting elements for dislodging or scraping hair collected from the teeth.

The one or more sets of hair collecting elements, or comb portion has a first end, a second end, and an elongated axis, the first end of the one or more sets of hair collecting elements, or comb portion, having a plurality of teeth extending parallel to the elongated axis and engageable with hair or fur to be groomed. The slotted cover has a generally cup shaped configuration with a first side wall, a second side wall and a middle side wall connected between the first and second side walls, and the middle side wall has a surface defining one or more comb teeth slots configured to receive the plurality of teeth of the one or more sets of hair collecting elements, or comb portion. The first, second and middle side walls define an interior chamber configured to slidably receive the first end of the one or more sets of hair collecting elements, or comb portion, and the one or more comb teeth slots are slidably disposed over the plurality of teeth. The slotted cover is slidably engaged with the one or more sets of hair collecting elements, or comb portion for movement of the slotted cover between a first position in which the plurality of teeth are exposed and extending out of the one or more comb teeth slots and a second position in which the plurality of teeth are sheathed and not extending out of the one or more comb teeth slots. The slotted cover is biased to be in the second position in which the plurality of teeth are sheathed and not extending out of the one or more comb teeth slots, such as by a compression spring. The teeth of the one or more sets of hair collecting elements, or comb portion are uncovered to a limited extent when the grooming device is pressed to engage the hair to be groomed, and the hair collected on the teeth of the one or more sets of hair collecting elements, or comb portion is automatically ejected when the grooming device is released.

In a presently preferred aspect, the slotted cover includes an elongated member extending within the interior chamber of the slotted cover, and the one or more sets of hair collecting elements, or comb portion has a corresponding slot having a first end and a second end and extending parallel to the elongated axis of the one or more sets of hair collecting elements, or comb portion, configured to slidably receive the elongated member of the slotted cover for slidable movement of the elongated member of the slotted cover between the first and second ends of the slot of the one or more sets of hair collecting elements, or comb portion, to thereby limit movement of the slotted cover between the first position and the second position of the slotted cover. In another presently preferred aspect, the grooming device includes a handle having a first end and a second end, the first end of the handle being mounted to the one or more sets of hair collecting elements, or comb portion, and the handle including a cup portion extending over and receiving the slotted cover.

In one variation of the first embodiment, the grooming device includes a handle having a first end mounted to the one or more sets of hair collecting elements, or comb portion, and a second end connected to a vacuum cover having a first end and a second end. The vacuum cover has a channel extending therethrough, and one end of the vacuum cover is configured to be connected to a vacuum line, while the other end of the vacuum cover forms a cup extending over and receiving the slotted cover for removing loose hair collected by the plurality of teeth when the slotted cover is in the second position in which the plurality of teeth are sheathed and not extending out of the one or more comb teeth slots.

In a second variation of the first embodiment, the handle of the grooming device can be elongated, and an end portion of the elongated handle can include a specialized handle grip portion.

In a third variation of the first embodiment, the handle of the grooming device can include a channel therein having an opening configured to be connected to a vacuum line.

In a fourth variation of the first embodiment, the one or more sets of hair collecting elements, or comb portion comprises a plate having a plurality of compression springs biasing the slotted cover to the second position sheathing the plurality of teeth of the one or more sets of hair collecting elements, or comb portion. The grooming device includes an elongated handle having a first end and a second end, and a first portion of the first end of the handle is pivotally connected to the one or more sets of hair collecting elements, or comb portion, while an opposing second portion of the first end of the handle is pivotally connected to the slotted cover.

In a second embodiment, the grooming device includes a first handle portion, one or more sets of hair collecting elements, such as a comb portion, and a second handle portion. The one or more sets of hair collecting elements, or comb portion has first and second ends, the first and second handle portions each have first and second ends, and the second end of the one or more sets of hair collecting elements, or comb portion is mounted to the first end of the first handle portion. The second end of the second handle portion is pivotally connected to the second end of the first handle portion, and one or more hair dislodging elements, such as a slotted cover, is mounted to the first end of the second handle portion. The slotted cover may include a middle slot or an edge slot formed adjacent to an edge portion of the slotted cover. Alternatively, in one variation, one or more hair dislodging or scraping elements, including an outer edge providing a hair dislodging or scraping surface movably positioned adjacent to the teeth of the one or more sets of hair collecting elements, or comb portion for dislodging or scraping hair collected from the teeth, may be substituted for the slotted cover.

The first and second handle portions are biased apart, such as by one or more compression springs, for example, such that the slotted cover is biased to be in the second position. In a presently preferred aspect, the one or more sets of hair collecting elements, or comb portion is pivotally mounted to the first end of the first handle portion. In another presently preferred aspect, the grooming device includes an elongated handle shield having a generally cup shaped configuration with a first side wall, a second side wall and a middle side wall connected between the first and second side walls, and the first handle portion includes first and second slotted side portions configured to removably receive the first and second side walls of the elongated handle shield to cover the second handle portion. In another presently preferred aspect, the elongated handle shield does not cover a portion of the second handle portion, thereby allowing a user to move the second handle portion to move the slotted cover to the first position in which the plurality of teeth are exposed and extending out of the slot.

In a third embodiment, the grooming device includes one or more sets of hair collecting elements or teeth, and one or more hair dislodging elements, such as a cover or scraper, preferably spring loaded over one or more sets of hair collecting elements or teeth of the device, so that the one or more hair dislodging elements, such as a cover or scraper, automatically uncovers the one or more sets of hair collecting elements or teeth of the grooming device to a limited extent when the grooming device is pressed to engage hair to be groomed, and the cover or scraper is biased to scrape the one or more sets of hair collecting elements or teeth of the grooming device to automatically eject hair collected on the one or more sets of hair collecting elements or teeth of the grooming device when the grooming device is released, although the cover or scraper may optionally include a button or handle to allow a user to manually control operation of the engagement of hair to be groomed by the device and ejection of hair collected. The one or more hair dislodging elements, such as a cover or scraper, includes one or more hair dislodging or scraping surfaces provided by one or more slots, such as a middle slot, an edge slot formed adjacent to an edge portion of the cover or scraper, or an outer edge of the cover or scraper. In one presently preferred aspect, one or more return or compression springs is mounted in one or more corresponding spring chambers in the grooming device main body rearwardly of the one or more sets of hair collecting elements. In another presently preferred aspect, the one or more hair dislodging elements are biased to be in the second position in which the one or more hair dislodging elements are not extending beyond the one or more hair dislodging surfaces by one or more leaf springs.

In one of further several aspects, the present invention provides for a grooming device for removing and collecting loose hair from an animal having a furry coat or other object to be groomed. The grooming device includes one or more comb portions having teeth engageable with hair of an animal having a furry coat or of another object to be groomed, and a hair collection chamber connected to the one or more comb portions. In a presently preferred aspect, the one or more comb portions are configured to rotate. In another presently preferred aspect, the one or more comb portions are also configured to be locked in a fixed position, such that hair is retained by the teeth as the animal or other object is groomed when the one or more comb portions are locked in a fixed position, and rotation of the one or more comb portions after grooming removes hair from the teeth. In another presently preferred aspect, the grooming device includes a surface through which the teeth of the one or more comb portions extend, wherein the one or more comb portions are configured to recede behind the surface to release hair that has been retained by the teeth. In another presently preferred aspect, the grooming device includes a handle portion operatively connected to the hair collection chamber and the one or more comb portions, wherein the handle portion has an elongated axis that is offset from an axis along which the device is configured to be pulled or pushed to engage the teeth of the one or more comb portions with hair of an animal having a furry coat or other object to be groomed.

In another presently preferred aspect, the hair collection chamber includes an interior defined by a plurality of surfaces including two side walls, and the device includes a rotatable dowel disposed between the two side walls of the hair collection chamber, the one or more comb portions connected to the dowel whereby the one or more comb portions are rotated as the dowel is rotated. A rotatable barrel having a slit along an outer wall thereof configured to receive at least the teeth of the one or more comb portions is disposed between the two side walls of the hair collection chamber, with the rotatable dowel fitting within the rotatable barrel. A scraper having at least a portion thereof disposed tangentially to an outer surface of the rotatable barrel is also preferably mounted to an inside of a wall of the hair collection chamber. A side lever is also preferably mounted to the hair collection chamber, exteriorly of the chamber and aligned with an elongated axis of the dowel, for rotating the rotatable dowel and the one or more comb portions with the rotatable dowel, wherein the device is configured such that after the one or more comb portions has collected hair from an animal or other object of grooming, as the side lever is manipulated to rotate the rotatable dowel and with it the one or more comb portions, the teeth of the one or more comb portions enter the interior of the hair collection chamber, and as the teeth do so the teeth recede within the rotatable barrel through the slit to deposit hair on the outer surface of the rotatable barrel. As the one or more comb portions are further rotated via the dowel to move past the scraper, the scraper applies pressure to the barrel to scrape hair from the outer surface of the barrel, the hair being retained in the hair collection chamber as the dowel, and comb portion connected thereto, is rotated further beyond the scraper to expose the teeth outside of the hair collection chamber for re-introduction with loose hair of the animal or other object of grooming. Alternatively, the barrel may be rotated by a hand pump drive mechanism, or by an electric motor.

In another presently preferred aspect, the dowel and the barrel around the dowel are disposed between side walls of the hair collection chamber in an offset configuration, a center of the dowel being non-concentric with a center of the barrel. In another presently preferred aspect, the offset configuration is such that a length of the teeth extending beyond an outer surface of the barrel varies as the one or more comb portions are rotated.

In another presently preferred aspect, the grooming device includes a door disposed on at least one of the plurality of surfaces of the hair collection chamber, with the door configured to be opened to remove collected hair from the hair collection chamber. In another presently preferred aspect, the inside of a wall of the hair collection chamber to which the scraper is mounted is the inside of a front wall, the front wall forming a common corner with the door, wherein as the door is opened by pivoting about the common corner the inside of the front wall and the scraper mounted to the inside of the front wall pivot with the door. In another presently preferred aspect, a first portion of the scraper is mounted flat against the inside of the front wall and the scraper curves into a second portion configured tangentially to a surface of the rotatable barrel, such that as the door is opened the scraper moves away from the surface of the barrel, whereby hair, including caught or tangled hair, can easily be removed from the scraper and from the barrel to clean the device.

In another of several aspects, the present invention provides for a grooming device for removing and collecting loose hair from an animal having a furry coat or other object to be groomed, including one or more comb portions having teeth engageable with hair of an animal having a furry coat or other object to be groomed, the teeth of the one or more comb portions being configured to extend through a surface, and the teeth of the one or more comb portions being configured to recede behind the surface to release hair that has been retained by the teeth. In another presently preferred aspect, the grooming device includes a scraper configured to remove hair from the surface that has been deposited by the teeth of the receding comb portion. In another presently preferred aspect, the grooming device includes a handle separated from the one or more comb portions but indirectly connected to the one or more comb portions whereby movement of the handle also moves the one or more comb portions, wherein an elongated axis of the handle is offset from an axis along which the device is configured to be pulled or pushed to engage the teeth of the one or more comb portions with hair of an animal having a furry coat or other object to be groomed.

In another presently preferred aspect, the hair collection chamber includes an interior defined by a plurality of surfaces including two side walls, and the one or more comb portions comprises a plurality of comb portions. The grooming device further includes a rotatable dowel disposed between the two side walls of the hair collection chamber, each of the plurality of comb portions being connected to the rotatable dowel at a unique position whereby the plurality of comb portions are rotated as the rotatable dowel is rotated. A plurality of sliding plates, each of the sliding plates corresponding to a separate one of the plurality of comb portions, are disposed between the two side walls of the hair collection chamber within a common track defined between an outer loop ridge and an inner loop ridge, both the outer loop ridge and the inner loop ridge being disposed on an inside of each side wall. The plurality of sliding plates are disposed around the rotatable dowel, and each of the sliding plates have a slit configured to receive at least the teeth of a corresponding one of the plurality of comb portions. A scraper mounted to an inside of a wall of the hair collection chamber has at least a portion thereof disposed tangentially to an outer surface of the plurality of sliding plates. A knob is mounted to the hair collection chamber, exteriorly of the chamber and aligned with an elongated axis of the dowel, for rotating the rotatable dowel and the plurality of comb portions with the rotatable dowel. The device is configured such that after the plurality of comb portions have collected hair from an animal or other object of grooming, as the knob is manipulated to rotate the rotatable dowel and with it the plurality of comb portions, the teeth of each of the plurality of comb portions enter the interior of the hair collection chamber, the teeth of each of the plurality of comb portions receding within the corresponding sliding plate for each of the plurality of comb portions through the slit in the sliding plate to deposit hair on the outer surface of the sliding plate. As the plurality of comb portions is further rotated via the rotatable dowel to move each of the plurality of comb portions past the scraper, the scraper applies pressure to the corresponding sliding plate for each of the plurality of comb portions to scrape hair from the outer surface of the sliding plate, the hair being retained in the hair collection chamber as the rotatable dowel, and each of the plurality of comb portions connected thereto, is rotated further beyond the scraper to expose the teeth of each of the plurality of comb portions outside of the hair collection chamber for re-introduction with loose hair of the animal or other object of grooming.

In another of several aspects, the present invention provides for a method of de-shedding an animal having a furry coat or other object to be groomed. An animal or other object having a coat of fur is stroked with a grooming device including one or more comb portions with teeth configured to engage hair or fur, and a hair collection chamber, the grooming device is manipulated to remove hair from the teeth, and hair removed from the teeth is collected within the hair collection chamber of the grooming device. In a presently preferred aspect, manipulating the grooming device to remove hair from the teeth involves turning a lever on the grooming device to rotate a dowel upon which the one or more comb portions are mounted, thereby also rotating the one or more comb portions, the dowel being housed within a hair collection chamber of the grooming device, continuing to rotate the dowel and comb portion mounted thereon until the teeth of the one or more comb portions enter the hair collection chamber and pass by a protected scraper within the chamber, at least a portion of the scraper being configured tangentially to an outer surface of a barrel disposed around the dowel, and scraping hair retained by the teeth from the outer surface of the barrel with the scraper as the one or more comb portions are rotated past the scraper. In another presently preferred aspect, the teeth recede behind the outer surface of the barrel through a slit along a wall of the barrel as the teeth approach the scraper. In another presently preferred aspect, the method involves continuing to turn the lever until the one or more comb portions are oriented for the teeth to re-engage with hair of an animal or other object having a coat of fur. In another presently preferred aspect, a door disposed along a surface of the hair collection chamber is opened, and collected hair or fur within the chamber is removed to clean the device so that it can be used again to accommodate more hair or fur.

Other features and advantages of the present invention will become more apparent from the following detailed description of the preferred embodiments in conjunction with the accompanying drawings, which illustrate, by way of example, the operation of the invention.

BRIEF DESCRIPTION OF THE DRAWINGS

FIG. 7 is a schematic side view of the pet grooming device of FIG. 5, showing the comb portion and teeth extended.

FIG. 8 is a schematic bottom view of the pet grooming device of FIG. 5.

FIG. 9 is a schematic side view of the pet grooming device of FIG. 5, showing the comb portion and teeth retracted.

FIG. 13 is an exploded perspective view of a third variation of the pet grooming device of FIG. 1.

FIG. 14 is a perspective view of the pet grooming device of FIG. 13, showing the teeth extended.

FIG. 20 is a schematic side view of the pet grooming device of FIG. 15, showing the teeth retracted.

FIG. 21 is a schematic side view of the pet grooming device of FIG. 15, showing the teeth extended.

FIG. 34 is a perspective view of another embodiment of the pet grooming device according to the present invention, with different comb blades and a grip on the handle.

FIG. 35 is an elevational view of the comb blades of FIG. 34.

FIG. 36 is a schematic diagram of an elevational view of another variation of the grooming device with a cover or scraper including a button allowing manual control of ejection of hair collected, showing the cover or scraper released for ejecting hair collected.

FIG. 37 is a schematic diagram similar to that of FIG. 36, showing the cover or scraper in a position with the grooming device pressed for grooming of hair.

FIG. 38 is a perspective view of a variation of the pet grooming device of FIG. 34.

FIG. 39 is a schematic diagram of an elevational view of another variation of the grooming device with a cover or scraper including a tab allowing manual control of ejection of hair collected, showing the cover or scraper released for ejecting hair collected.

FIG. 40 is a schematic diagram similar to that of FIG. 39, showing the cover or scraper in a position with the grooming device pressed for grooming of hair.

FIG. 41 is a perspective view of another variation of the pet grooming device of FIG. 15 including a pin comb.

FIG. 42 is an elevational view of the grooming device of FIG. 41, showing the cover or scraper released for ejecting hair collected.

FIG. 43 is an elevational view similar to FIG. 42, showing the cover or scraper in a position with the grooming device pressed for grooming of hair.

FIG. 61 is a perspective view of a variation of the embodiment of FIG. 34, schematically showing placement of a compression spring rearwardly of the one or more hair dislodging or scraping elements.

FIG. 62 is a sectional view of the variation of FIG. 61.

FIG. 65A is a front/side perspective view, from above, of a grooming device in accordance with a fourth embodiment of the present invention, in which the door to the hair collection chamber is closed and the side lever is in a position in which the comb is exposed.

FIG. 65B is a front/side perspective view, from below, of the grooming device of FIG. 65A.

FIG. 65C is a rear/side perspective view, from above, of the grooming device of FIG. 65A.

DETAILED DESCRIPTION OF THE PREFERRED EMBODIMENTS

Figure 1:
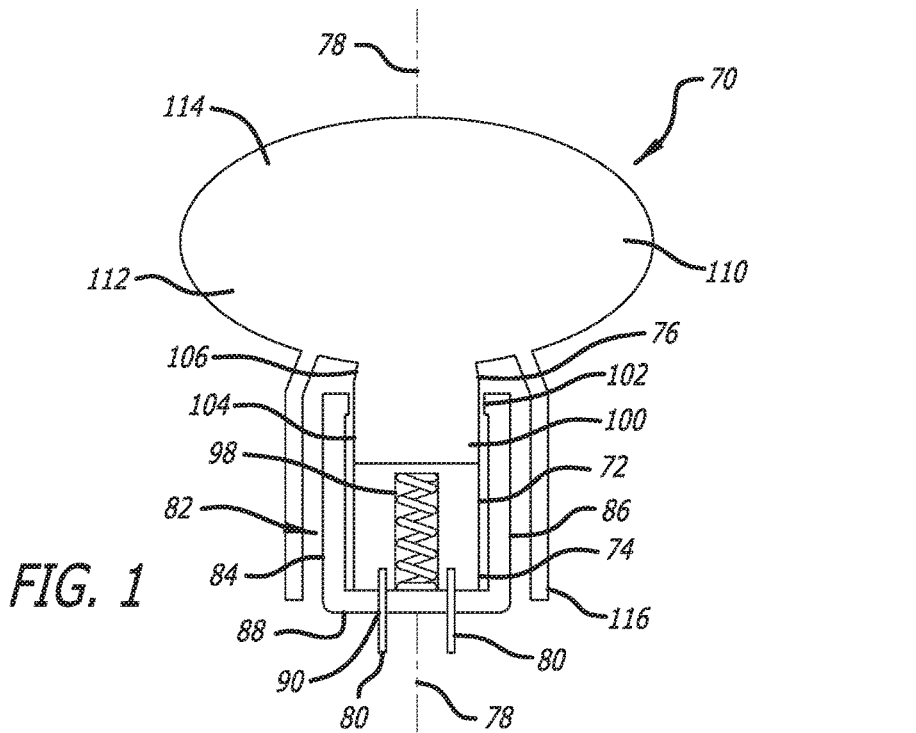
FIG. 1 is a schematic side view of a first embodiment of the pet grooming device of the invention.
Figure 2:
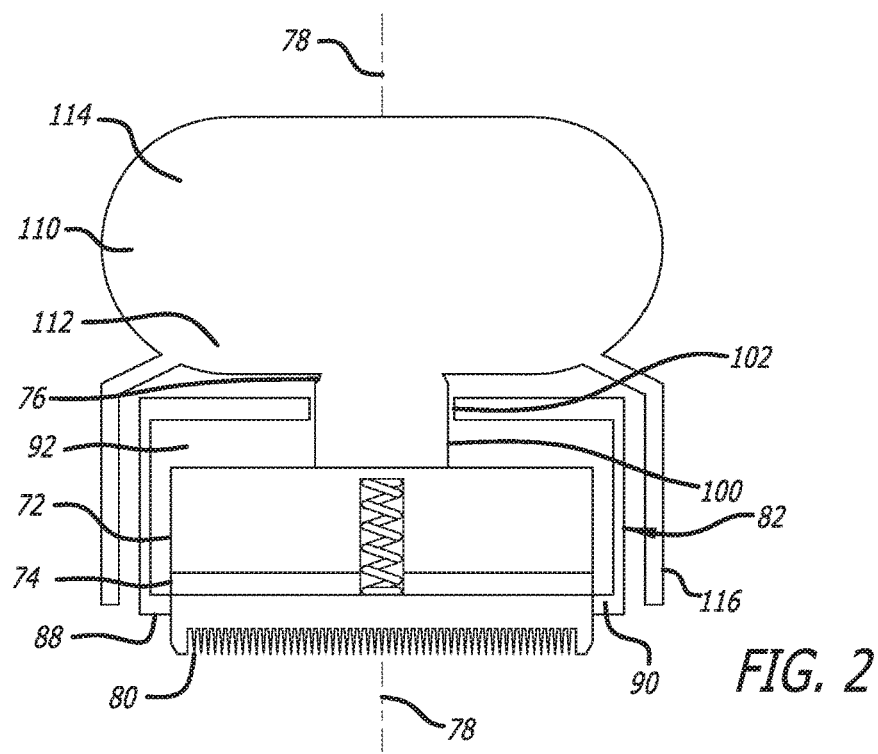
FIG. 2 is a schematic front view of the pet grooming device of FIG. 1.
Figure 3:
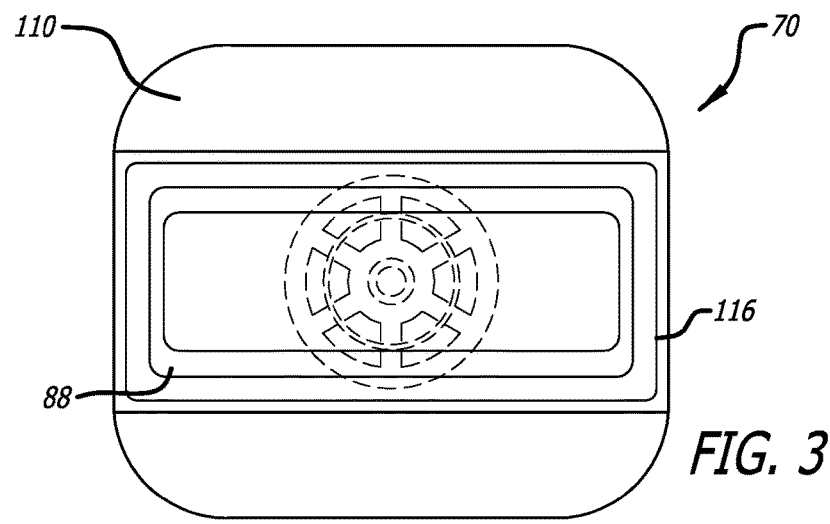
FIG. 3 is a schematic bottom view of the pet grooming device of FIG. 1.
Figure 4:
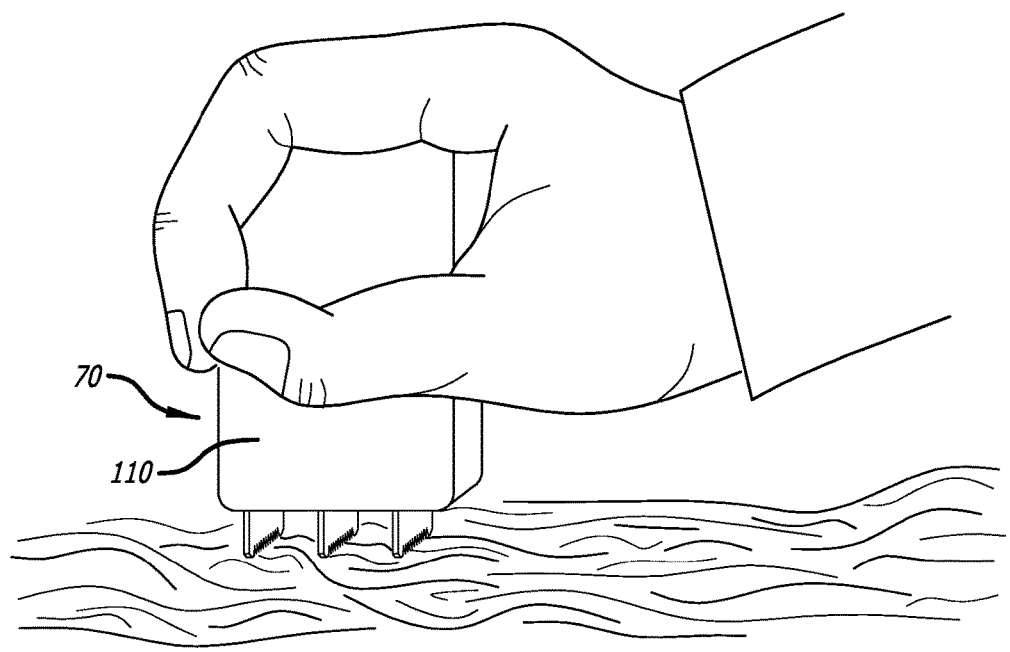
FIG. 4 is a perspective view of the pet grooming device of FIG. 1.
Figure 5:
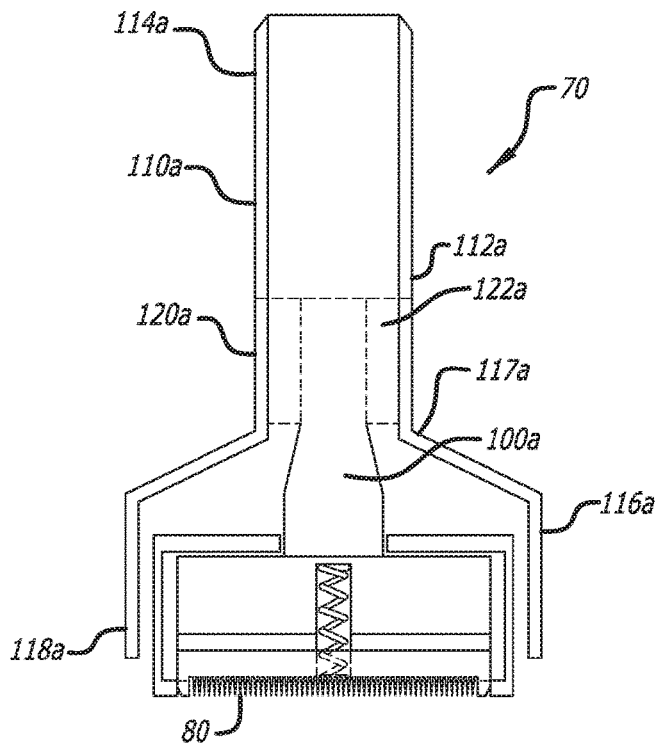
FIG. 5 is a schematic front view of a first variation of the pet grooming device of FIG. 1, showing the comb portion and teeth retracted.
Figure 6:
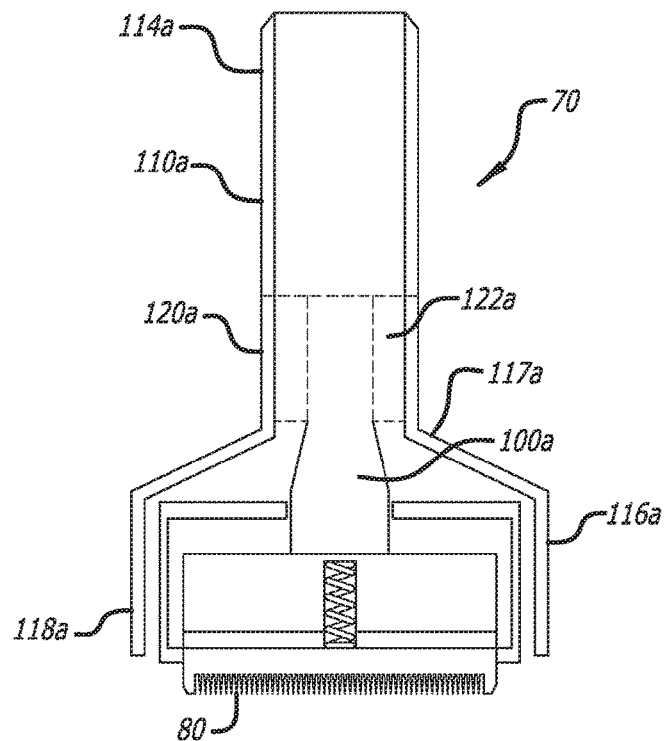
FIG. 6 is a schematic front view of the pet grooming device of FIG. 5, showing the comb portion and teeth extended.

Referring to the drawings, which are provided for purposes of illustration by way of example, and not by way of limitation, in a first embodiment, the present invention provides for a grooming device 70 for removing loose hair or fur, such as from an animal having a furry coat, or another object to be groomed, for example. As is illustrated in FIGS. 1-4, the grooming device includes one or more sets of hair collecting elements, or comb portion 72 having a first end 74, a second end 76, and an elongated axis 78, and the first end of the comb portion preferably has a plurality of teeth 80 that extend substantially parallel to the elongated axis of the comb portion, and that are engageable with hair or fur to be groomed. The grooming device advantageously also includes a slotted cover 82 having a generally cup shaped configuration. The slotted cover includes a first side wall 84, a second side wall 86, and a middle side wall 88 connected between the first and second side walls. The middle side wall preferably has a surface defining one or more comb teeth slots 90, such as a middle slot or an edge slot formed adjacent to an edge portion of the slotted cover, configured to receive the plurality of teeth of the comb portion, and the first, second and middle side walls define an interior chamber 92 configured to slidably receive the first end of the comb portion. Alternatively, in one variation, the slotted cover may also include an outer edge surface providing a hair dislodging or scraping surface configured to be movably positioned adjacent to the teeth of the comb portion for dislodging or scraping hair collected from the teeth.

The one or more comb teeth slots are slidably disposed over the plurality of teeth, and the slotted cover is slidably engaged with the comb portion for movement of the slotted cover between a first position, in which the plurality of teeth are exposed and extending out of the one or more comb teeth slots, and a second position, in which the plurality of teeth are sheathed and not extending out of the one or more comb teeth slots. The slotted cover is biased to be in the second position in which the plurality of teeth are sheathed and not extending out of the one or more comb teeth slots, such as by one or more compression springs 98, typically disposed in the interior chamber between the middle wall of the slotted cover and a portion of the comb portion, such as an elongated member 100 extending within the interior chamber of the slotted cover. The teeth of the comb portion are uncovered to a limited extent when the grooming device is pressed to engage the hair to be groomed, and the hair collected on the teeth of the comb portion is automatically ejected when the grooming device is released.

The slotted cover also includes another opening or comb portion slot 102 defined in the surface of the slotted cover between the first and second side walls of the slotted cover and generally opposing the one or more comb teeth slots, configured to slidably receive the elongated member of the comb portion for slidable movement of the slotted cover between a first end portion 104 and a second end portion 106 of the elongated member of the comb portion, to thereby limit movement of the slotted cover between the first position and the second position of the slotted cover.

The comb portion preferably also includes a handle portion 110 having a first end 112 and a second end 114 configured to be gripped by a user. The first end of the handle is connected to the elongated member of the comb portion, and in one presently preferred aspect, the handle may also optionally include a cup portion 116 extending over and receiving the slotted cover.

In a first variation of the first embodiment, shown in FIGS. 5-9, the grooming device includes a handle 110*a* having a first end 112*a*, and a second end 114*a*. The first end of the handle is connected to the elongated member 100*a* of the comb portion, and can be connected to a vacuum cover 117*a* having a first end 118*a* and a second end 120*a*. The vacuum cover advantageously includes a channel 122*a* extending therethrough, and the first end of the vacuum cover is configured to be connected optionally to a vacuum line 124*a*. The second end of the vacuum cover is integrally connected to the cup portion 116*a* that extends over and receives the slotted cover, for removing loose hair collected by the plurality of teeth by suction from the vacuum line when the slotted cover is in the second position, in which the plurality of teeth are sheathed and not extending out of the one or more comb teeth slots.

Figure 10:
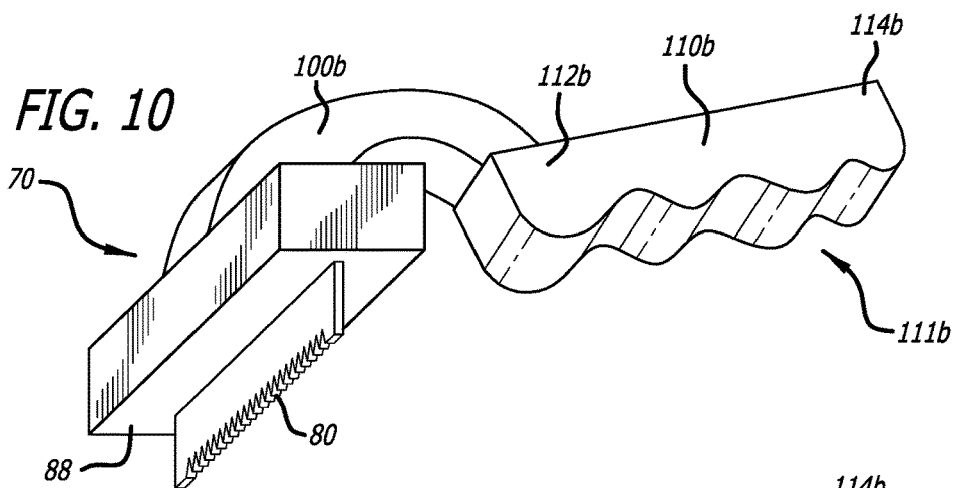
FIG. 10 is a perspective view of a second variation of the pet grooming device of FIG. 1, showing the comb portion and teeth extended.
Figure 11:
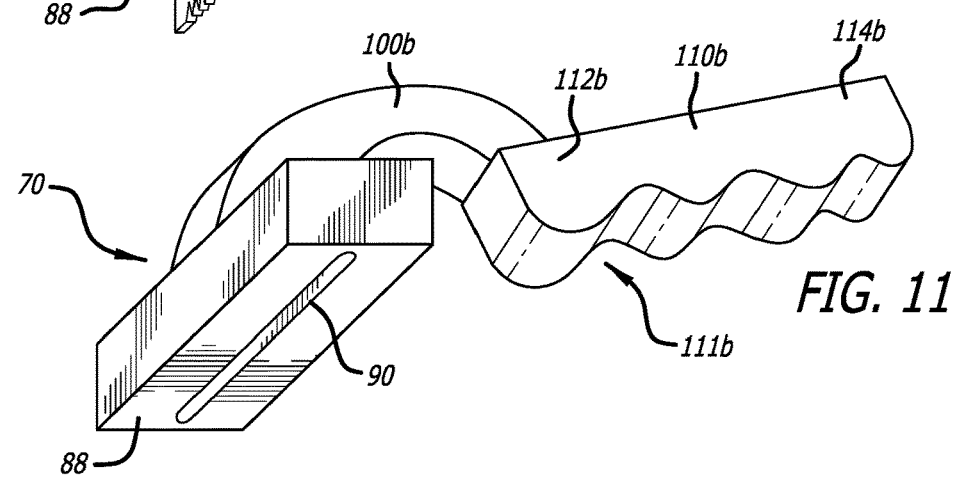
FIG. 11 is a perspective view of the pet grooming device of FIG. 10, showing the comb portion and teeth retracted.
Figure 12:
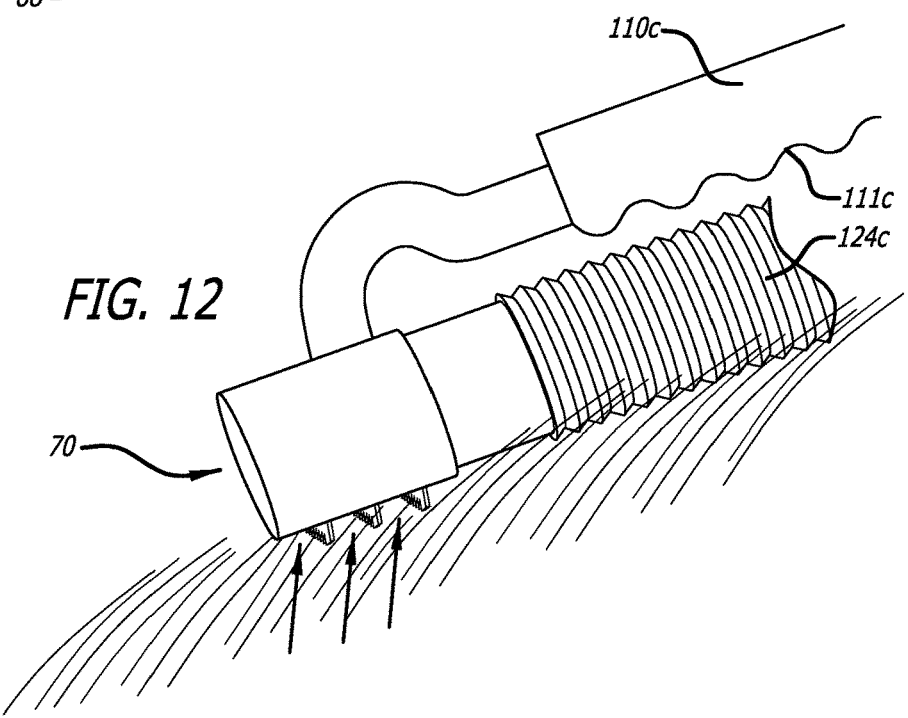
FIG. 12 is a perspective view of a second variation of the pet grooming device of FIG. 1, showing the comb portion and teeth extended.
Figure 15:
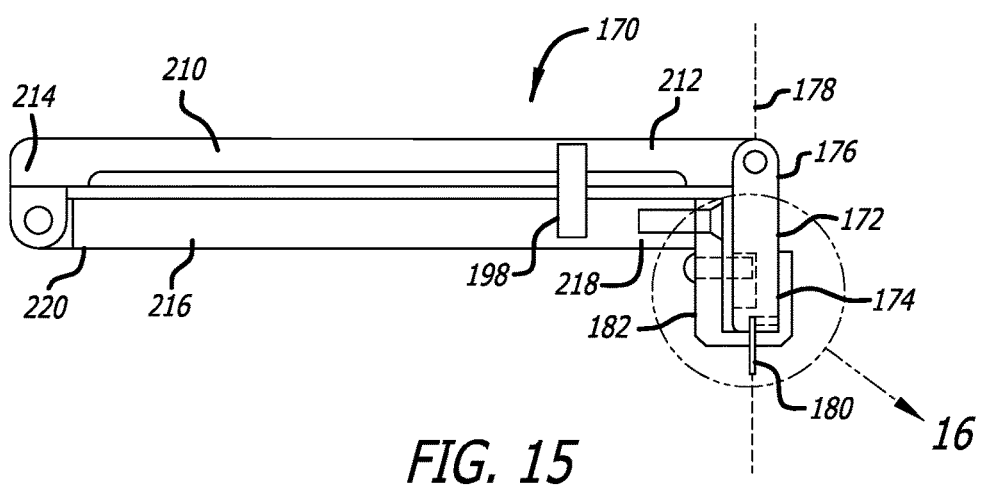
FIG. 15 is a schematic side view of a second embodiment of the pet grooming device of the invention, showing the teeth extended.
Figure 16:
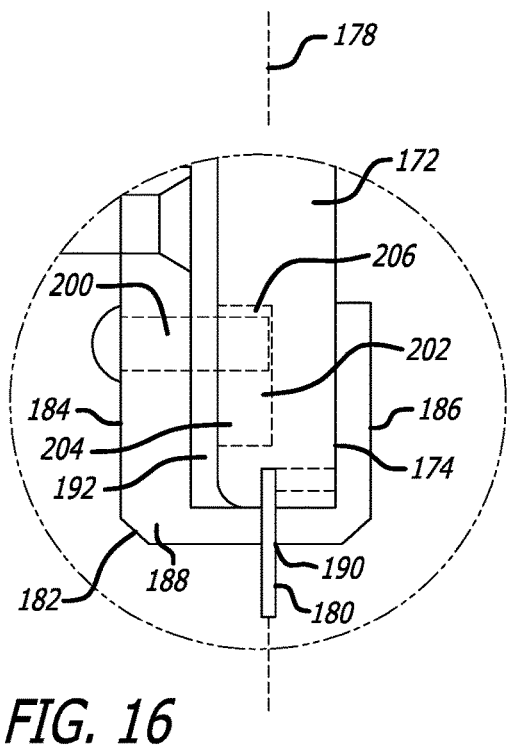
FIG. 16 is an enlarged view of a portion of FIG. 15.
Figure 17:
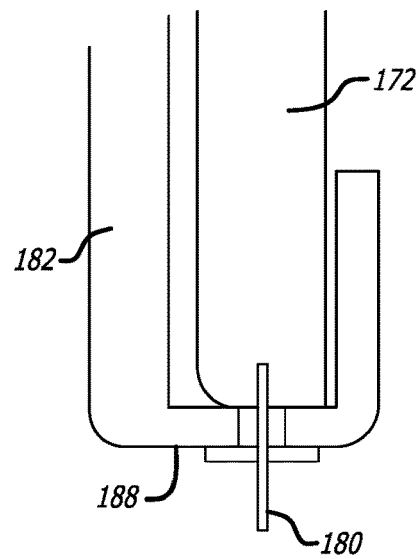
FIG. 17 is an enlarged view of a portion of FIG. 15 similar to FIG. 16, illustrating a floating slotted wiper plate through which the teeth pass.
Figure 18:
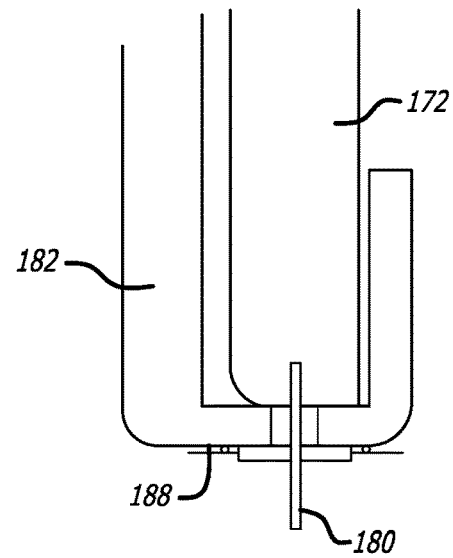
FIG. 18 is an enlarged view of a portion of FIG. 15 similar to FIG. 16, illustrating spring loaded wipers adjacent to the teeth.
Figure 19:
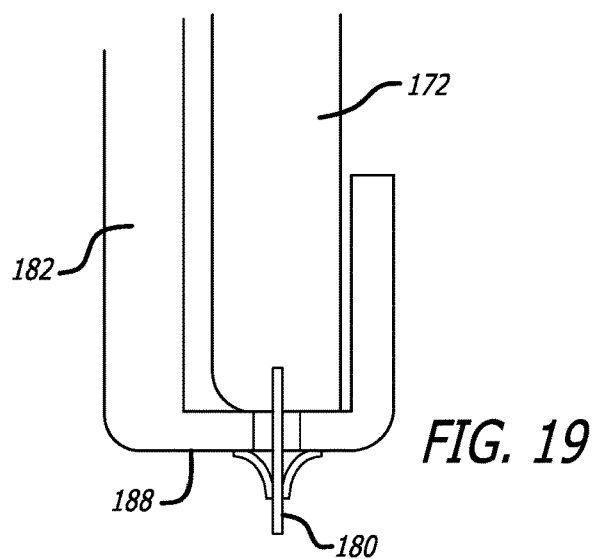
FIG. 19 is an enlarged view of a portion of FIG. 15 similar to FIG. 16, illustrating flexible wipers adjacent to the teeth.
Figure 22:
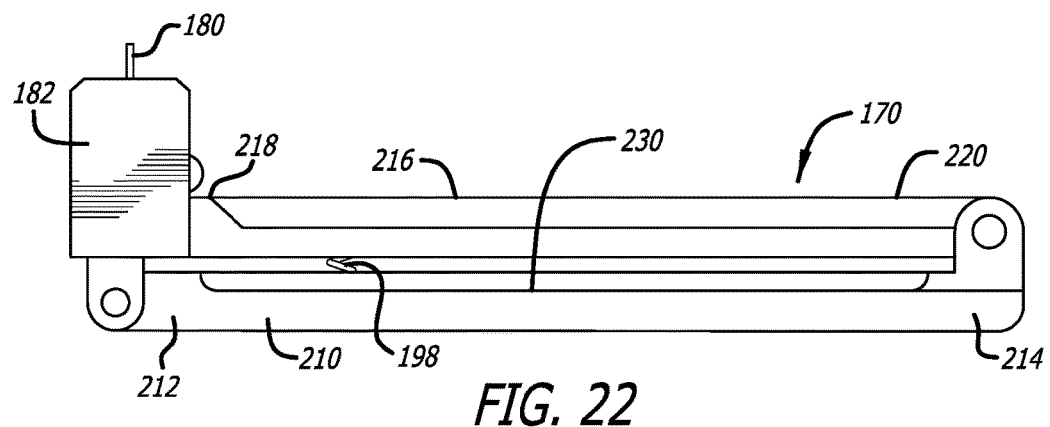
FIG. 22 is a side elevational view of the pet grooming device of FIG. 15, showing the teeth extended.
Figure 23:
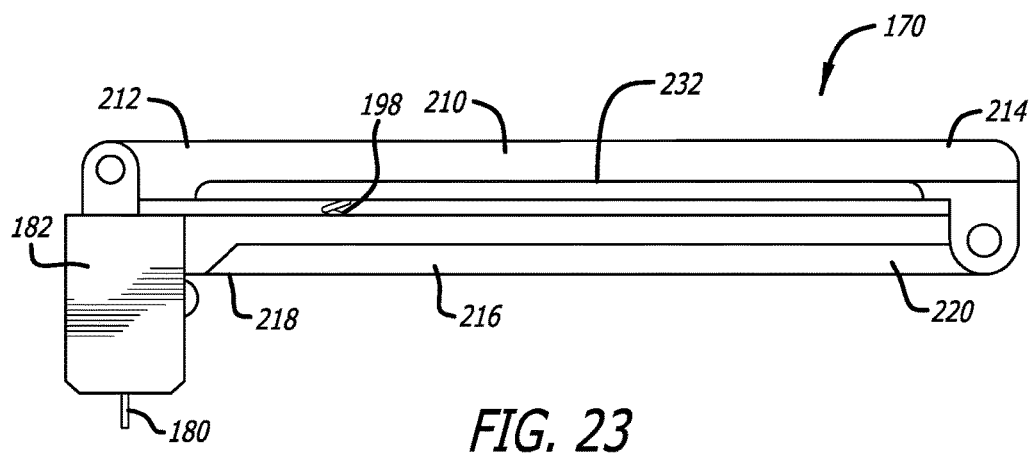
FIG. 23 is a side elevational view of the pet grooming device of FIG. 15, showing the opposing side of the device, with the teeth extended.
Figure 24:
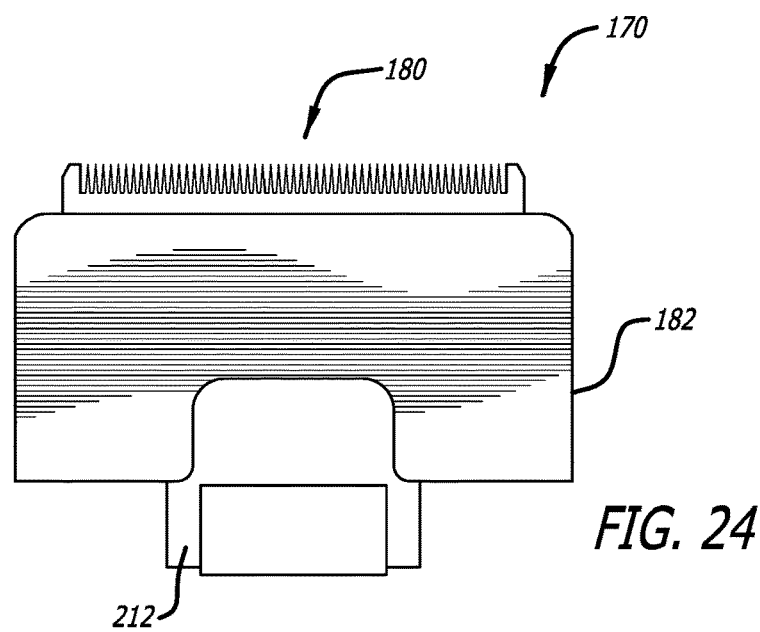
FIG. 24 is a front view of the pet grooming device of FIG. 15, showing an enlarged view of the teeth when extended.
Figure 25:
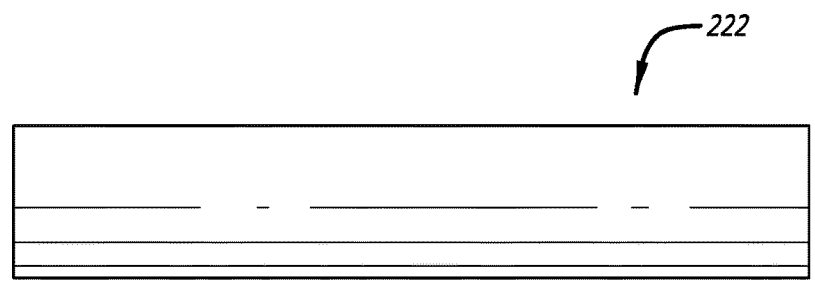
FIG. 25 is a top view of an optional elongated shield for the pet grooming device of FIG. 15.

In a second variation of the first embodiment, illustrated in FIGS. 10-11, the handle 110*b* can be elongated, having a first end 112*b* and second end 114*b*, with the first end connect to an elongated member 100*b* and at least a portion of the handle optionally including a specialized handle grip portion 111*b*. In a third variation of the first embodiment shown in FIG. 12, in which the handle 110*c* is elongated and the second end of the handle may include a specialized handle grip portion 111*c*, the slotted cover can include a channel (not shown) therein having an opening (not shown) configured to be connected to a vacuum line 124*c*.

In a fourth variation of the first embodiment, illustrated in FIGS. 13-14, the comb portion comprises a plate 73 having a plurality of compression springs 98 biasing the slotted cover 82 to the second position sheathing the plurality of teeth of the comb portion. The grooming device includes a handle 110*d* having a first end 112*d* and a second end 114*d*, and may also optionally include a specialized hand grip portion 111*d*. A first portion 128 connected by an elongated member 100*d* to the first end of the handle is pivotally connected to the comb portion, and an opposing second portion 130 of the first end of the handle is pivotally connected to the slotted cover.

In a second embodiment illustrated in FIGS. 15-32, the grooming device 170 for removing loose hair or fur to be groomed includes one or more sets of hair collecting elements, or comb portion 172 having a first end 174, a second end 176, and an elongated axis 178, and the first end of the comb portion preferably has a plurality of teeth 180 extending parallel to the elongated axis so as to be engageable with hair or fur to be groomed.

The grooming device also includes a slotted cover 182 having a generally cup shaped configuration, with a first side wall 184, a second side wall 186, and a middle side wall 188 connected between the first and second side walls. The middle side wall preferably has a surface defining one or more comb teeth slots 190, such as a middle slot or an edge slot formed adjacent to an edge portion of the slotted cover, configured to slidably receive the plurality of teeth of the comb portion, and the first, second and middle side walls define an interior chamber 192 configured to slidably receive the first end of the comb portion. Alternatively, in one variation, the slotted cover may also include an outer edge surface providing a hair dislodging or scraping surface configured to be movably positioned adjacent to the teeth of the comb portion for dislodging or scraping hair collected from the teeth.

The one or more comb teeth slots are slidably disposed over the plurality of teeth, and the slotted cover is slidably engaged with the comb portion for movement of the slotted cover between a first position, in which the plurality of teeth are exposed and extending out of the one or more comb teeth slots, and a second position, in which the plurality of teeth are sheathed and not extending out of the one or more comb teeth slots. The slotted cover is biased to be in the second position in which the plurality of teeth are sheathed and not extending out of the one or more comb teeth slots, such as by one or more compression springs 198. The slotted cover includes an elongated member 200 extending within the interior chamber of the slotted cover, and the comb portion includes a slot 202 extending parallel to the elongated axis of the comb portion. The slot of the comb portion has a first end 204 and a second end 206, and is configured to slidably receive the elongated member of the slotted cover for slidable movement of the elongated member of the slotted cover between the first and second ends of the slot of the comb portion, to thereby limit movement of the slotted cover between the first position and the second position of the slotted cover. The teeth of the comb portion are uncovered to a limited extent when the grooming device is pressed to engage the hair to be groomed, and the hair collected on the teeth of the comb portion is automatically ejected when the grooming device is released.

Referring to FIGS. 15, 20-23 and 27-32, the grooming device includes a first handle portion 210, having a first end 212 and a second end 214, and the second end of the comb portion is pivotally mounted to the first end of the first handle portion. The grooming device also includes a second handle portion 216 having a first end 218 and a second end 220, and the second end of the second handle portion is pivotally connected to the second end of the first handle portion. The slotted cover is mounted to the first end of the second handle portion, and the first and second handle portions are biased apart such that the slotted cover is biased to be in the second position, such as by a compression spring 198.

Figure 26:
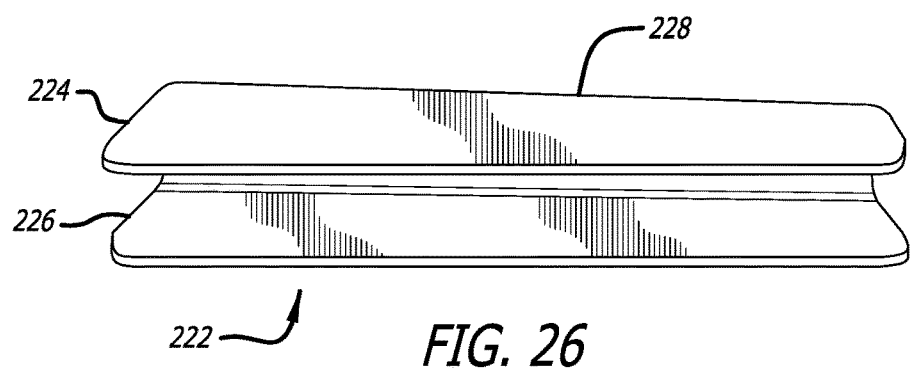
FIG. 26 is a bottom perspective view of the optional elongated shield of FIG. 25.
Figure 27:
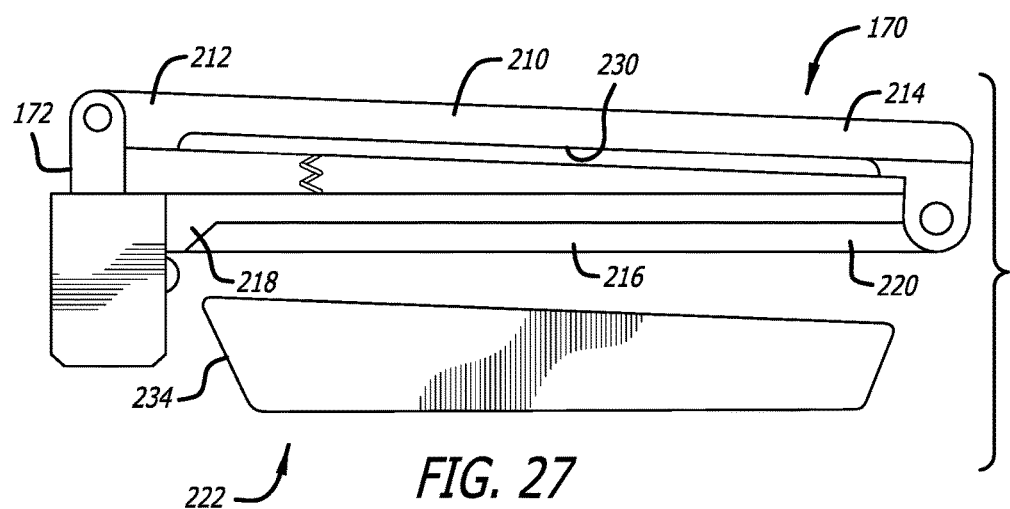
FIG. 27 is a side elevational exploded view of the pet grooming device of FIG. 15 with the optional elongated shield of FIG. 25.
Figure 28:
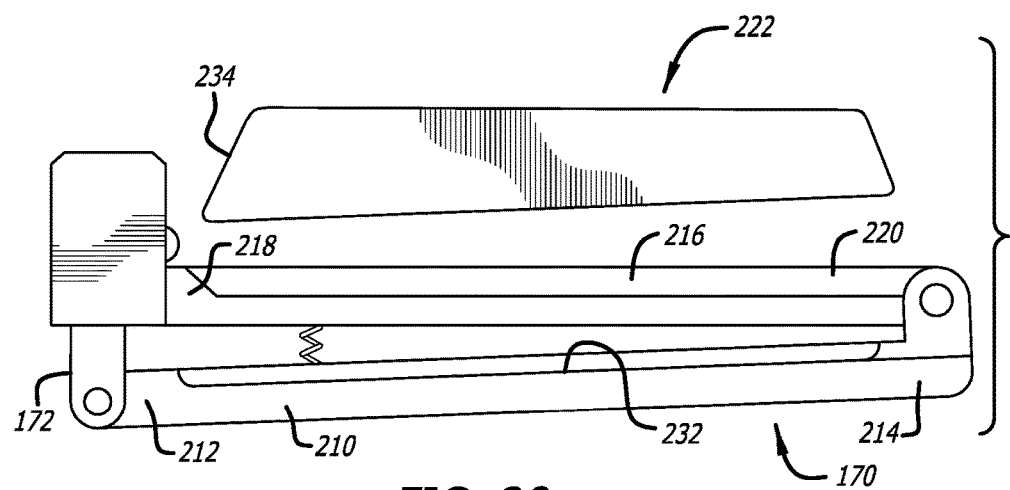
FIG. 28 is a side elevational exploded view similar to FIG. 27, showing the opposing side.
Figure 29:
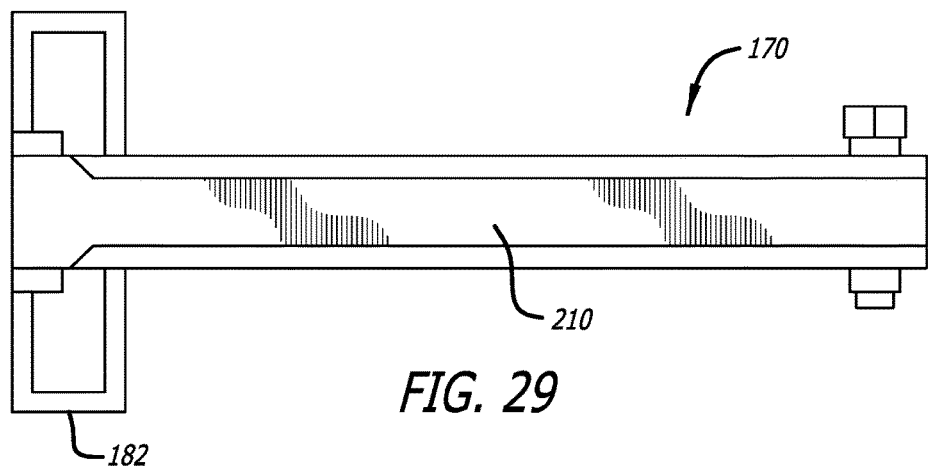
FIG. 29 is a top view of the pet grooming device of FIG. 15, with the optional elongated shield of FIG. 25 installed.
Figure 30:
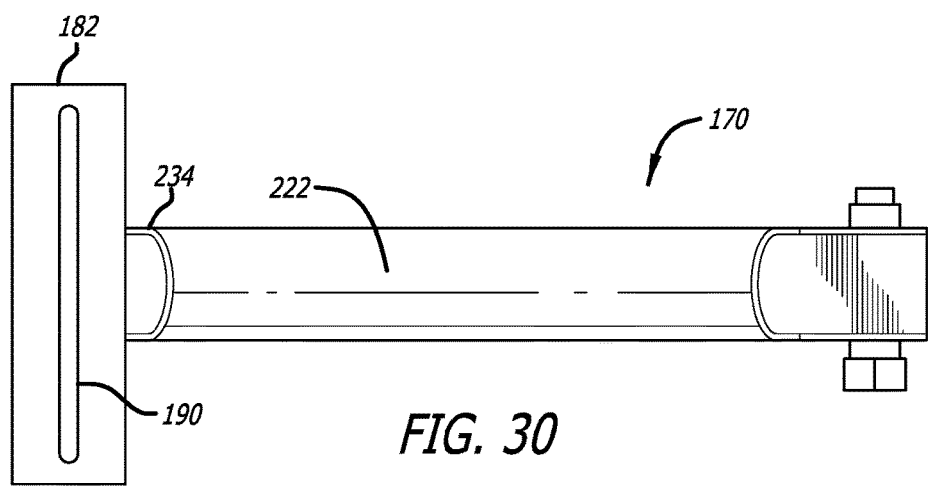
FIG. 30 is a bottom view of the pet grooming device of FIG. 15, with the optional elongated shield of FIG. 25 installed.
Figure 31:
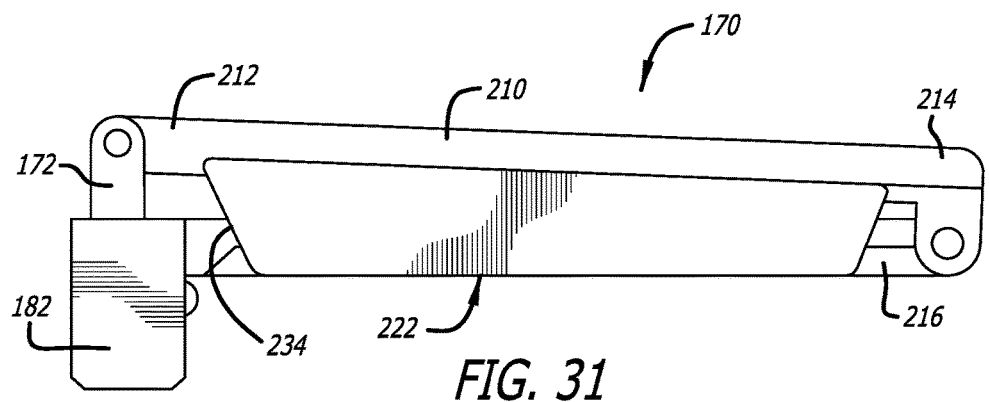
FIG. 31 is a side view of the pet grooming device of FIG. 15, with the optional elongated shield of FIG. 25 installed.
Figure 32:
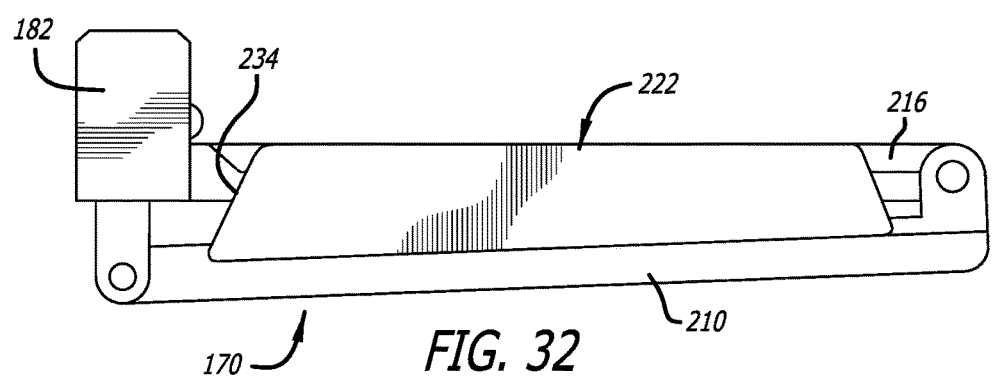
FIG. 32 is a side view of the pet grooming device of FIG. 15, with the optional elongated shield of FIG. 25 installed, showing the opposing side.

Referring to FIGS. 25-32, an elongated handle shield 222 also may be optionally provided, configured to be removably received by and interfit with the first and second side walls of the elongated handle shield to cover the second handle portion. The elongated handle shield has a generally elongated cup shaped configuration, with a first side wall 224, a second side wall 226, and a middle side wall 228 connected between the first and second side walls, as shown in FIG. 26. The first handle portion preferably has an exterior surface defining first and second slotted side portions 230, 232 configured to removably receive the first and second side walls of the elongated handle shield in a press fit relationship, so that the elongated handle shield can be placed over the second handle portion and pressed onto the first handle portion to cover the second handle portion, and can be removed as desired. The elongated handle shield may also include a foreshortened, or cutout or notched portion 234 configured not to cover a portion of the second handle portion when the shield is fitted onto the first handle portion, in order to allow a user to move the second handle portion to move the slotted cover to the first position in which the plurality of teeth are exposed and extending out of the slot, for use in grooming, and allowing the user to manually release the slotted cover to release collected hair from the teeth of the comb portion.

Figure 33:
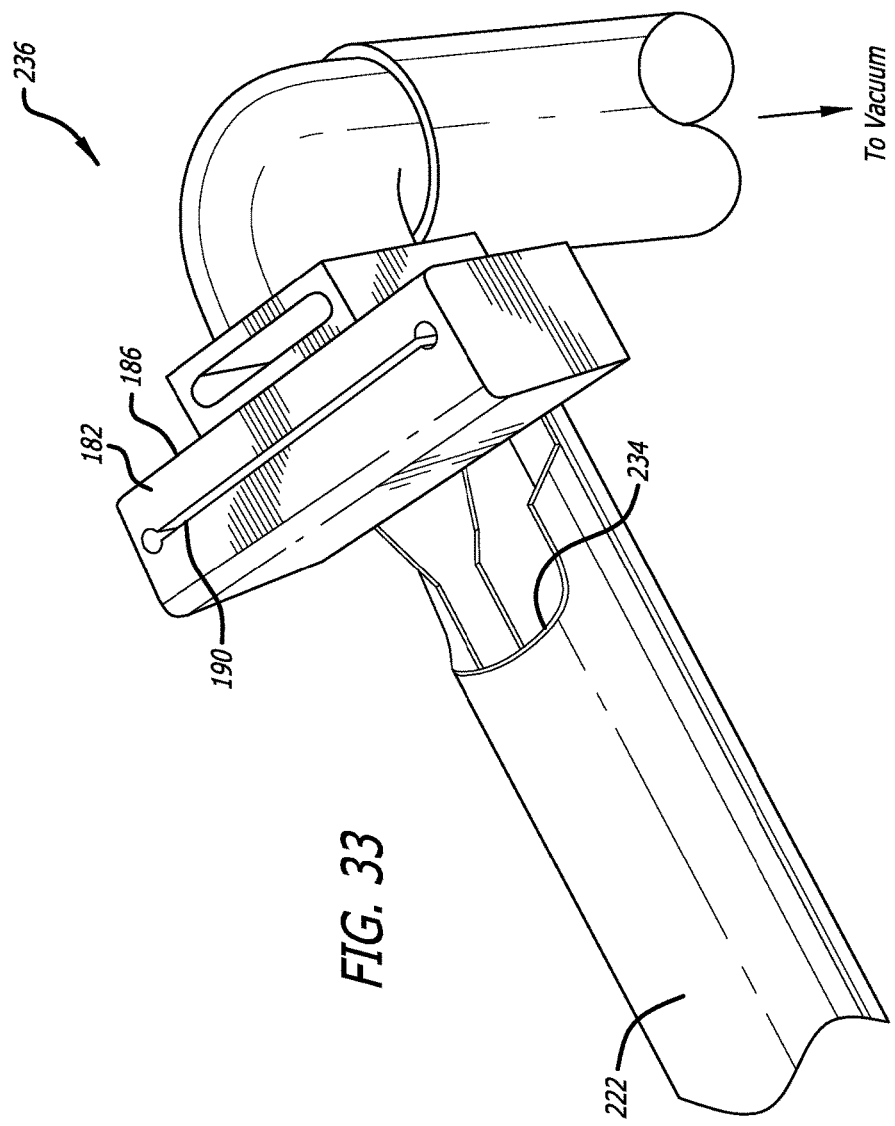
FIG. 33 is a perspective view of the pet grooming device of FIG. 15, with an optional vacuum attachment.

As is illustrated in FIG. 33, a vacuum attachment 236 may be removably attached adjacent to a side wall of the slotted cover, such as the second side wall 186, for example, which may include a slot (not shown) for removably receiving a corresponding tab portion of the vacuum attachment, for example.

In a third embodiment, a grooming device 270 for removing loose hair or fur to be groomed includes a grooming device main body 272 (best seen in FIGS. 34, 36, 37 and 41-52) having an elongated axis 274 with one or more sets of hair collecting elements 276 fixedly attached to the grooming device main body and extending outwardly from the grooming device main body, so that the one or more sets of hair collecting elements are removably engageable with hair or fur to be groomed. In a presently preferred aspect, the one or more sets of hair collecting elements extend in a direction substantially perpendicular to the elongated axis of the grooming device main body.

Figure 50:
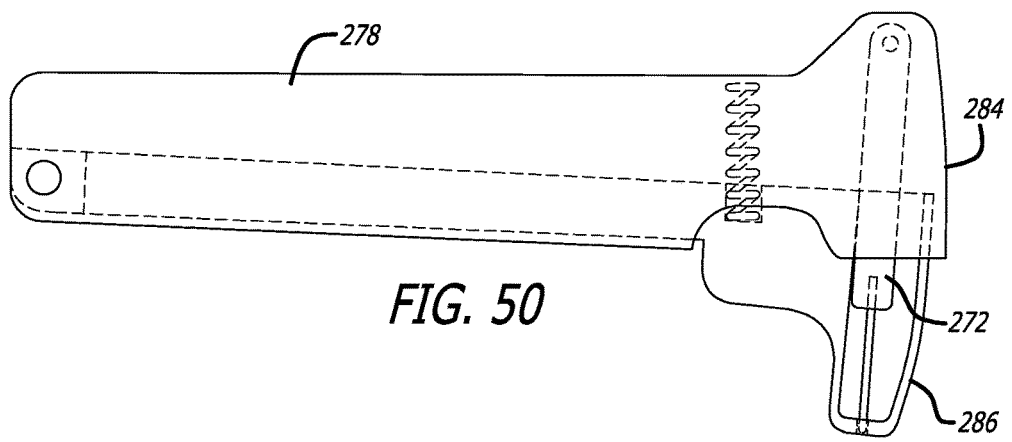
FIG. 50 is a side elevational partial sectional view of another variation of the pet grooming device of FIG. 15, showing the cover or scraper biased to cover and eject hair from the hair collecting elements by a compression spring when the grooming device released.
Figure 51:
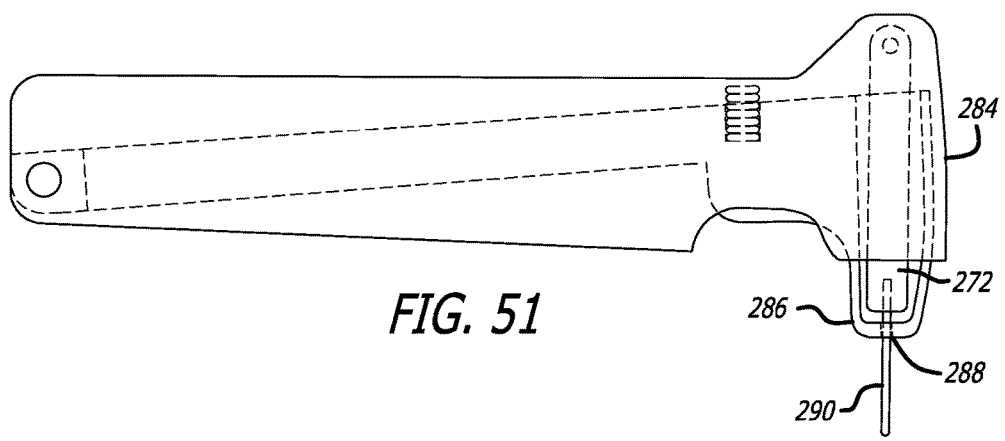
FIG. 51 is a side elevational partial sectional view similar to FIG. 50, showing the cover or scraper in a position with the grooming device pressed for grooming of hair.
Figure 52:
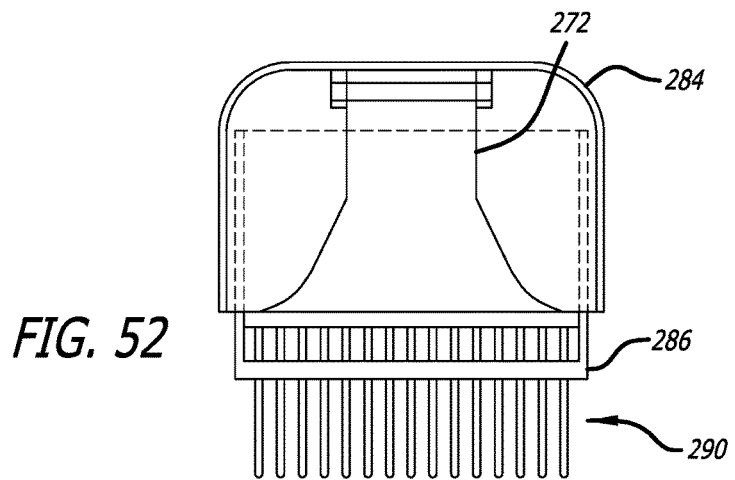
FIG. 52 is a front partial sectional view of the variation of FIG. 50, showing the cover or scraper in a position with the grooming device pressed for grooming of hair.
Figure 53:
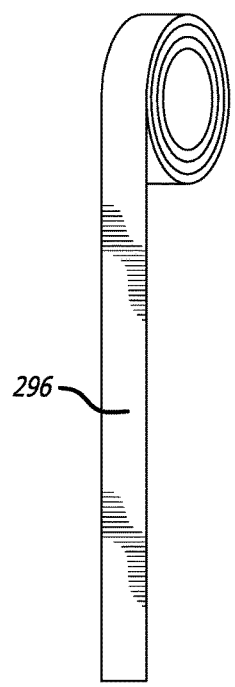
FIGS. 53-57 illustrate formation of spring steel blades and mounting of the spring steel blades as hair collecting elements in the grooming device of the invention.

The grooming device main body may also include a handle 278 having a first end 280 and a second end 282, with the first end of the handle mounted to the grooming device main body. The handle may also include a grip portion 283. One or more hair dislodging or scraping elements 286 having one or more hair dislodging or scraping surfaces 288 are movably connected to the handle, and are positioned adjacent to the one or more sets of hair collecting elements and configured to dislodge or scrape hair collected from the one or more sets of hair collecting elements when the one or more hair dislodging or scraping elements are moved relative to the one or more sets of hair collecting elements adjacent thereto. As is shown in FIGS. 34, and 44-46, the grooming device main body may also include a portion 289 covering the one or more hair dislodging or scraping elements. Referring to FIGS. 50-52, the handle may alternatively include a cup portion 284 extending over and receiving the one or more hair dislodging, cover or scraper elements. The one or more hair dislodging or scraping elements automatically uncover the one or more sets of hair collecting elements or teeth of the grooming device to a limited extent when the grooming device is pressed to engage hair to be groomed, and the one or more hair dislodging or scraping elements are biased to scrape the one or more sets of hair collecting elements or teeth of the grooming device to automatically eject hair collected on the one or more sets of hair collecting elements or teeth of the grooming device when the grooming device is released.

Figure 46:
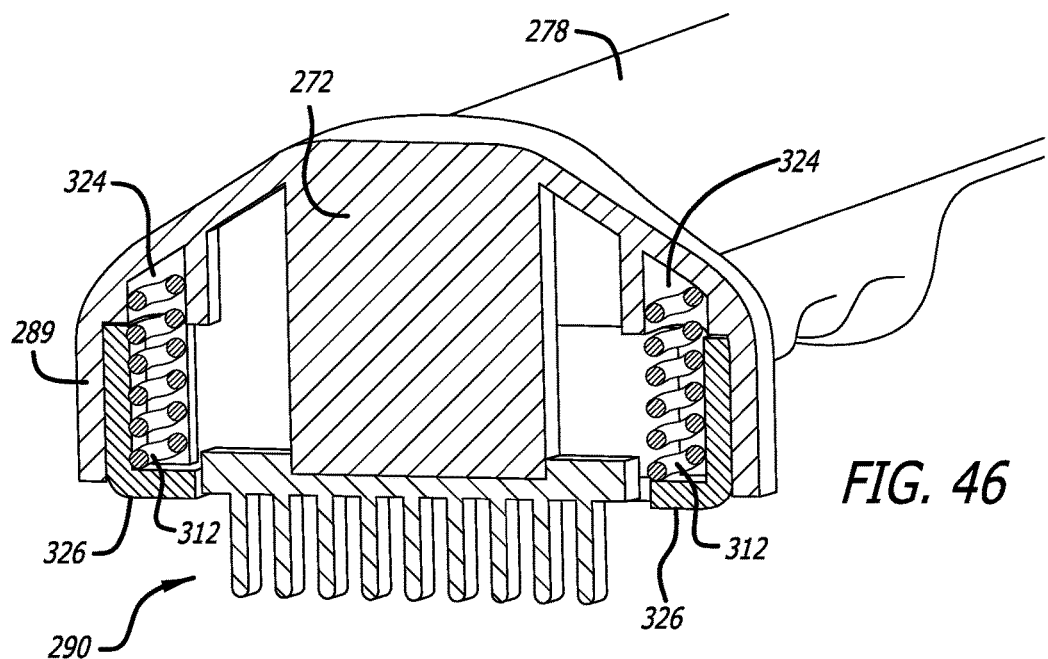
FIG. 46 is a front perspective view similar to FIG. 44, including a pin comb, and showing the cover or scraper in a position with the grooming device pressed for grooming of hair.
Figure 47:
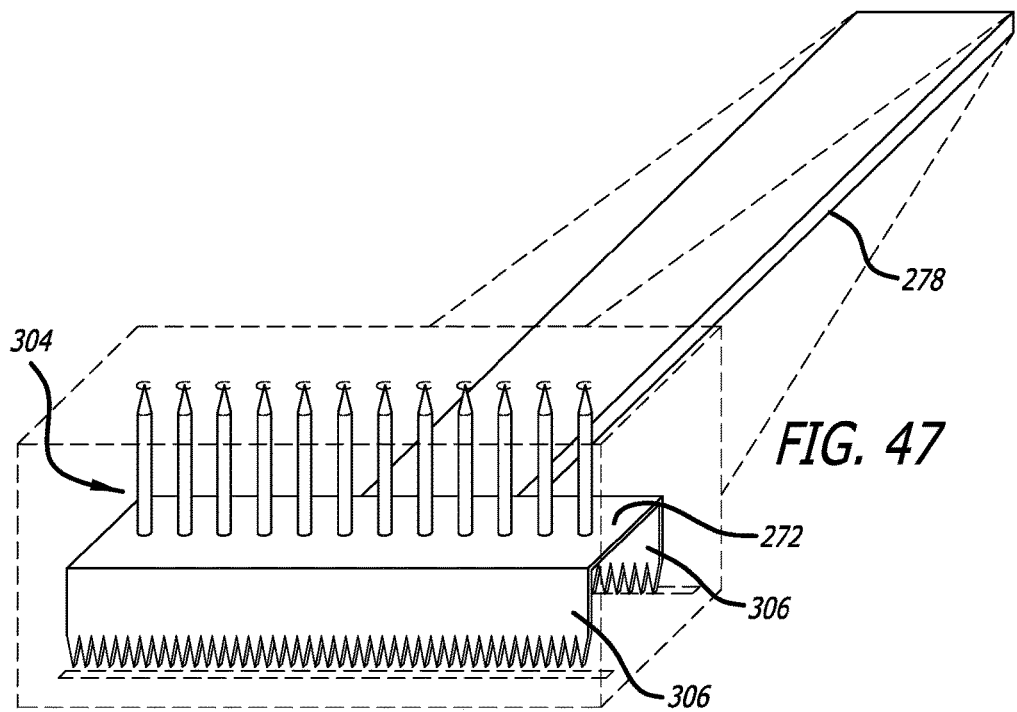
FIG. 47 is a schematic perspective view of another variation of the pet grooming device of FIG. 15 including a first set of hair collecting elements extending in a first direction from a grooming device main body, and two second sets of hair collecting elements extending in a second opposing direction from the grooming device main body.
Figure 48:
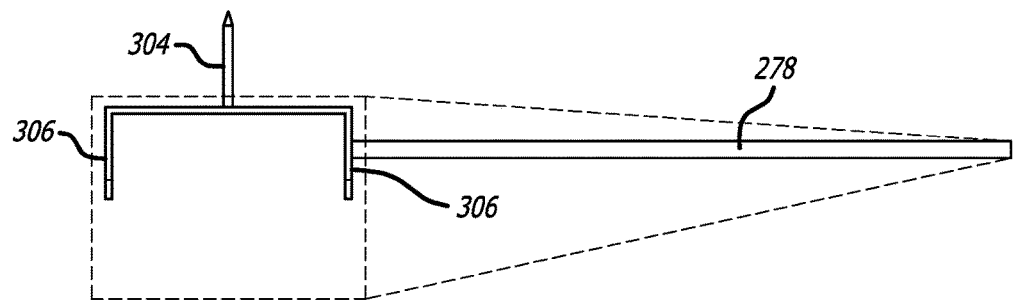
FIG. 48 is a schematic elevational view of the variation of FIG. 47, showing the cover or scraper in a position with the grooming device pressed for grooming of hair with the first set of hair collecting elements extending in the first direction from the grooming device main body and for ejecting hair collected on the two second sets of hair collecting elements.
Figure 49:
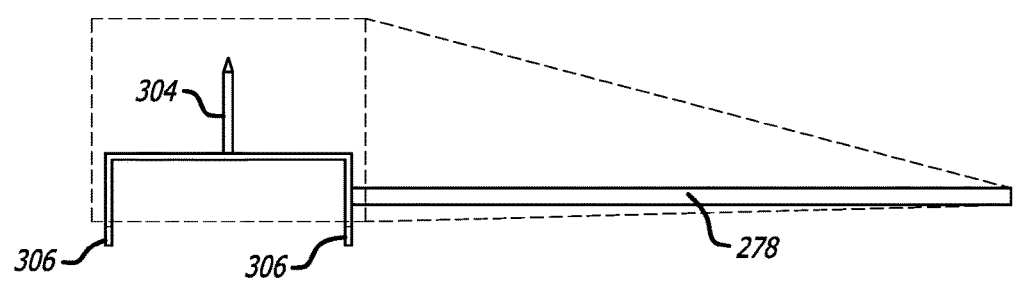
FIG. 49 is a schematic elevational view similar to FIG. 48, showing the cover or scraper in a position with the grooming device pressed for grooming of hair with the two second sets of hair collecting elements extending in a second opposing direction from the grooming device main body and for ejecting hair collected on the first set of hair collecting elements.
Figure 54:
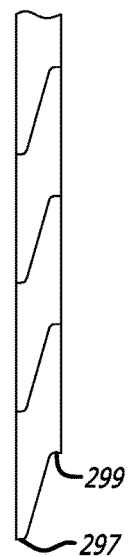
Figure 55:
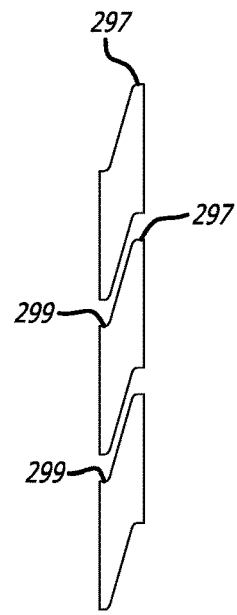
Figure 56:
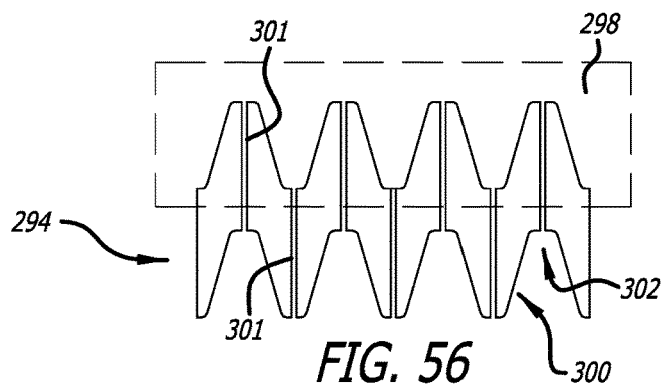
Figure 57:
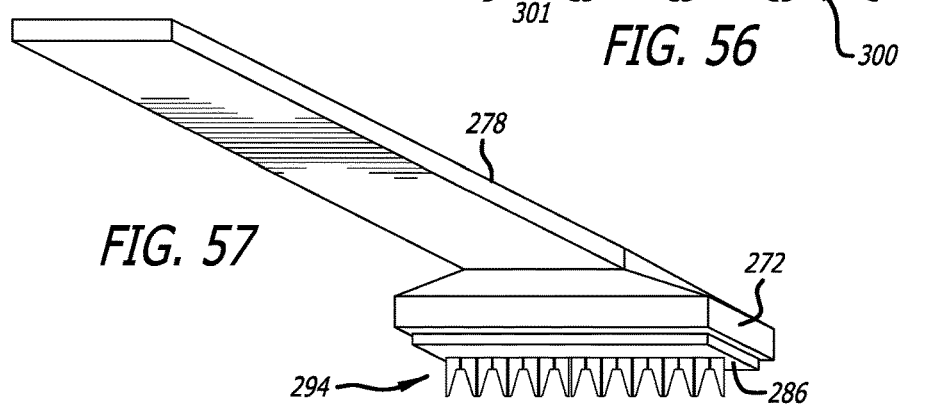
Figure 58:
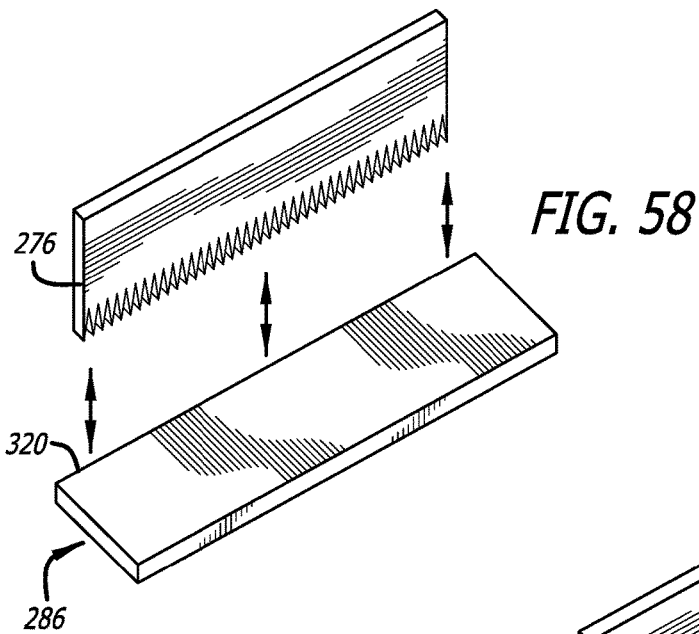
FIG. 58 is a perspective schematic view illustrating a cover or scraper having a hair dislodging or scraping surface provided by an outer edge of the cover or scraper.

In one presently preferred aspect, as is illustrated in FIGS. 41-43, 46 and 50-51, the one or more sets of hair collecting elements can be a pin comb 290 or a plurality of such pin combs, for example. Referring to FIG. 35, in another presently preferred aspect, the one or more sets of hair collecting elements can be provided by a plurality of notched blades 292 or multiple sets of such notched blades, for example. In another presently preferred aspect, the one or more sets of hair collecting elements include a plurality of spring steel blades 294 or multiple sets of such spring steel blades, for example. As is illustrated in FIGS. 53-57, such spring steel blades can be cut from a strip of spring steel 296 in repeating substantially parallelogram shapes cut at a slant to the longitudinal direction of the strip, typically with short stepped portions 297 at the acute tapered ends of the shapes, and corresponding short notched portions 299 at the obtuse corners of the shapes, as shown in FIGS. 54 and 55, so that the spring steel blades can be attached together, such as in a comb main body portion 298, with flat sides abutting each other in alternating orientation of the blades with alternating blade portions 300 and recesses 302, as shown in FIGS. 56 and 57. Referring to FIGS. 47-49, in another presently preferred aspect, the one or more sets of hair collecting elements can be provided by one or more first sets of hair collecting elements 304 extending in a first direction from the grooming device main body, and one or more second sets of hair collecting elements 306 extending in a second opposing direction from the grooming device main body.

Figure 44:
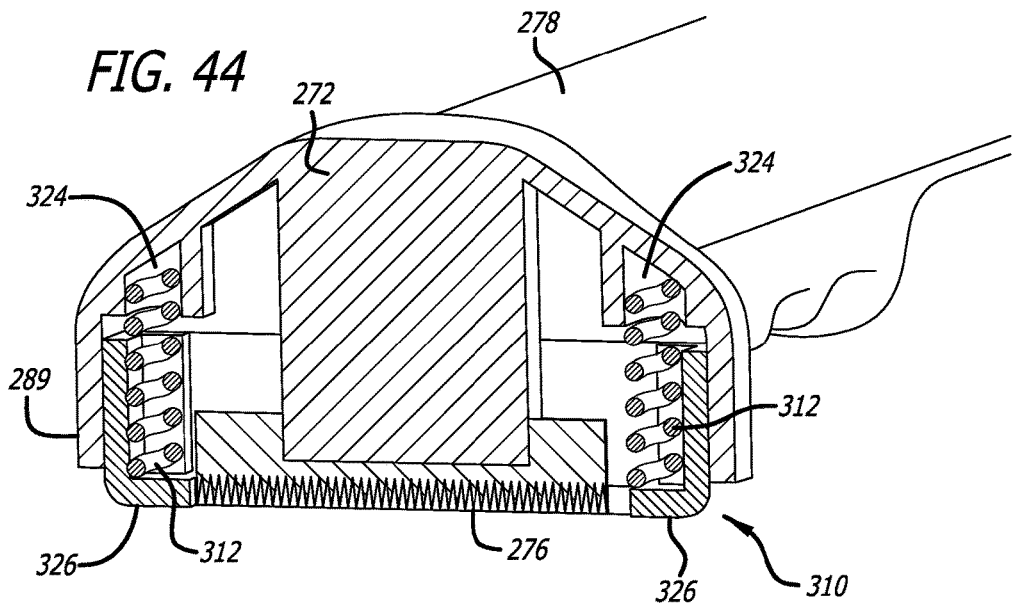
FIG. 44 is a front perspective view of another variation of the pet grooming device of FIG. 15 including coil springs, showing the cover or scraper released for ejecting hair collected.
Figure 45:
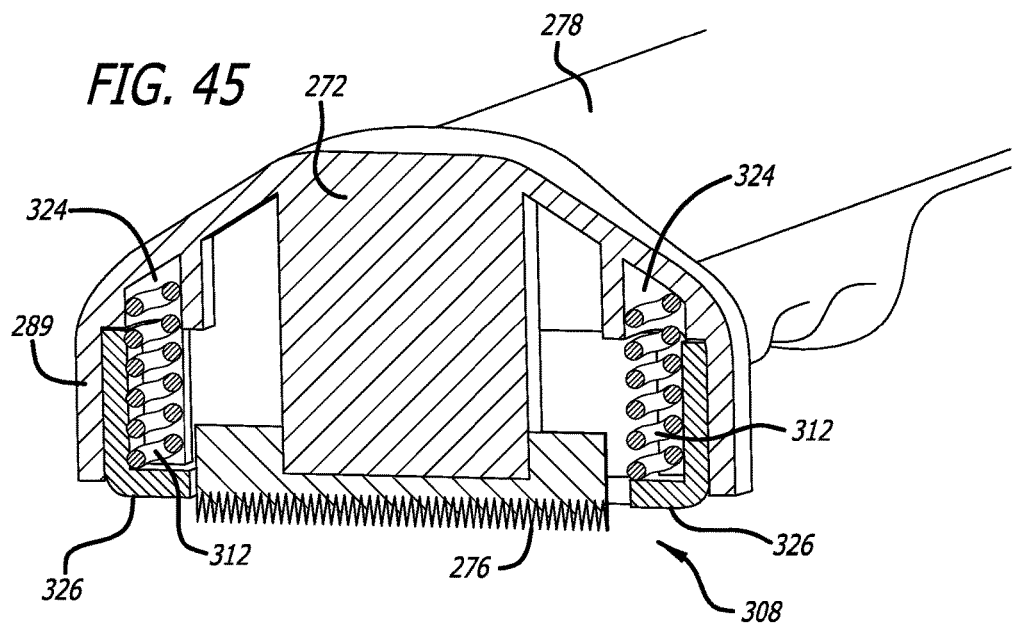
FIG. 45 is a front perspective view similar to FIG. 44, showing the cover or scraper in a position with the grooming device pressed for grooming of hair.

With reference to FIGS. 36, 37, 39, 40, and 42-45, the one or more hair dislodging or scraping elements are preferably slidably engaged with the one or more sets of hair collecting elements for movement of the one or more hair dislodging or scraping elements between a first position 308 in which one or more sets of hair collecting elements are exposed and extending beyond the one or more hair dislodging or scraping surfaces, shown in FIG. 37, and a second position 310 in which the one or more sets of hair collecting elements are not extending beyond the one or more hair dislodging or scraping surfaces, shown in FIG. 36. The one or more hair dislodging or scraping elements are preferably biased to be in the second position in which the one or more hair dislodging or scraping elements are not extending beyond the one or more hair dislodging or scraping surfaces. In a presently preferred aspect, the one or more hair dislodging or scraping elements are biased to be in the second position in which the one or more hair dislodging or scraping elements are not extending beyond the one or more hair dislodging or scraping surfaces by one or more compression springs 312, mounted in line with the plurality of hair collecting elements in an interior chamber 324 of the one or more hair dislodging, cover or scraping elements and over a lower wall 326 of the one or more hair dislodging, cover or scraping elements, as shown in FIGS. 44-46.

Figure 59:
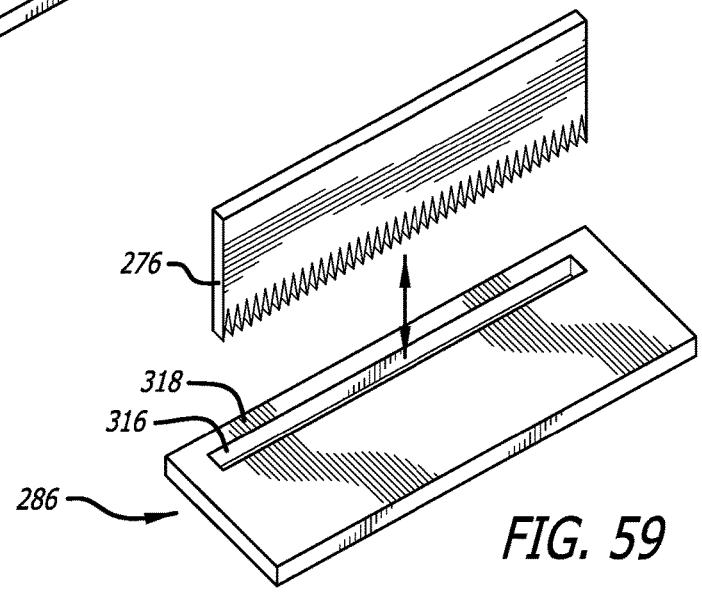
FIG. 59 is a perspective schematic view illustrating a cover or scraper with an edge slot aligned with hair collecting elements.
Figure 60:
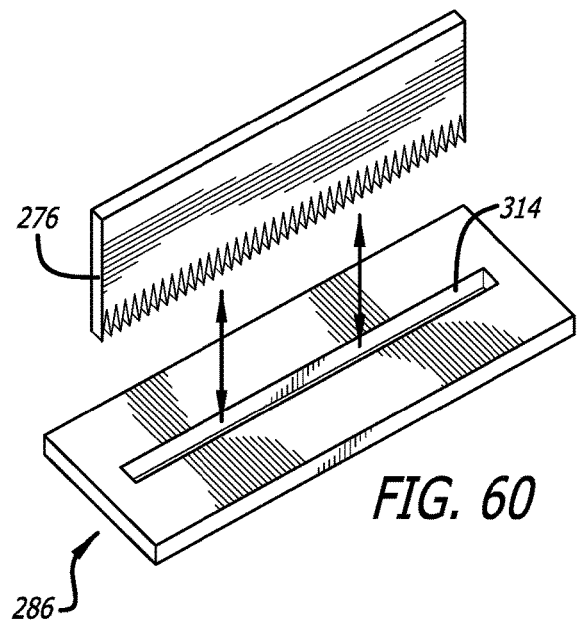
FIG. 60 is a perspective schematic view illustrating a cover or scraper with a middle slot aligned with hair collecting elements.

Referring to FIGS. 59 and 60, in one presently preferred aspect, the one or more hair dislodging or scraping surfaces may, for example, be provided by one or more slots formed in the one or more hair dislodging or scraping elements, illustrated schematically, such as a middle slot 314 that is formed in a middle portion of the one or more hair dislodging or scraping elements, or an edge slot 316 formed adjacent to an edge portion 318 of the one or more hair dislodging or scraping elements. With reference to FIGS. 1-24, 27-34, 36-46, 50-52 and 57, the one or more hair dislodging or scraping elements may have a generally cup shaped configuration, for example, with a first side wall, a second side wall, and a middle side wall connected between the first and second side walls, with the middle side wall having a surface defining the one or more slots configured to slide adjacent to one or more sets of hair collecting elements to dislodge or scrape collected hair from the one or more sets of hair collecting elements, the first, second and middle side walls defining an interior chamber configured to slidably receive the one or more sets of hair collecting elements, and the one or more slots being slidably disposed over the one or more sets of hair collecting elements. Alternatively, the one or more hair dislodging or scraping surfaces may, for example, be provided by an outer edge 320 of the one or more hair dislodging or scraping elements.

In another presently preferred aspect, the one or more hair dislodging or scraping elements may include a portion, such as a handle, tab or button 322, for example, extending from the one or more hair dislodging or scraping elements and configured to allow a user to manually move the one or more hair dislodging or scraping elements to the first position in which one or more sets of hair collecting elements are exposed and extending beyond the one or more hair dislodging or scraping surfaces.

Referring to FIGS. 61 and 62, in another presently preferred aspect, showing another variation of the embodiment of FIG. 34, instead of mounting the one or more return or compression springs in line with the plurality of hair collecting elements in an interior chamber of the one or more hair dislodging, cover or scraping elements and over a lower surface of the one or more hair dislodging, cover or scraping elements, the one or more return or compression springs 312 may alternatively be mounted rearwardly of the one or more hair dislodging or scraping elements or teeth in one or more auxiliary spring chambers 328 in the grooming device main body and aligned over a rearwardly extending lower portion 330 of the one or more hair dislodging, cover or scraping elements, so as to bias the one or more hair dislodging, cover or scraping elements to scrape the one or more hair dislodging or scraping elements or teeth of the grooming device to automatically eject hair collected on the one or more sets of hair collecting elements or teeth of the grooming device when the grooming device is released.

In addition, one or more spring tension adjustment knobs or adjustment screws 332 may be threadably connected to the one or more auxiliary spring chambers over an upper end of the one or more return or compression springs, allowing the spring tension of the one or more compression springs to be adjustable. By mounting the one or more compression springs rearwardly of the one or more hair dislodging or scraping elements, the grooming device can be made to be less bulky and to have a lower profile. The one or more hair dislodging or scraping elements may also include a portion, such as a handle, tab or button 322, for example, extending from the one or more hair dislodging element and configured to allow a user to manually move the one or more hair dislodging or scraping elements to the first position in which one or more sets of hair collecting elements are exposed and extending beyond the one or more hair dislodging or scraping surfaces.

Figure 63:
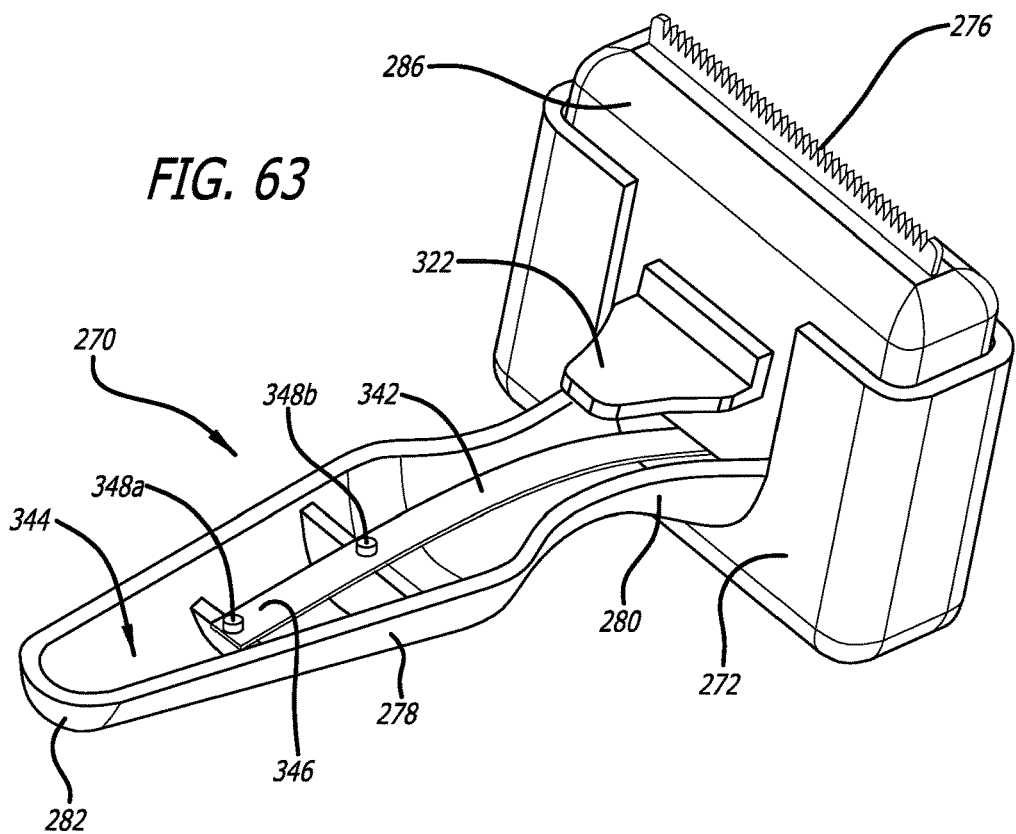
FIG. 63 is a perspective view of a variation of the embodiment of FIG. 34, schematically showing placement of a leaf spring in the handle, shown partially cutaway to view the leaf spring, rearwardly of the one or more hair dislodging or scraping elements.
Figure 64:
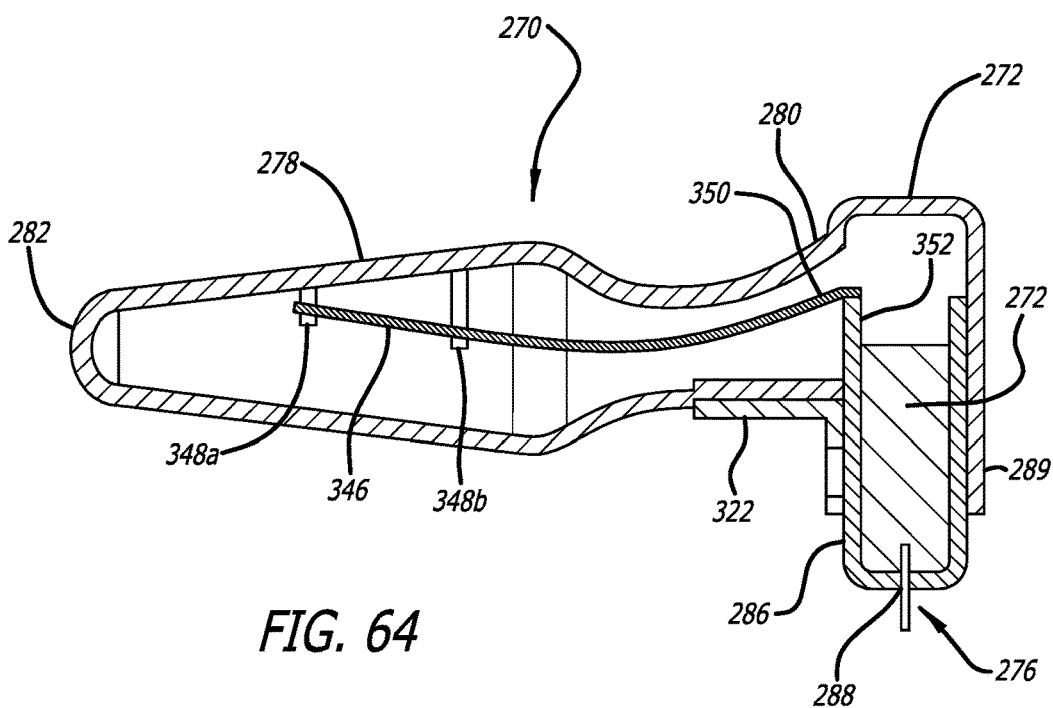
FIG. 64 is a sectional view of the variation of FIG. 63.

Referring to FIGS. 63 and 64, in another presently preferred aspect, showing another variation of the embodiment of FIG. 34, instead of mounting the one or more compression springs in line with the plurality of hair collecting elements in an interior chamber of the one or more hair dislodging, cover or scraping elements and over a lower wall of the one or more hair dislodging, cover or scraping elements, as illustrated in FIGS. 44-46, one or more leaf springs 342 may alternatively be mounted rearwardly of the one or more hair dislodging or scraping elements in a handle interior chamber 344 of the handle, fastened at a rearward end portion 346 of the one or more leaf springs to first and second anchor points 348a, 348b within the handle, and fastened at a forward end portion 350 of the one or more leaf springs to an upper end portion 352 of the one or more hair dislodging or scraping elements, so as to bias the one or more hair dislodging, cover or scraping elements to scrape the one or more hair dislodging or scraping elements or teeth of the grooming device to automatically eject hair collected on the one or more sets of hair collecting elements or teeth of the grooming device when the grooming device is released. The one or more leaf springs also allow the grooming device to be made to be less bulky and to have a lower profile, contributes to reliability of the grooming device, and solves manufacturing problems associated with space constraints. The one or more hair dislodging or scraping elements may also include a portion, such as a handle, tab or button 322, for example, extending from the one or more hair dislodging element and configured to allow a user to manually move the one or more hair dislodging or scraping elements to the first position in which one or more sets of hair collecting elements are exposed and extending beyond the one or more hair dislodging or scraping surfaces.

Figure 65D:
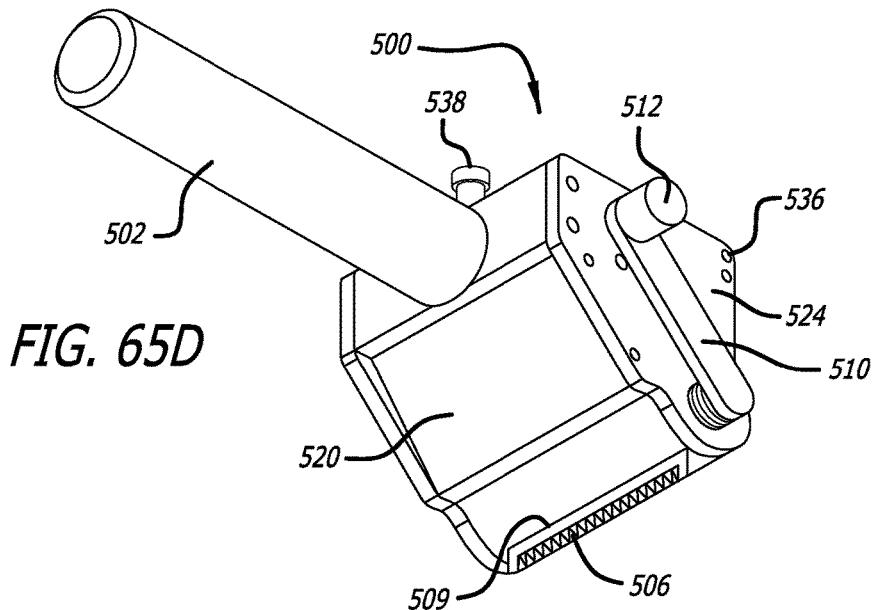
FIG. 65D is a rear/side perspective view, from below, of the grooming device of FIG. 65A.

In a fourth embodiment, the present invention provides for a grooming device that may be used on any variety of hair, fur, coat, and the like of a living or non-living object, including for example a human, a cat, a dog, a horse, a doll, a wig, a stuffed animal, and the like. Beginning with FIG. 65(A), a grooming device 500 for removing and collecting loose hair from an animal or other object to be groomed having a coat of fur is shown according to one of several possible embodiments of the present invention. The grooming device includes a handle portion 502 to which a hair collection chamber 504 is secured. The hair collection chamber may have any configuration and for example, may be substantially trapezoidal in configuration when viewed from the side of the device as shown in FIG. 65(E).

Figure 65E:
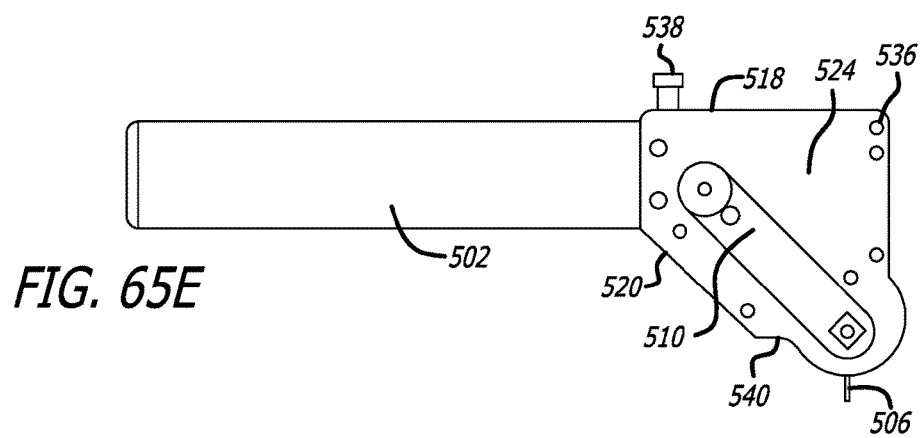
FIG. 65E is a side view of the grooming device of FIG. 65A.
Figure 65F:
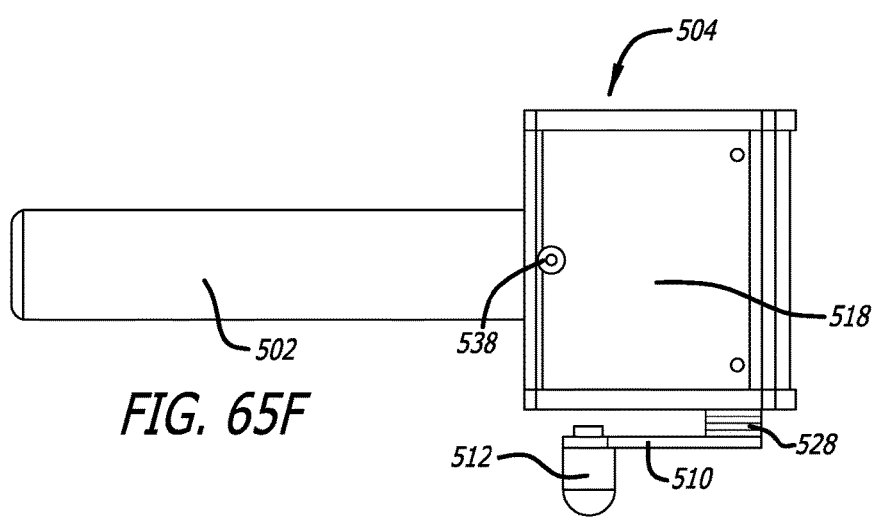
FIG. 65F is a top view of the grooming device of FIG. 65A.
Figure 65G:
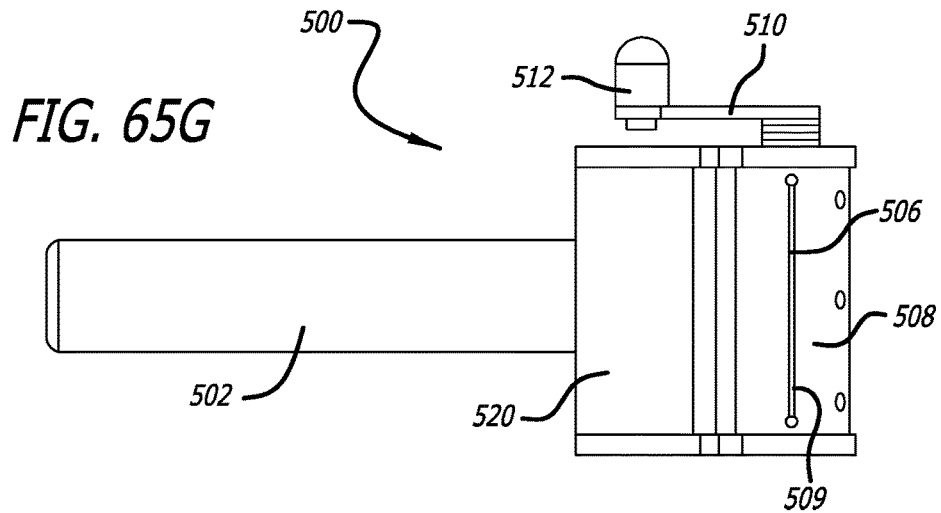
FIG. 65G is a bottom view of the grooming device of FIG. 65A.
Figure 65H:
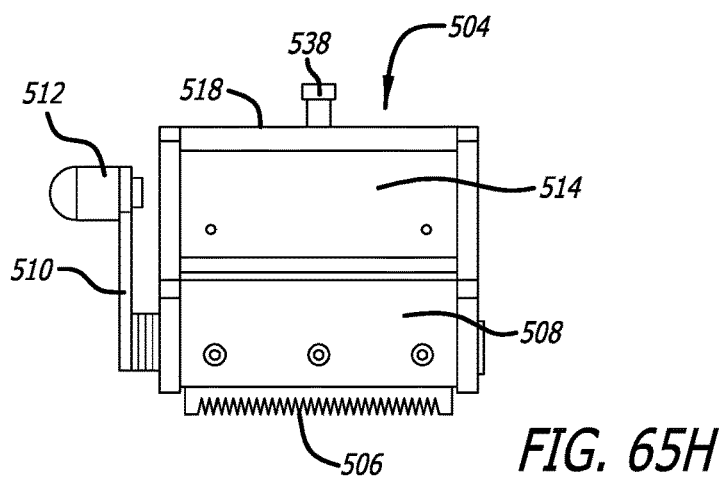
FIG. 65H is a front view of the grooming device of FIG. 65A.
Figure 65I:
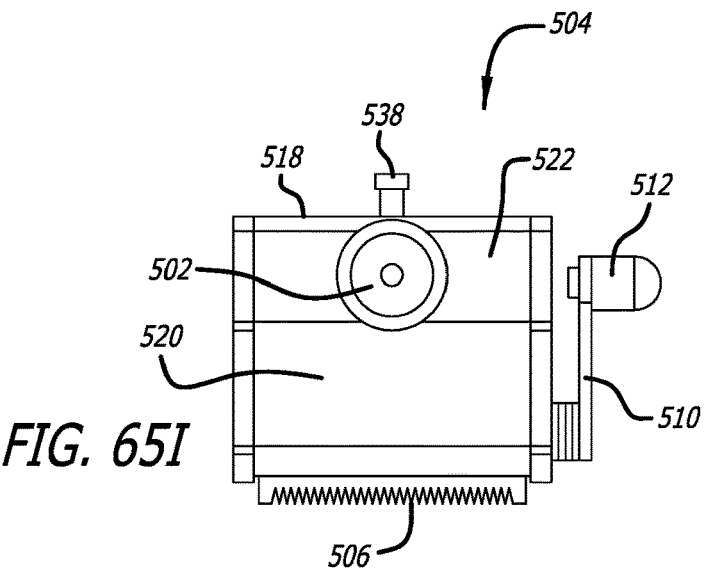
FIG. 65I is a rear view of the grooming device of FIG. 65A.

FIG. 65(E) illustrates a rear wall 520 of the hair collection chamber 504 that is slanted at a non-parallel, non-perpendicular angle relative to the roof door 518 and front plate 514. For example, the angle may be 45 degrees from the elongated axis of the handle. In this manner when the side lever 510 is positioned at a 135 degree angle with respect to the teeth projecting from the comb, the elongated axis of the side lever is parallel to the rear wall 520 when the teeth project downwards, 90 degrees from the elongated axis of the horizontal handle.

Figure 66:
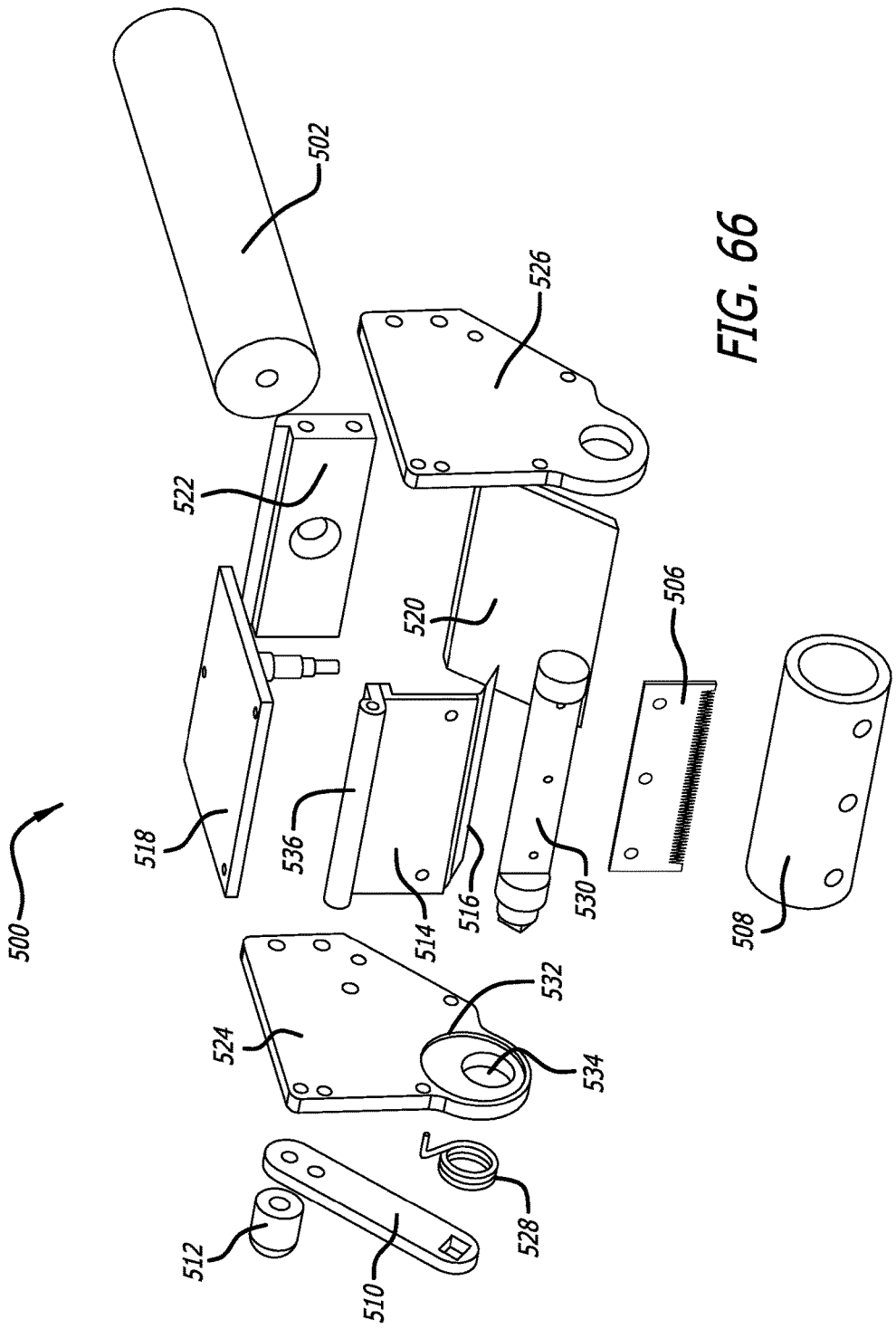
FIG. 66 is an exploded front/side perspective view, from above, of the grooming device of FIG. 65A.

With reference to FIG. 66, side wall 524 of the chamber 504, and opposite side wall 526, each include an edge that mates with the slanted rear wall 520 and transforms to a curved region 540 to accommodate a barrel 508. The rotatable barrel may have a cylindrical configuration but is not so limited.

As shown in FIG. 66 and FIGS. 67A, 67B and 67C, within the hair collection chamber there is an internal scraper 516 or peeler mounted on the inner wall of plate 514 which forms the front wall of the hair collection chamber. The scraper may be made of spring steel but is not limited to this material. Alternatively, the scraper may be integrally formed with the plate 514 as an extension thereof rather than as a separate element mounted to the plate. The scraper 516 is configured and mounted relative to the front plate 514 and barrel 508 so that the scraper forms a tangent plane to the barrel. For example, as shown in FIG. 66 and FIGS. 67A, 67B and 67C, a first portion of the scraper may be mounted flat against the plate and a second portion of the scraper may curve to create a tangent plane to the outer surface of the rotating barrel.

The roof of the hair collection chamber is configured as or includes a door 518 or window which can be opened by pulling a knob 538 thereon in order to remove hair from inside the chamber, thereby emptying the chamber. The device is designed to accommodate approximately a basketball size bowl of hair in a compacted format within the hair collection chamber before it has to be emptied.

In some embodiments the entire door or window, or a portion thereof may be formed of a clear, tinted, translucent, semi-translucent, transparent, or semi-transparent material (e.g. plastic, glass) to permit some visibility through the door or window into the chamber before opening it in an effort to assess the amount of hair collected and determine whether the chamber needs to be emptied. However, due to the ability of the device to compress and compact collected hair within the hair collection chamber, as necessary, and the propensity for any collected hair to spread out within the chamber it is difficult to access by vision alone whether the chamber should be emptied. For example, hair deposited within the chamber after a few minutes of grooming may make it appear, through the door/window, that the chamber is full when in fact the hair within the chamber is uncompressed and due to the ability to compress much more hair can be collected before the chamber has to be emptied. Accordingly, other means may be provided for determining when to empty the chamber, including for example a pressure sensor within the chamber that produces a signal when the chamber gets so full with compressed hair that it should be emptied.

Figure 67A:
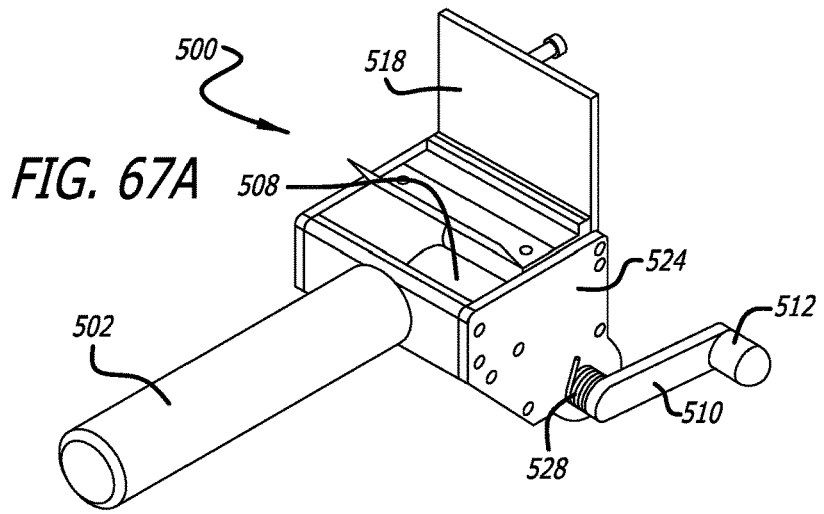
FIG. 67A is a rear/side perspective view, from above, of the grooming device of FIG. 65A in a different configuration in which the door to the hair collection chamber is open and the side lever is in a position in which the comb is not exposed.
Figure 67B:
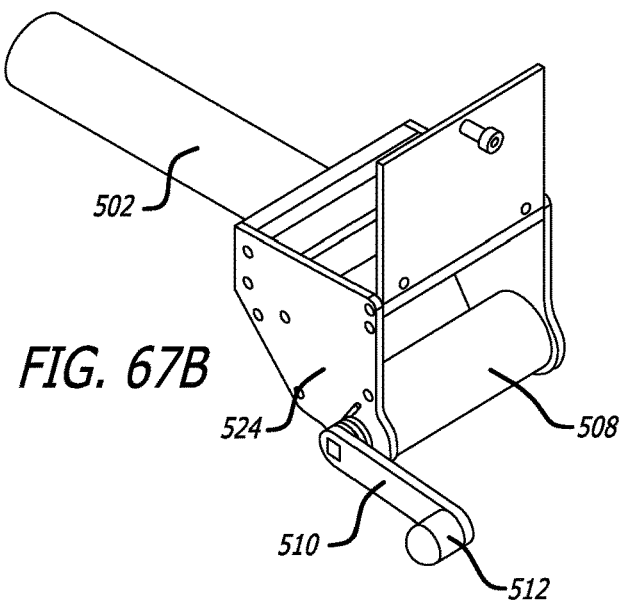
FIG. 67B is a front/side perspective view, from above, of the grooming device of FIG. 67A.
Figure 67C:
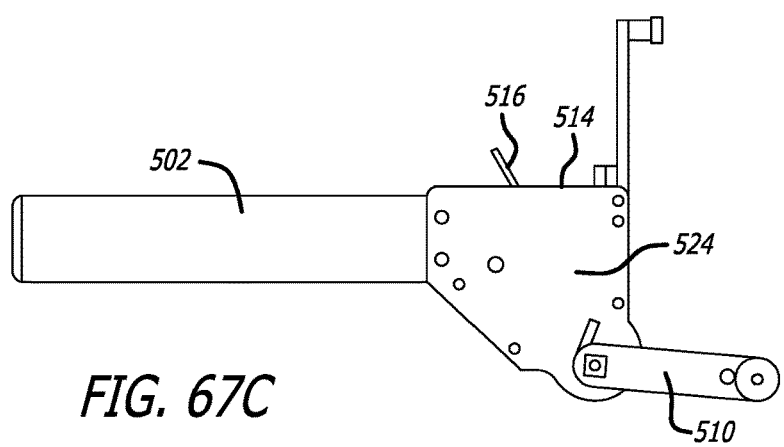
FIG. 67C is a side view of the grooming device of FIG. 67A.

As shown in FIGS. 67A, 67B and 67C, this door 518 is connected with the plate 514 upon which the scraper 516 is mounted to form a corner hinge 536 as shown in FIGS. 65B, 65D, 65E, and 65F such that when the door is opened, as in FIGS. 67A, 67B and 67C, the supporting plate 514 and scraper 516 disposed thereon pivot about the common corner hinge 536 together with the door.

Beneath the front plate 514 of the hair collection chamber 504 is a rotatable barrel 508 mounted within the base of the hair collection chamber. For example, the barrel 508 may be received within circular recesses 532 within side walls 524, 526 of the chamber. The barrel has a horizontal slit 509 on an outer surface of it through which the teeth of the comb pass, extending and receding as the lever rotates the dowel. The comb is connected to a dowel or shaft 530 inside the barrel. By manually manipulating a side lever 510 mounted on the exterior of the chamber through a coil pressure spring 528 the dowel can be rotated. Washers or other connecting elements may also be incorporated as appropriate. Side lever 510 includes a hand or finger knob 512.

Rotation of the dowel in turn causes rotation of the comb connected to the dowel. Rotation of the comb in turn causes rotation of the barrel because the comb passes through a slit in the barrel. The hollow barrel has an outer wall that is thick enough such that when the teeth of the comb have receded or recessed behind the outer surface of the barrel the teeth are still in engagement with the wall of the barrel to apply pressure to turn it as the dowel turns the comb.

Due to the non-concentric, offset relationship between the center of the dowel and the center of the barrel, the length of the teeth extending beyond the outer surface of the barrel varies throughout the rotation. More specifically, the dowel is disposed inside the barrel with the center of the dowel below the center of the barrel as seen from the side in FIG. 68. Generally, the teeth of the comb extend from the barrel as they are exposed to the outside of the hair collection chamber and recede or recess within the barrel as the rotation causes them to be exposed to the inside of the chamber.

Figure 68:
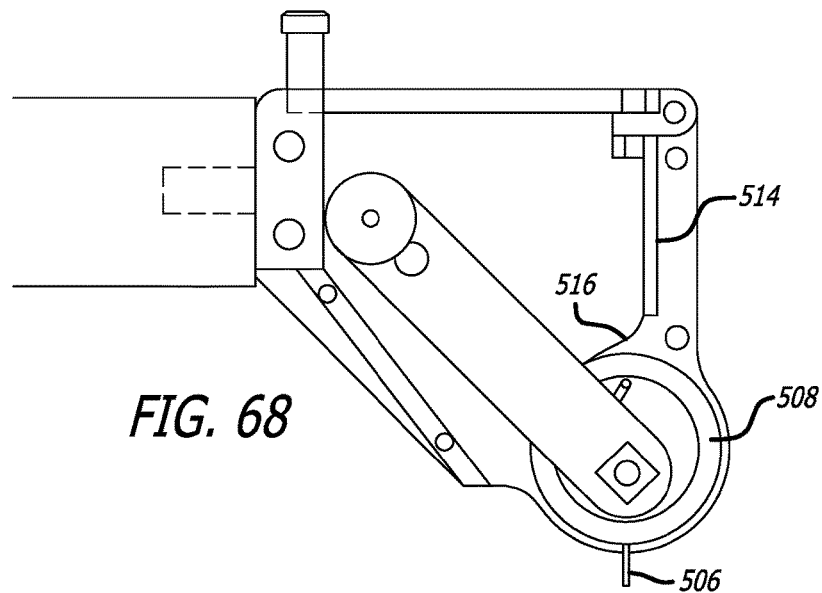
FIG. 68 is a side cutaway view of the grooming device of FIG. 65A illustrating the interior of the hair collection chamber with the comb exposed exteriorly to the chamber.

With reference to FIG. 68, starting with the teeth projecting downwards at a ninety degree angle to the elongated axis of the handle the teeth are fully extended as far as they can extend beyond the outer surface of the barrel. As the side lever is rotated clockwise turning the dowel and with it the comb, the teeth begin to recede or recess so that the length of the comb's teeth extending beyond the outer surface of the barrel decreases until the teeth are projecting upwards, 180 degrees from their initial position. When the teeth are projecting upwards at a ninety degree angle to the elongated axis of the handle they are fully receded or recessed as far as they can recede/recess such that they do not extend beyond the outer surface of the barrel. From this position in which the teeth project upwards, as the side lever is turned clockwise the teeth extend to project beyond the outer surface of the barrel until they reach the initial configuration shown in FIG. 68 projecting downwards and fully extended.

The side lever may be configured such that at the point of rotation between the hair collection chamber and the side lever the pressure spring 528 allows for one-way rotation only. For example, one-way rotation in a forward direction towards the hair collection chamber and away from the handle. If the side lever is moved in the opposite direction or backwards, this results in the release of previously captured hair.

The side lever 510 may be at a fixed angle relative to the teeth or tines of the comb, and thus also at a fixed angle relative to the slit in the barrel through which the teeth pass as is best seen in FIGS. 65E, 68, 69 and 70. In these views the angle between the elongated axis of the side lever and the elongated axis of the teeth is approximately 135 degrees but the invention is not limited to this angle. Other fixed angles may also be appropriate, for example an angle between 90 and 270 degrees, preferably between 90 and 180 degrees, and more preferably between 110 and 180 degrees. The fixed angle between the elongated axis of the side lever and the elongated axis of the teeth is preferably such that the side lever is disposed in front of the hair collection chamber when viewed from the side. Desirably, the side lever is at a fixed angle relative to the elongated axis of the teeth so that it is out of the way from the interaction of the comb with the fur of the animal during the grooming process.

As shown in FIGS. 65B, 65D, 65E, 65G, 65H, and 65I an engageable comb 506 is mounted on a dowel or shaft within the barrel 508. As the comb protrudes through a slit in the barrel it applies pressure to the outer wall of the barrel and thereby causes the barrel to rotate as the dowel rotates the comb and the side lever rotates the dowel. As the comb rotates with the barrel it moves from an exposed position exterior to the hair collection chamber in which the comb can be engaged with the hair of the animal to a non-exposed position interior to the chamber. The scraper mounted on the inside of front plate 514 is always interior to the chamber. Thus, the animal being groomed is protected from the scraper.

With the scraper tangent to the rotating barrel and the receding comb mounted on the dowel or shaft within the barrel, as the comb 506 rotates past the scraper while receding into the barrel, hair retained by the teeth or tines of the comb is scraped or peeled from the comb teeth within the hair collection chamber. More specifically, the process of the comb receding into the barrel removes any hair caught in the comb's teeth which is transferred to the surface of the barrel. The scraper applying pressure to the barrel picks up this hair. Thus, the recession of the comb within the barrel together with the scraper applying pressure to the barrel result in the removal of clinging or residual hairs from the teeth of the comb and from the surface of the barrel. All of this removed hair is deposited into the hair collection chamber, a containment area for removed hair until the lid is opened to clean it out.

According to one of several embodiments the tines or teeth of the comb may be cut out of 0.025" by ¾" stainless spring steel band stock resulting in teeth much thinner than is typical in currently available grooming tools. Thinner teeth on the comb can enhance the precision and thoroughness of de-shedding during the grooming process.

As the side lever 510 is manipulated to turn the rotating barrel 508, the comb 506 engages with loose hair from an object being groomed (e.g. furry animal) and retains it. The rotating barrel is further rotated until the comb moves past the scraper 516 at which point the scraper scrapes the hair and the hair is deposited in the hair collection chamber 504. As the barrel is rotated further the comb moves beyond the scraper and emerges exterior to the chamber where it is re-introduced with loose hair of an object being groomed (e.g. furry animal).

With regard to FIG. 66, the individual pieces that collectively form the pet grooming device are illustrated. As shown, the handle 502 is connected to rear segment 522 of the hair collection chamber 504. The rear segment 522 together with the slanted segment 520 below it form the rear wall of the chamber. The front of the chamber is formed by front plate 514 upon which the scraper 516 is mounted. The front plate 514 forms a corner with the roof door 518 such that it pivots about the corner as the door opens and closes to empty the chamber by removing the collected hair therein. Side walls 524 and 526 have structure therein for mounting the rotating barrel 508 and a shaft or dowel 530 inside the barrel. For example, the inner dowel 530 is received through the inner hole 534 while the outer barrel 508 around the dowel is received within the outer circular recesses 532 within side walls 524, 526. Rotation of the side lever turns both the dowel and the barrel around it via the comb.

Also provided herein are methods of de-shedding an animal or other object to be groomed having a coat of fur. As used herein de-shedding refers to removing loose hair from an animal or other object without clipping or cutting non-loose hair. In accordance with one of several embodiments, a method of de-shedding involves engaging a comb of a grooming device with the hair, fur, coat, or other outer covering of the animal or object to be groomed. The animal or other object is then groomed with a series of strokes as the comb is engaged with the fur, for example by pulling a handle portion of the grooming device which in turn moves the comb along the body or back of the animal.

When the comb fills up with hair, typically after several strokes, rather than manually removing the hair from the teeth or tines of the comb, a lever 510 or a button on the grooming device is manipulated or turned to rotate a dowel 530 upon which the engageable comb 506 is mounted. This also rotates the barrel by virtue of the comb engaging with the outer wall of the barrel. Rotation of the side lever continues to rotate the comb until it passes by scraper 516 internal to the hair collection chamber and configured tangentially to a surface of the barrel.

As discussed previously, as the comb approaches the scraper it recedes or recesses into the barrel and the hair and fur that had been held between the teeth and tines of the comb is scraped or peeled from the surface of the barrel by the scraper to remain within the hair collection chamber. As the side lever is further rotated a cleaner comb re-emerges from the hair collection chamber. When the elongated axis of the teeth of the comb are at a right angle to the elongated axis of the handle, rotation of the side lever can be stopped, the side lever and comb can be locked in place, and the grooming process can then be resumed.

One manner in which the comb receding within the barrel as the side lever is rotated may be accomplished is through the structural offset of the rotational paths of the barrel and the dowel upon which the comb is mounted. As shown in FIG. 66, the dowel 530 upon which the comb 506 is mounted is received by holes 534 in the side walls 524, 526 of the hair collection chamber 504 while the barrel 508 is received by recesses 532 in the same side walls with the holes disposed within the recesses but not concentric with them. The non-concentric structure of the outer recesses for the barrel and the inner holes for the dowel and comb accomplish the offset which enables the comb to recede, recess, or withdraw within the barrel as it approaches the scraper interior to the hair collection chamber. Note that the holes 534 within which the comb-carrying dowel is mounted are positioned towards the base of the recesses so that the teeth of the comb facing down (perpendicular to the longitudinal axis of the handle) extend farther from the barrel then when the comb is in any other orientation. As shown in FIG. 68, the holes within which the dowel is mounted are just inside the inner surface of the barrel.

While the illustrated embodiments show the comb receding into the barrel due to the offset, substantially the same result may be accomplished with alternative structures in alternative ways. For example, the comb may retract within the barrel by actually moving up or down rather than just rotating about an axis offset from the center of the barrel. Or, the comb may include telescopically retractable segments.

Figure 69:
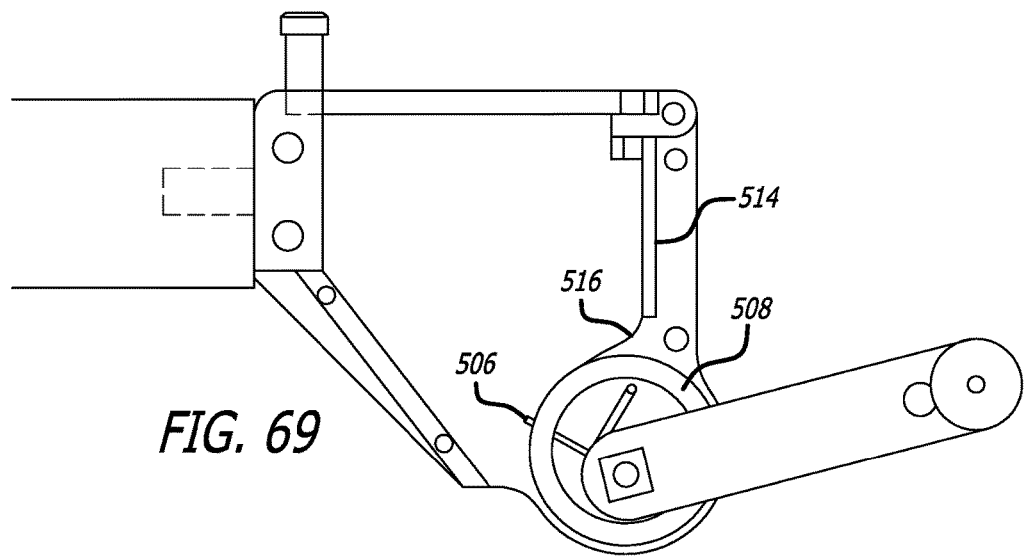
FIG. 69 is a side cutaway view of the grooming device similar to FIG. 68 but with the comb not exposed and interior to the chamber as it approaches the tangential scraper/peeler.
Figure 70:
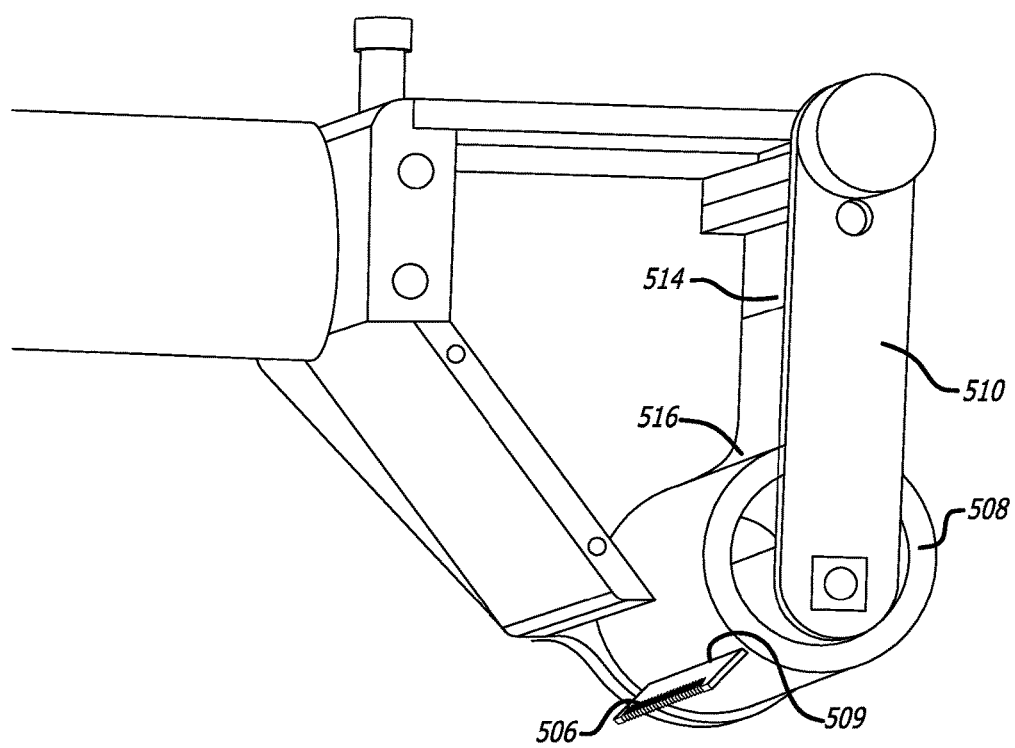
FIG. 70 is a rear/side perspective cutaway view, from below, of the grooming device of FIG. 65A with the comb exposed exteriorly to the chamber and in a rotational position between the positions shown in FIG. 68 and FIG. 69.
Figure 71A:
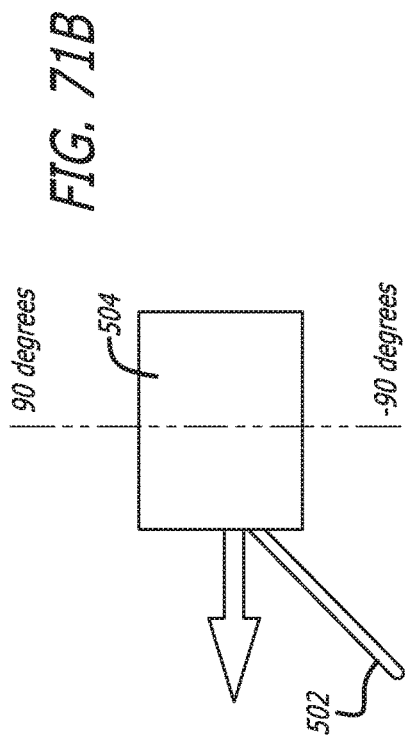
FIGS. 71A, 71B, 71C and 71D show top views illustrating various embodiments having a horizontally offset handle, offset left or right from parallel to the axis along which the device is pulled or pushed during grooming.
Figure 71B:
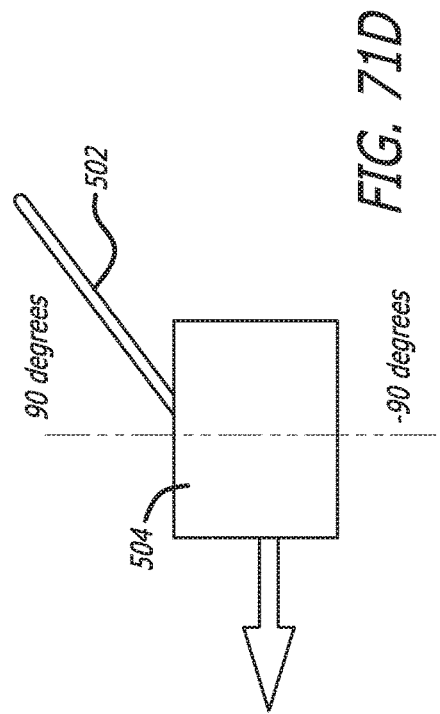
Figure 71C:
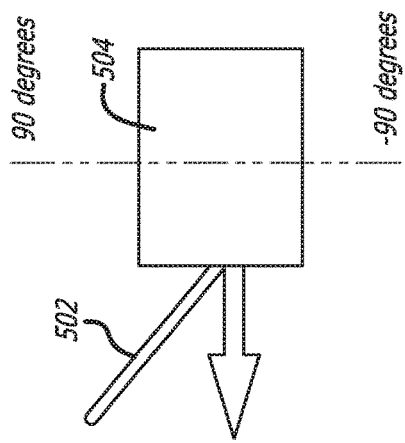
Figure 71D:
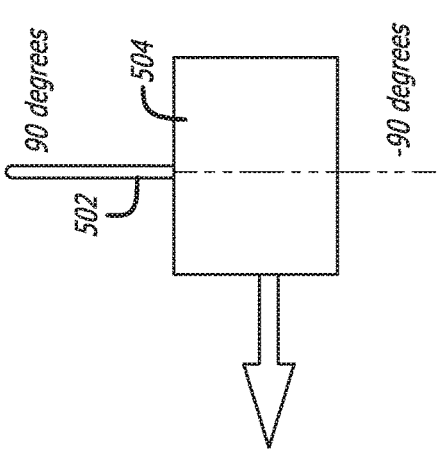

FIGS. 68-70 provide cutaway views inside the hair collection chamber 504 to illustrate how the comb 506 mounted on the dowel 530 and extending through a slit in the barrel 508 approaches the scraper 516 which forms a plane tangent to the barrel such that hair retained within the comb is scraped or peeled by the scraper or peeler as the receding comb rotates past the stationary scraper.

In other embodiments shown in FIGS. 71A, 71B, 71C and 71D and FIGS. 72A and 72B, an ergonomic handle may be provided that is offset or not parallel to the direction of brush strokes during a grooming session. This nonparallel handle may extend along an axis that is horizontally or vertically offset, or both horizontally and vertically offset, from the axis along which the grooming device is pulled in the brush strokes during a grooming session. When the handle is offset, the grooming device is not pulled along the axis of the handle during brush strokes while the pet engageable portion is in engagement with the pet but rather, pulled along another axis at an angle to the axis of the offset handle.

According to the horizontally offset handle embodiment illustrated in FIGS. 71A, 71B, 71C and 71D, the handle may be provided on the same device in two different interchangeable configurations to be comfortable for both left-handed and right-handed persons. For example, there may be a ratchet mechanism, a swivel, a pivot, or a lockable hinge mechanism to move the handle configuration from one configuration to the other (e.g. left offset to right offset relative to the axis of brush strokes).

In some embodiments with the offset handle, the offset handle is at an angle at or between −90 to 90 degrees from the axis along which the comb portion is pulled to groom the animal or other object. In other embodiments with an offset handle, if the offset handle is at an angle between 90 to 180 degrees or between −180 to −90 degrees from the axis along which the comb portion is directed it may be more appropriate to push rather than pull the grooming device unless the comb is configured for two-way grooming.

Figure 72B:
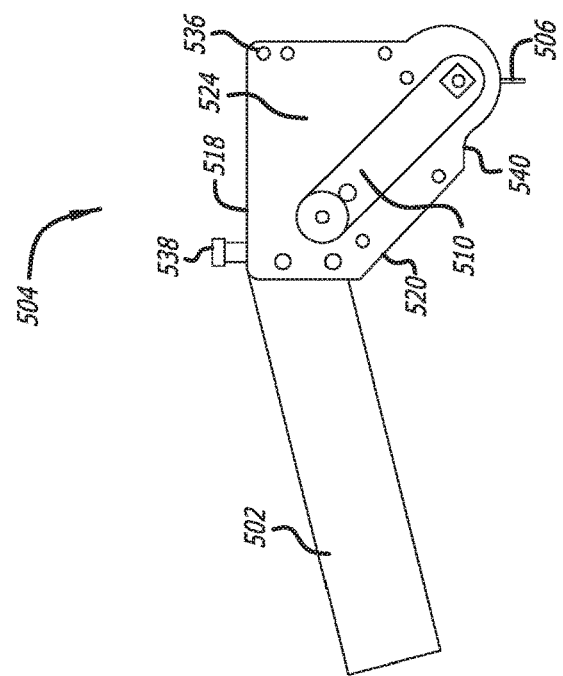
FIGS. 72A and 72B show side views illustrating various embodiments having a vertically offset handle, offset above or below the axis along which the device is pulled or pushed during grooming.
Figure 72A:
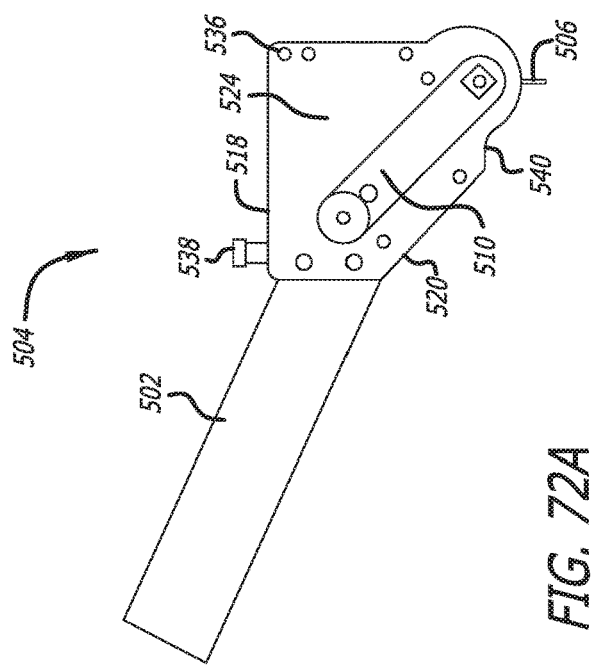

According to the vertically offset handle embodiment illustrated in FIGS. 72A and 72B, the handle may be provided above or below the axis along which the groom device is pulled (or pushed). This vertical offset may provide better leverage in some situations. For example, with the handle offset above the person grooming can use some of their weight to push down to engage the pet engageable comb portion with the animal or other object as they pull (or push) the device horizontally to capture loose hair. When brushing the sides of animal or other object, with the handle offset below the person grooming may be better able to pull upwards from above.

The precise advantages of a horizontally and/or vertical offset handle will become apparent in practice.

In accordance with a fifth embodiment 600 of the grooming device of the present invention as illustrated in FIGS. 73-79, a plurality of combs 606 are provided mounted on a common dowel 630 or inner rotating drum. In this fifth embodiment, in place of the rotating barrel 508 there are a plurality of sliding plates 608 with a separate sliding plate corresponding to each comb 606. The plurality of sliding plates may also be thought of as a multi-piece barrel. The combs are mounted on the rotating dowel 630. Each comb passes through a slit in a corresponding sliding plate and is responsible for moving that sliding plate. Each sliding plate has a leading edge 605 and a trailing edge 607. The leading edge of one sliding plate is configured to move with respect to the trailing edge of the next consecutive sliding plate in order to close the gap 603 between adjacent plates. Due to the offset nature of the loop arrangement formed by the plurality of sliding plates relative to the rotating dowel 630, the gap 603 between any two adjacent sliding plates varies through the rotational path. The sliding plates may be arranged in both circular and non-circular closed loop arrangements around the central circular dowel 630.

Figure 73:
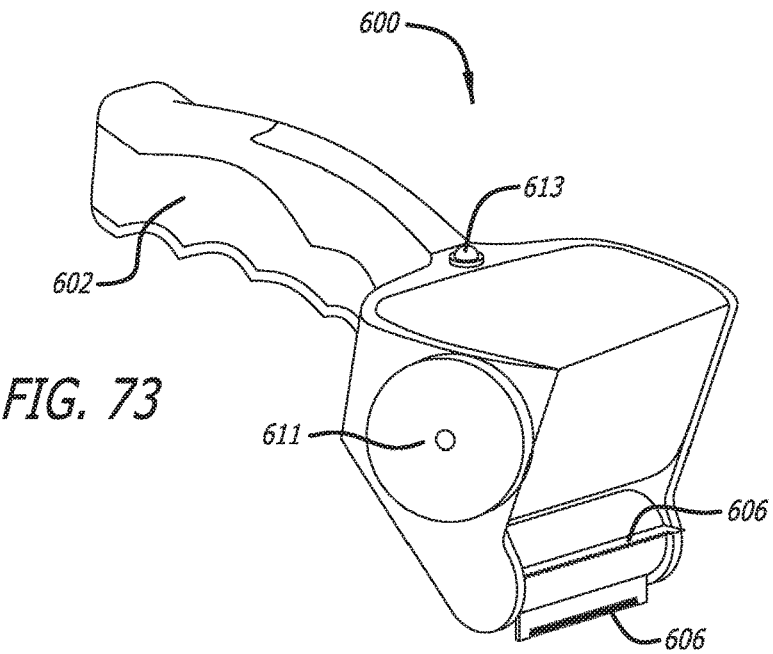
FIG. 73 shows a perspective view of a fifth embodiment having a plurality of combs.
Figure 74:
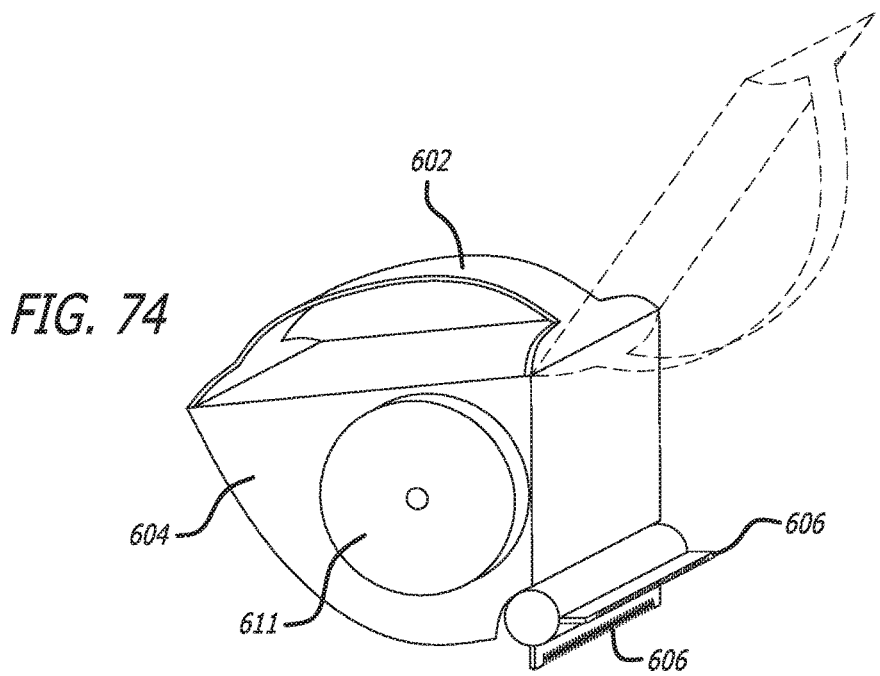
FIG. 74 shows a perspective view of the fifth embodiment having a handle on top of the grooming device.

FIG. 73 also shows a motorized embodiment in which a button 613 turns on the power to rotate the dowel. The speed may be adjusted through the side knob 611. Alternatively, side knob 611 on the chamber 604 can provide manual rotation of the dowel as an alternative to the elongated side lever 510 and finger knob 512 shown in FIG. 66 for the fourth embodiment. FIG. 74 shows an alternate top handle 602.

In the fifth embodiment having a plurality of combs, the brushing function may be accomplished either by stabilizing the rotational position of the dowel and stroking the object to be groomed or by holding the grooming device in a fixed, stationary position relative to the subject and continuously rotating the dowel. The latter process may be especially advantageous for grooming difficult to reach regions or regions with variable surface topography which make it difficult to stroke, for example under the legs of an animal.

Figure 75:
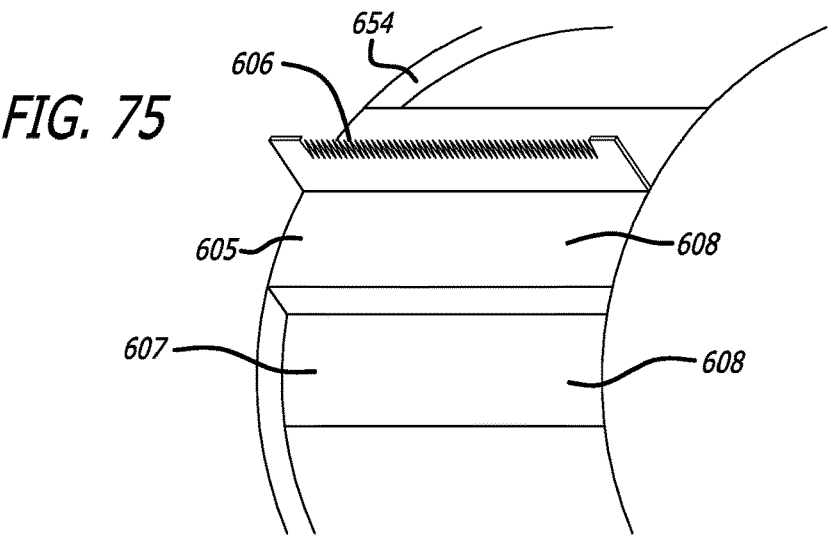
FIG. 75 is a schematic of a portion of the fifth embodiment.
Figure 78:
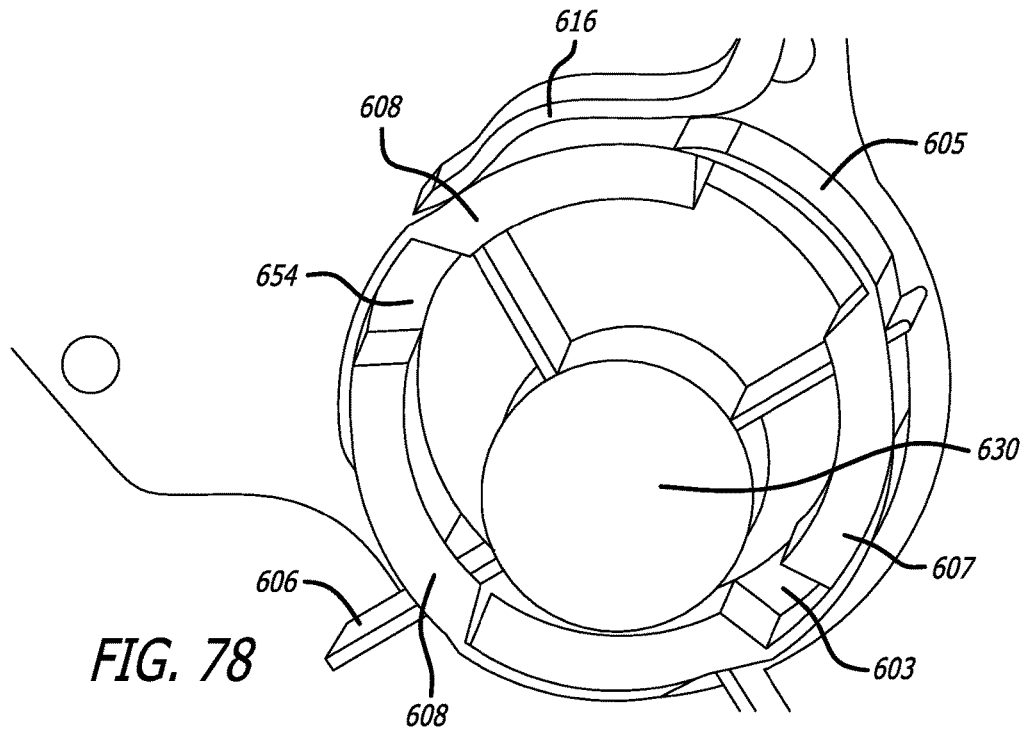
FIG. 78 is another side cross-sectional view, providing some perspective, of the sliding plates surrounding the combs mounted on the dowel according to the fifth embodiment.
Figure 79:
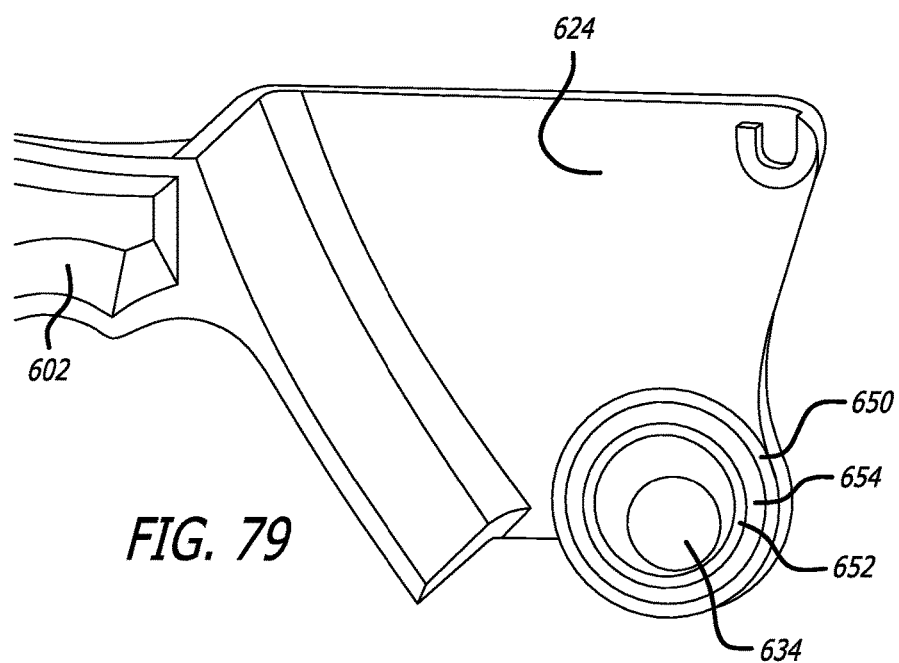
FIG. 79 is a side view of an inside of the side walls of the hair collection chamber according to a fifth embodiment.

FIGS. 75 and 78 show the track 654 within which each sliding plate 605, 607 rides. FIG. 79 illustrates how this track is formed between an outer closed loop ridge 650 and an inner closed loop ridge 652 around the hole 634 through which the dowel 630 is mounted.

Figure 76:
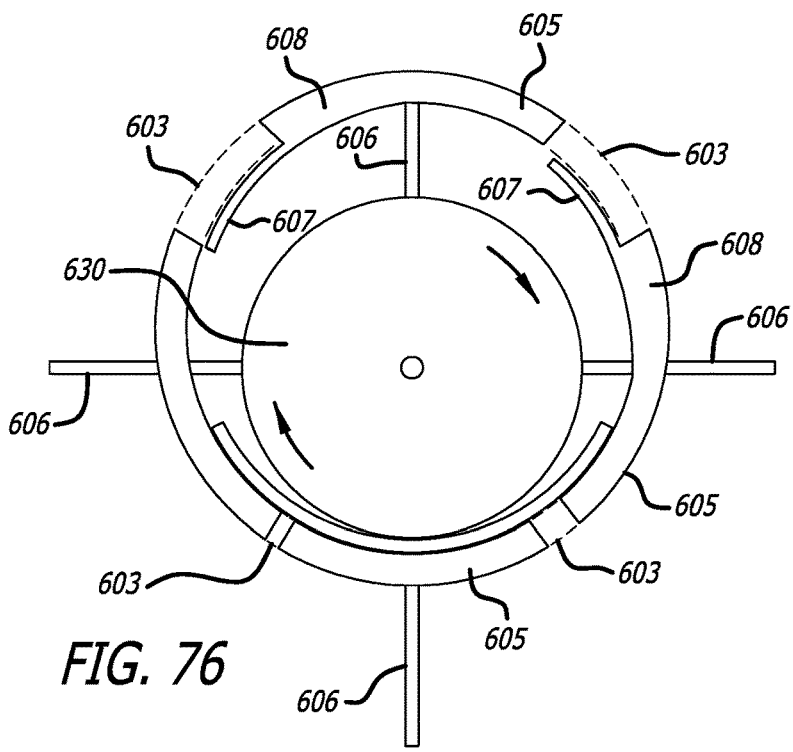
FIG. 76 is a side cross-sectional view of the sliding plates surrounding the combs mounted on the dowel according to the fifth embodiment.
Figure 77B:
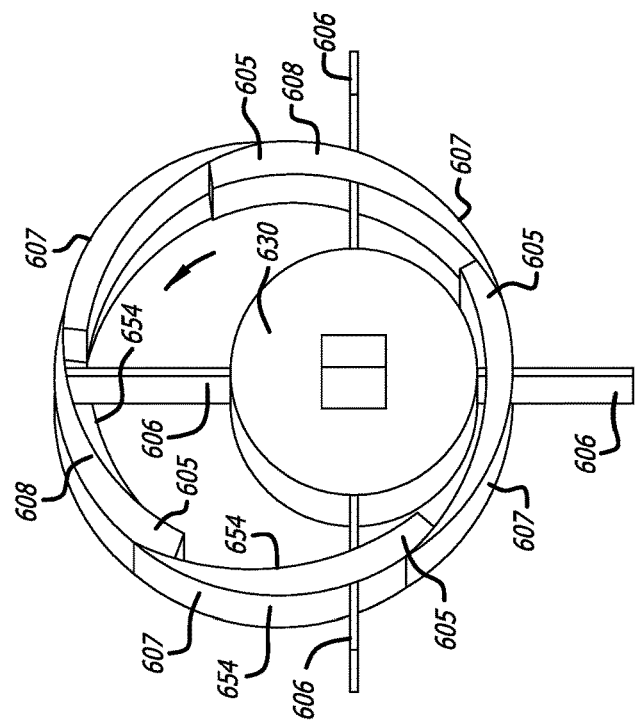
FIG. 77B is a side cross-sectional view, providing some perspective, of the sliding plates surrounding the combs mounted on the dowel according to the fifth embodiment.
Figure 77A:
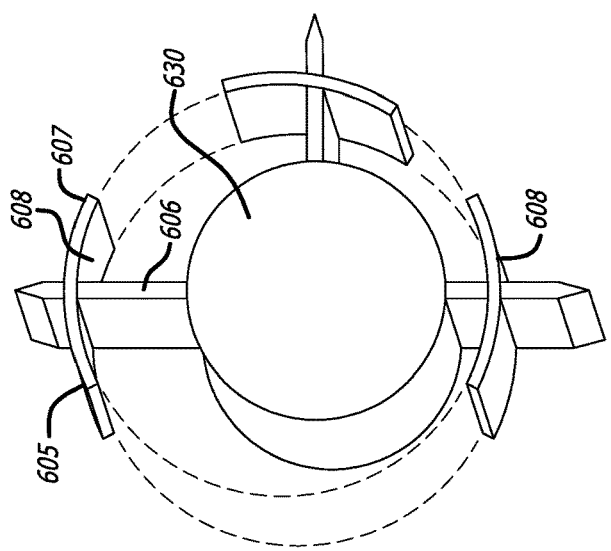
FIG. 77A is a side cross-sectional view, providing some perspective, of the sliding plates surrounding the combs mounted on the dowel according to the fifth embodiment.

FIG. 76-78 illustrate the construction of the plurality of sliding plates forming a multi-piece barrel around the central dowel upon which the combs are mounted. Each sliding plate 608 includes a leading edge 605 and a trailing edge 607. The gaps 603 between adjacent sliding plates 608 expand and contract as the plates move around the dowel 630. The scraper 616 shown in FIG. 78 removes any hair or fur from the combs 606 that has not already been removed by the comb receding within the sliding plate toward the top of the rotational pathway.

According to a preferred version of the fifth embodiment there are four combs provided and four sliding plates with a comb passing through each plate. However, any number of combs and any number of corresponding sliding plates may be provided. Each comb has its own sliding plate, the blade passing through a slit in the sliding plate and the sliding plate stays with the same blade through the entire rotation actuated by the dowel. The combs drive the sliding plates around the track 654 by virtue of the combs being mounted to the dowel.

The track 654 on side wall 624 for the sliding plates shown in FIG. 79 contains and directs each sliding plate along the desired closed loop path (circular or non-circular). The track permits the multi-comb spacing, identified by gaps 603 between adjacent sliding plates, to expand and contract as necessary without restricting any rotational movements. As the comb blades are rotated into a constricted space, the sliding plates overlap in that the leading edge 605 of one scraper moves over the trailing edge 607 of the next consecutive scraper. As the comb blades are rotated into an unconstricted space, the sliding plates separate to create gaps 603 between adjacent scrapers or above the trailing edge 607 of one scraper since the leading edge 605 of the succeeding scraper is not yet over it.

With the multi-comb embodiments at least one comb blade is exposed at any one time. The more combs that are added the more likely it is that whatever the position or orientation of the knob, at least one comb blade is in an exposed position for effective grooming.

In still other embodiments, the combs may be mounted on the dowel such that a mechanism is provided for varying the pitch of the comb.

In a variation of the fourth embodiment, the side lever 510 and hand or finger knob 512 drive connected directly to the a dowel or shaft 530 inside the barrel 508 of the grooming device 500 can advantageously be replaced with a hand pump action drive mechanism 542, illustrated in FIGS. 80-86. While it should be understood that the hand pump action drive mechanism can also be applied to the grooming device of the fifth embodiment, the hand pump action drive mechanism will be described and shown as applied to the fourth embodiment, for simplicity. The hand pump action drive mechanism preferably includes a spring biased hand pump lever 544 pivotally connected to the hair collection chamber, such as at the rear segment 522 of hair collection chamber, in juxtaposed adjacent the handle portion 502 so that the handle portion and hand pump lever can be squeezed by a hand of a user to advance the rotation of the dowel and barrel for operation of the grooming device, as will be further explained below.

Figure 80:
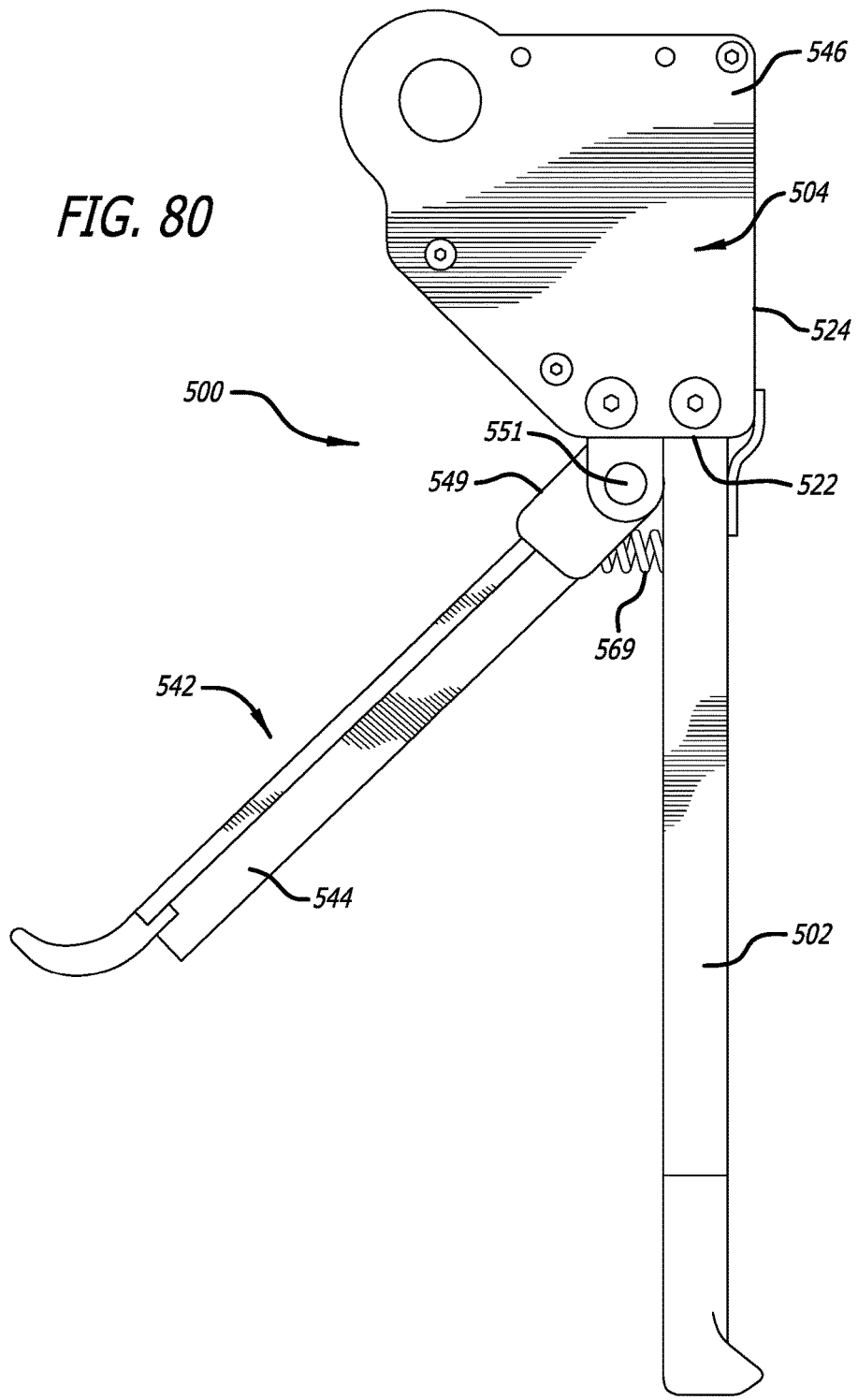
FIG. 80 is a side elevational view of a variation of the first embodiment including a hand pump action drive mechanism that can also be applied to the fifth embodiment.
Figure 81:
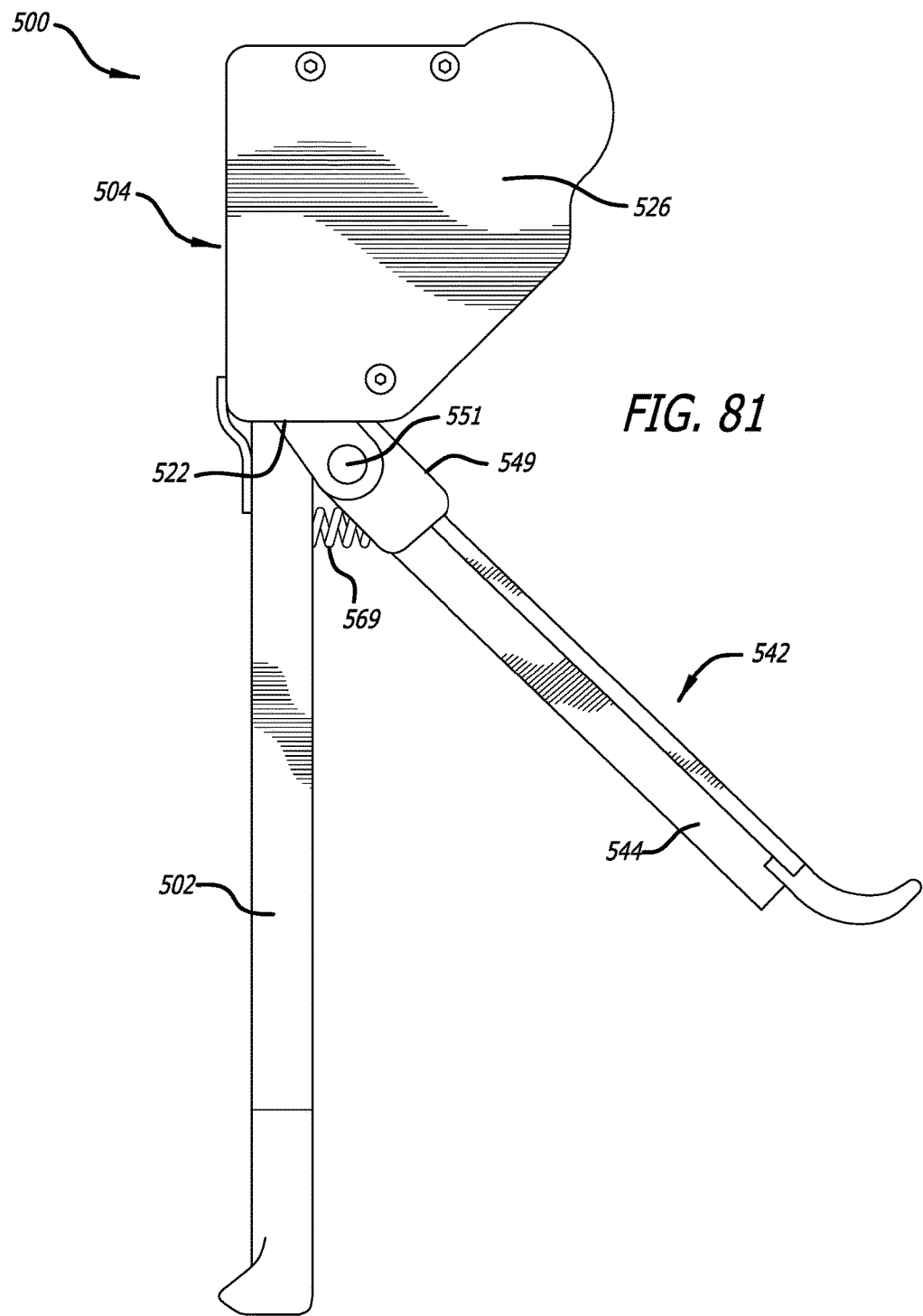
FIG. 81 is an opposing side elevational view of the variation of FIG. 80.
Figure 82:
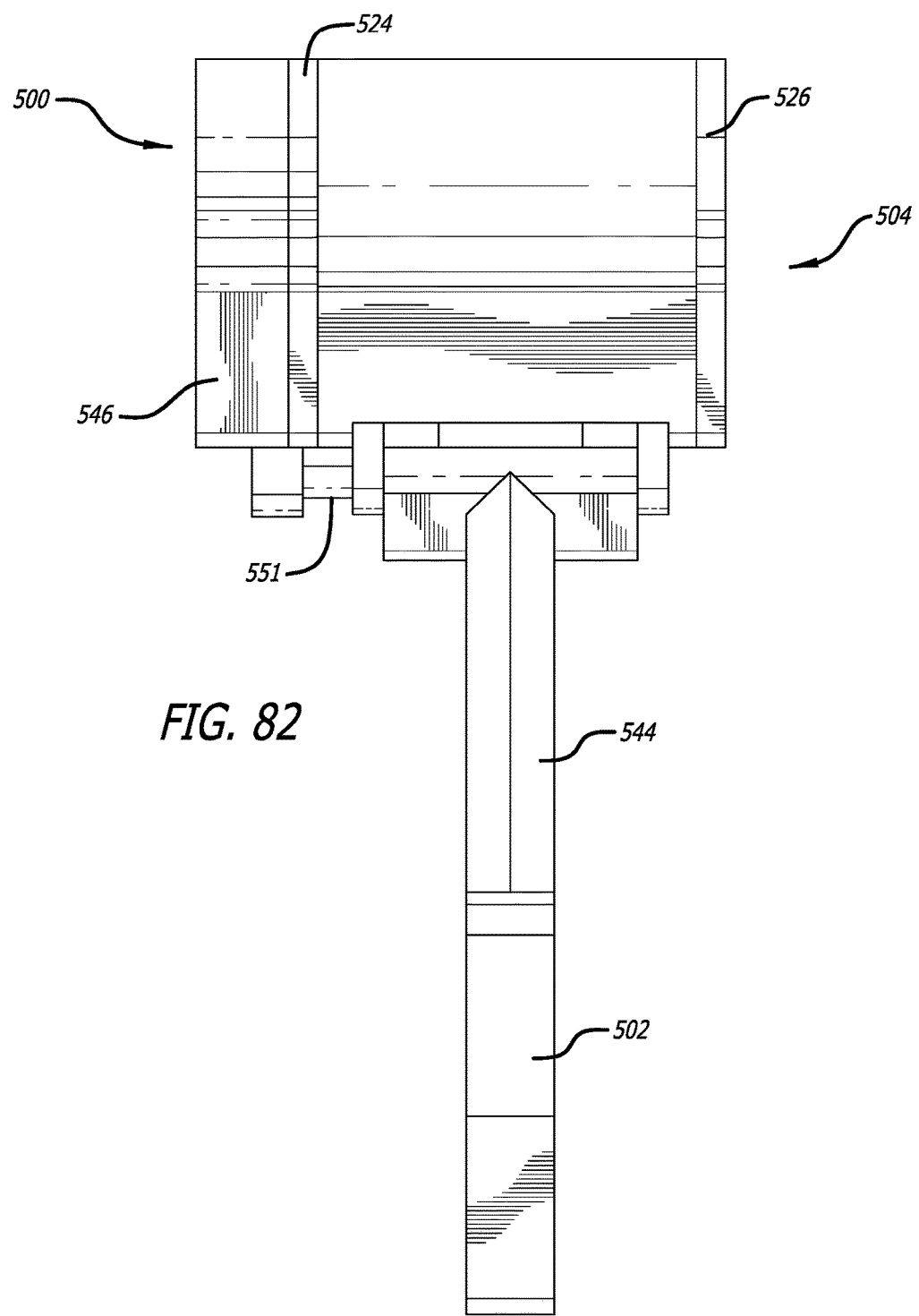
FIG. 82 is a bottom view of the variation of FIG. 80.
Figure 83:
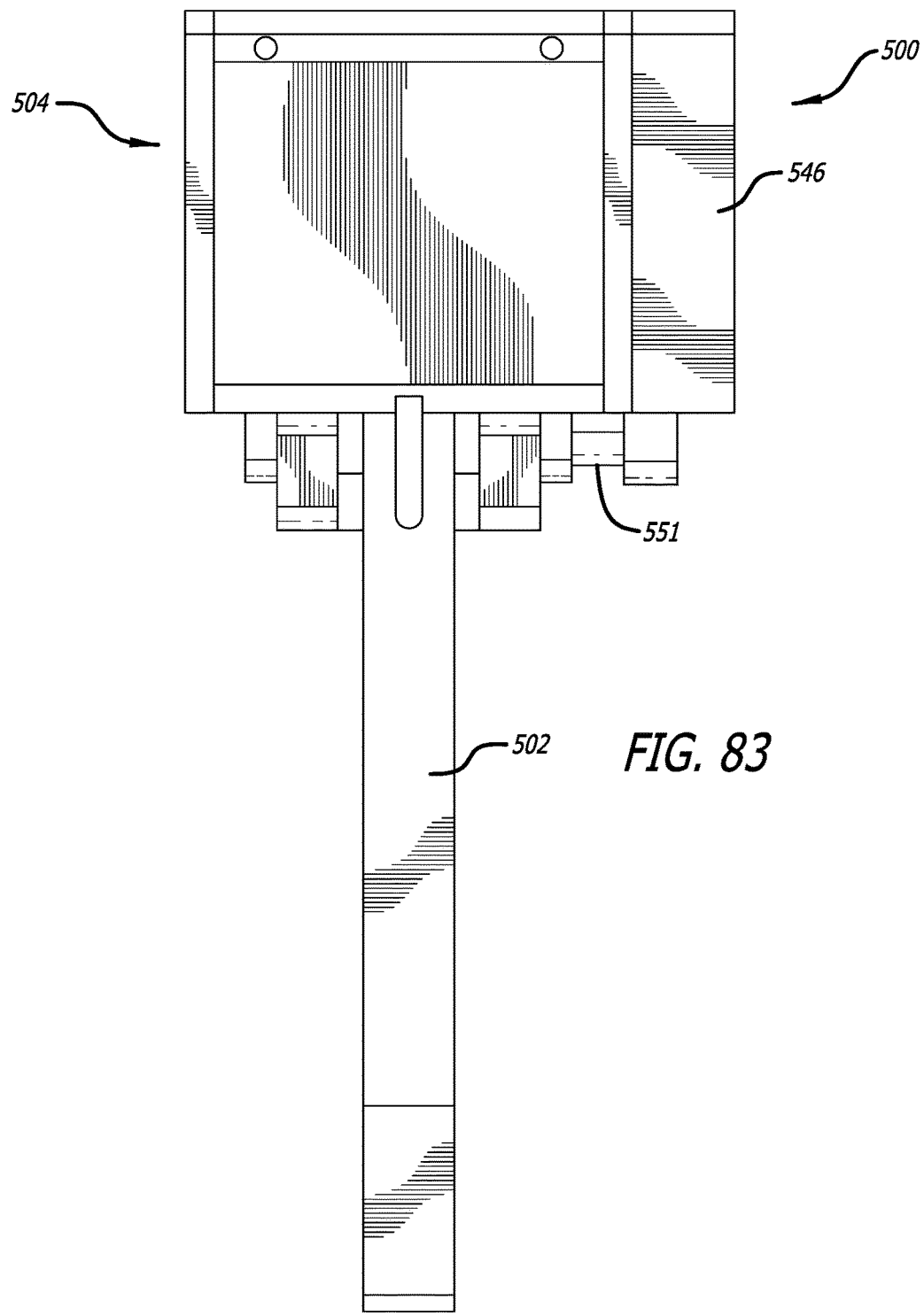
FIG. 83 is a top view of the variation of FIG. 80.
Figure 84:
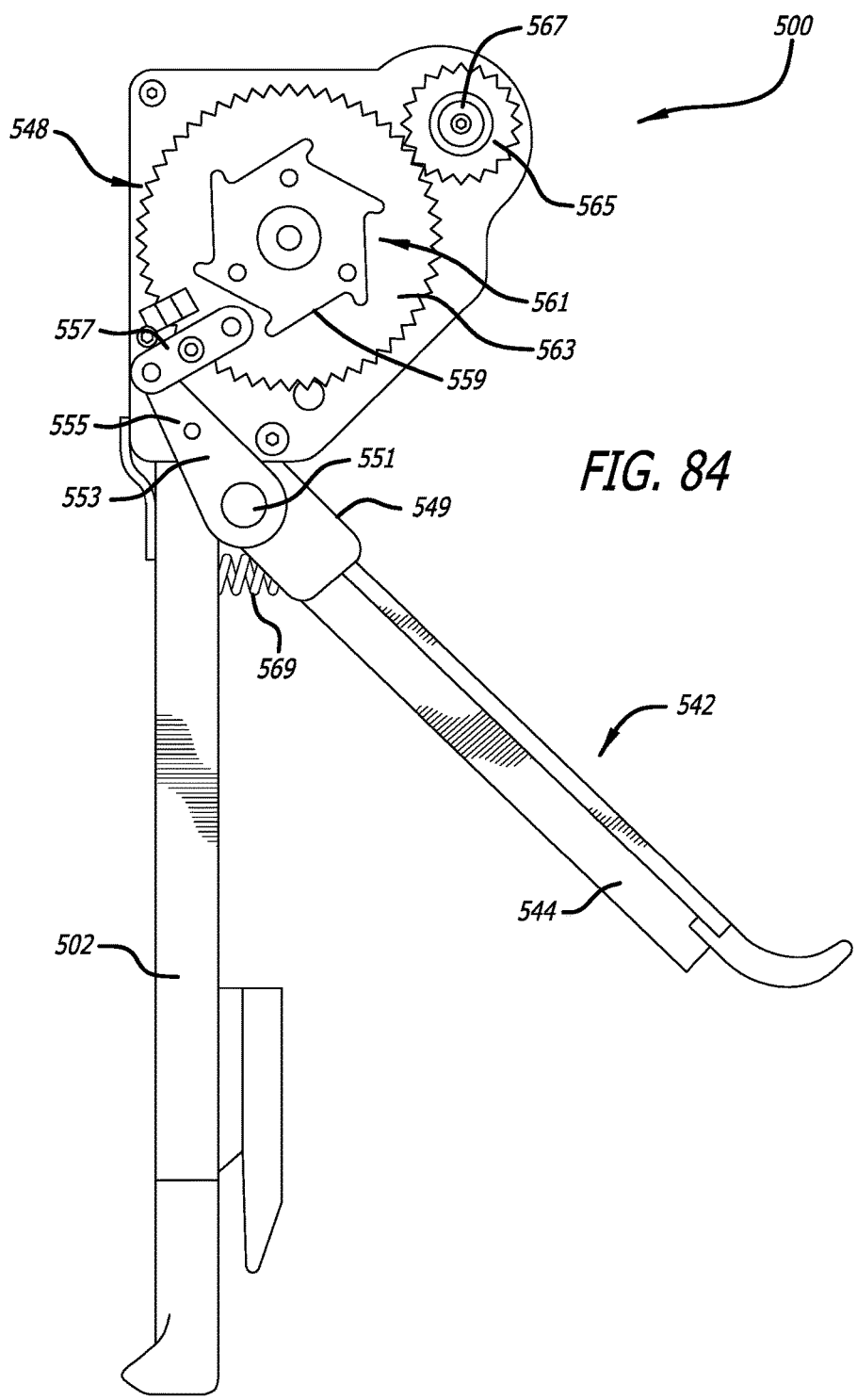
FIG. 84 is a side view of the variation of FIG. 80 with the cover removed to expose the ratchet gear assembly with a spring biased hand pump lever in an initial position.
Figure 85:
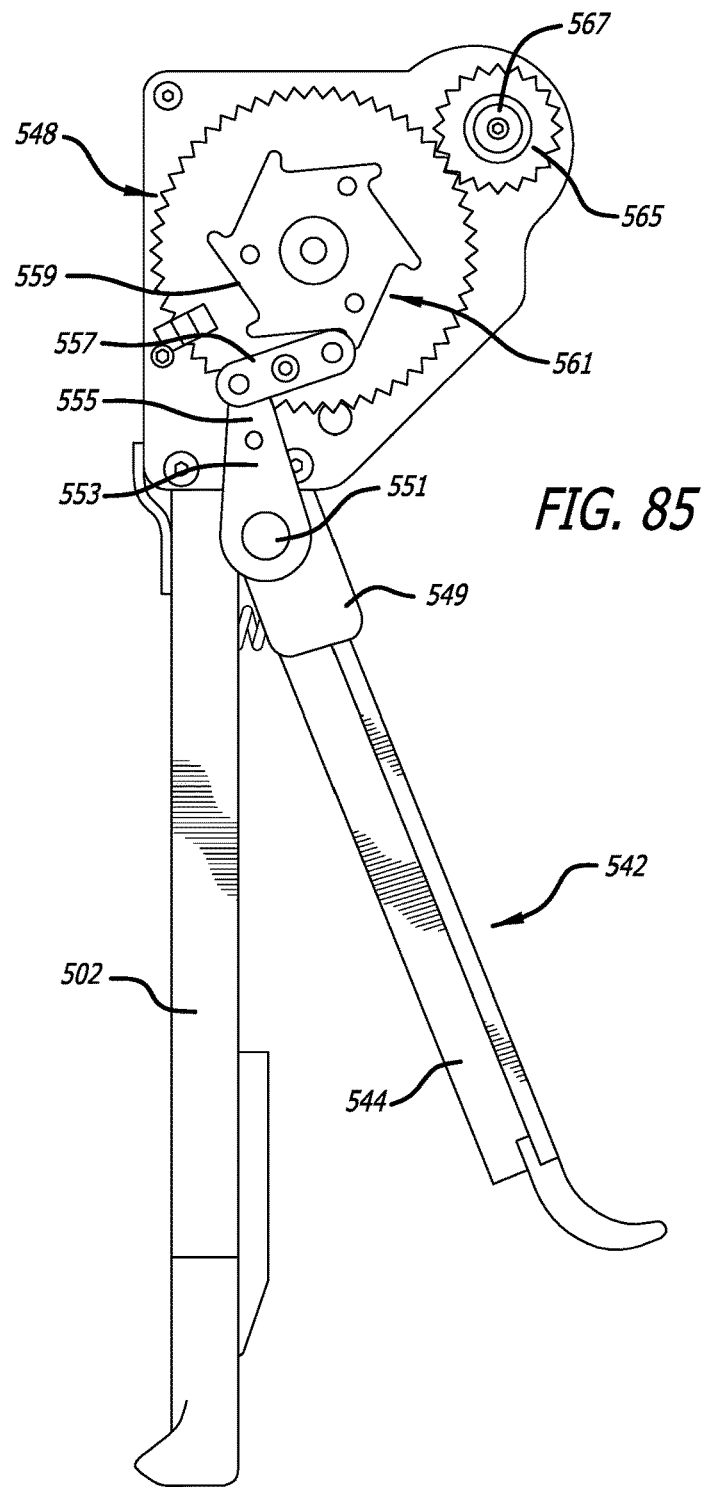
FIG. 85 is a side view similar to that of FIG. 84, showing the spring biased hand pump lever in an advanced intermediate position.
Figure 86:
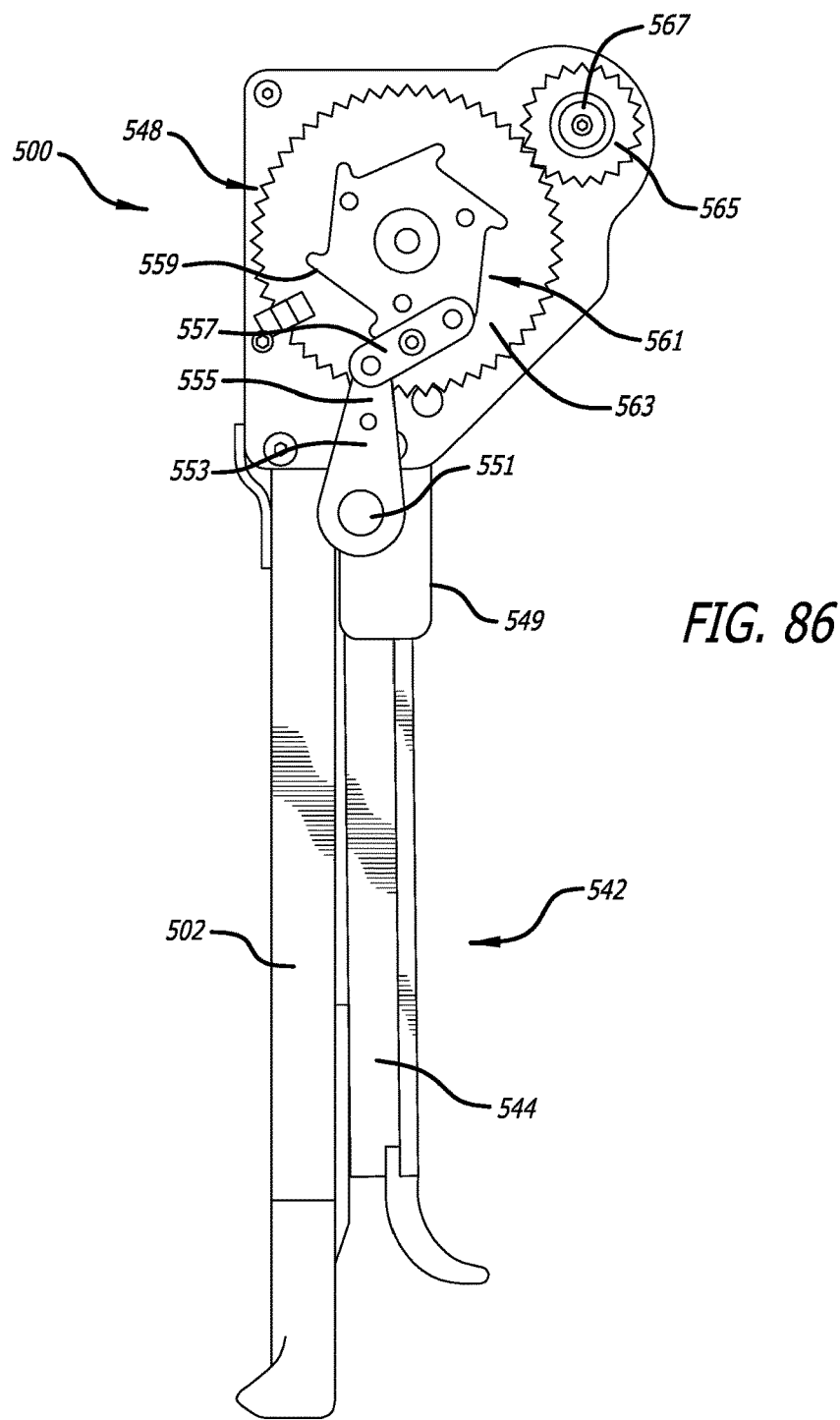
FIG. 86 is a side view similar to that of FIG. 84, showing the spring biased hand pump lever in a final advanced position.

Referring to FIGS. 80, 82 and 83, a cover 546 is attached to a side of the hair collection chamber, to one of the side walls 524 or 526, to contain and protect a user from a gear drive assembly 548 best seen in FIGS. 84-86 illustrating advancement of the rotation of the dowel and barrel for operation of the grooming device. The inner end 549 of the spring biased hand pump lever is connected fixedly to the pivot pin 551 which in turn is connected to and rotates the drive arm 553. The outer end 555 of the drive arm is in turn pivotally connected to a drive pawl 557 which engages the teeth 559 of the ratchet cogwheel 561 to drive the ratchet cogwheel in one rotational direction. The ratchet cogwheel is in turn fixedly attached to a primary drive gear 563 having teeth engaged with teeth of a secondary driven gear 565 mounted for rotation about pin 567 that is in turn connected with the dowel to drive the rotation of the dowel as the spring biased hand pump lever is squeezed in cooperation with the handle by a user, as is shown in the sequence in FIGS. 84-86. A compression coil spring 569 is mounted between the handle portion and the spring biased hand pump lever, so that when a user releases the spring biased hand pump lever at an advanced squeezed position as shown in FIG. 85 or 86, the spring biased hand pump lever is biased to return to the initial unsqueezed position shown in FIGS. 80, 81 and 84.

Figure 87:
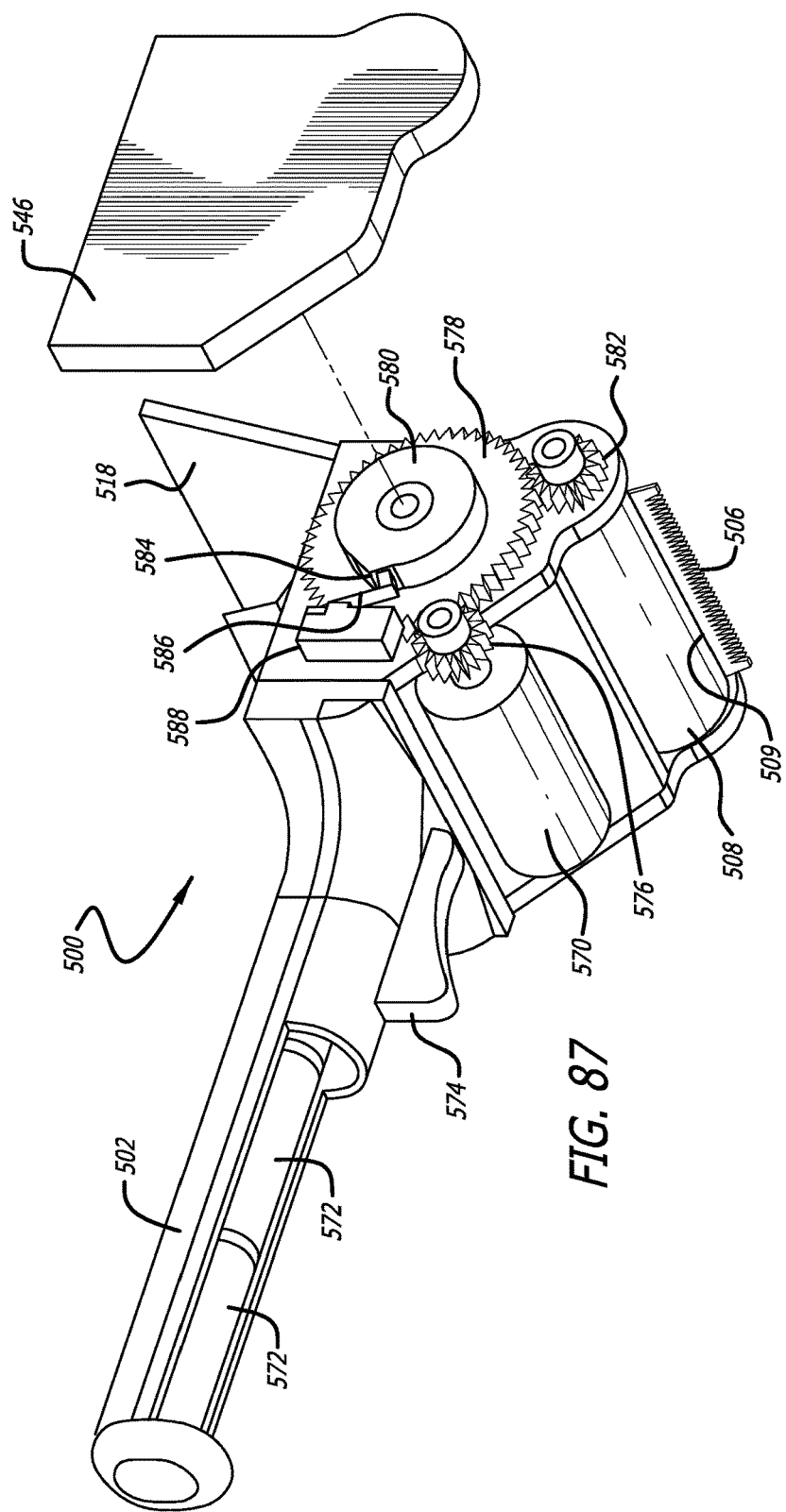
FIG. 87 is a perspective exploded view of a variation of the first embodiment, showing the cover removed, including a battery powered, motorized drive mechanism that can also be applied to the fifth embodiment.
Figure 88:
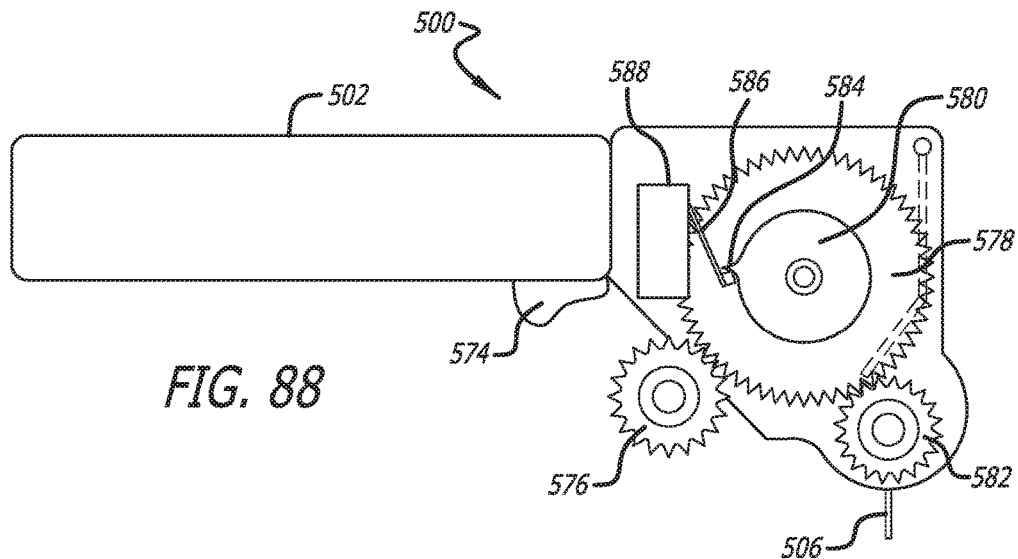
FIG. 88 is a side elevational view of the variation of FIG. 87 with the cover removed.
Figure 89:
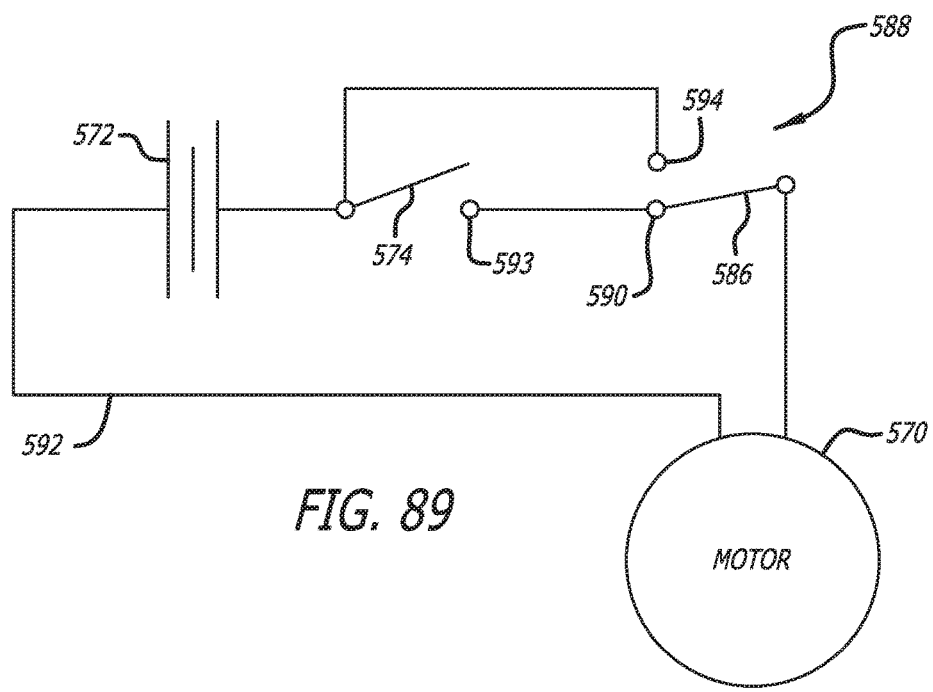
FIG. 89 is a schematic diagram of the electrical circuit of the variation of FIG. 87.

Referring to FIGS. 87-89, in another variation of the fourth embodiment, the side lever and hand or finger knob drive connected directly to the a dowel or shaft inside the barrel 508 can advantageously be replaced with a battery powered motor 570 mounted in the grooming device as will be explained further below, and powered by one or more batteries 572, typically located in a battery compartment in the handle, and activated by a user by a trigger switch 574, such as a single throw, single throw switch (SPST), for example, typically also located conveniently on the handle near the motor. A primary drive gear 576 is operatively connected to a drive shaft of the motor, and includes teeth engaged with teeth of a secondary driven cam gear 578, so that when the motor is activated, the motor drives the secondary driven cam gear to turn. A cam wheel 580 is connected to the secondary driven cam gear for rotation with the secondary driven cam gear, and a driven barrel gear 582 mounted in the grooming device and connected to the barrel includes teeth engaged with the teeth of the secondary driven cam gear, so that the motor drives the rotation of the barrel as well. The cam wheel includes a cam 584 that rotates as the secondary driven cam gear and cam wheel revolve to engage and push against a limit switch contact arm 586 of a limit switch 588, such as a single pole, double throw, normally open (SPDT-NO) switch, for example, mounted in the grooming device adjacent to the cam wheel.

The trigger switch is biased to be in an off position as shown in FIG. 89, and the limit switch contact arm is biased to be in a first position at rest in contact with a first contact 590 of electrical circuit 592 connecting the motor with the one or more batteries, so that operation of the trigger switch briefly by a user places the trigger switch in contact with a trigger contact 593, completing the electrical circuit to drive the motor turn the cam wheel until the cam engages the limit switch contact arm. When the cam engages the limit switch contact arm, the cam pushes the limit switch contact arm to a second position 594 breaking the electrical circuit, stopping the motor and bringing the barrel to a stop after completion of each rotation. Thus, with the motorized version of the grooming device, the user can stroke the hair from an animal having a furry coat or other object to be groomed with the comb until the teeth of the comb are filled with hair, stop, and activate the trigger of the grooming device to cause the battery powered motor to rotate the barrel of the grooming device exactly one revolution, to deposit the collected hair in the hair collection chamber of the grooming device and automatically return the comb to the original position with the comb teeth empty of collected hair and ready for further grooming of the animal or other object to be groomed.

The present invention is not limited to the embodiments described above. Various changes and modifications can, of course, be made, without departing from the scope and spirit of the present invention. Additional advantages and modifications will readily occur to those skilled in the art. Accordingly, various modifications may be made without departing from the spirit or scope of the general inventive concept as defined by the appended claims and their equivalents.

What is claimed is:

1. An automatic self-cleaning brush, comprising:
   an elongate handle;
   a head attached to said handle, the head having a set of spaced apart tines extending traversely with respect to an axis of the elongate handle and projecting away from the head, the elongate handle, head, and set of spaced apart tines forming a rigid arrangement;
   a sleeve reciprocating with respect to the head between an extended position in which the sleeve is partially within the head and partially extending outward from the head to substantially enclose the set of spaced apart tines, and a retracted position in which the sleeve is deeper inside the head than when in the extended position to expose the set of spaced apart tines through a transverse slot on the sleeve;
   a leaf spring having a first end rigidly mounted in the handle and a second end connected to the sleeve to bias the sleeve in the extended position; and
   a sleeve retraction button adjacent the handle, the sleeve retraction button extending through an opening in the head, the sleeve retraction button adapted to manually position the sleeve in the retracted position by overcoming the bias of the leaf spring;
   whereby pressure applied to the sleeve at the transverse slot retracts the sleeve within the head to expose the set of spaced apart tines, and whereby the biasing of the leaf spring returns the sleeve to the extended position when the applied pressure is removed; and
   whereby the return of the sleeve to the extended position scrapes the set of spaced apart tines to remove matter collected on the set of spaced apart tines; and whereby the sleeve retraction button is adapted to maintain the sleeve in the retracted position to defer the scraping of the spaced apart tines.

2. The automatic self-cleaning brush of claim 1, wherein the sleeve retraction button bears against the handle when the sleeve is fully retracted.

3. The automatic self-cleaning brush of claim 1, wherein the handle and the head are formed integrally formed.

4. The automatic self-cleaning brush of claim 1, wherein a majority of the sleeve is disposed within the head.

5. The automatic self-cleaning brush of claim 1, wherein the sleeve retraction button is rigidly mounted to the sleeve and extends perpendicular to a mounting surface of the sleeve.

* * * * *